(12) United States Patent
Nagasaki

(10) Patent No.: US 7,697,817 B2
(45) Date of Patent: Apr. 13, 2010

(54) IMAGE PROCESSING APPARATUS AND METHOD, AND RECORDED MEDIUM

(75) Inventor: Tanio Nagasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1828 days.

(21) Appl. No.: 10/148,106

(22) PCT Filed: Sep. 26, 2001

(86) PCT No.: PCT/JP01/08394

§ 371 (c)(1),
(2), (4) Date: May 23, 2002

(87) PCT Pub. No.: WO02/28092

PCT Pub. Date: Apr. 4, 2002

(65) Prior Publication Data

US 2003/0160894 A1 Aug. 28, 2003

(30) Foreign Application Priority Data

Sep. 26, 2000 (JP) ............................ 2000-292316

(51) Int. Cl.
 *H04N 5/91* (2006.01)
 *H04N 7/01* (2006.01)
 *H04N 11/20* (2006.01)
(52) U.S. Cl. ............................ 386/83; 386/73; 386/123; 386/131; 348/441; 348/450; 348/453
(58) Field of Classification Search ................ 386/123, 386/44, 31, 37, 34, 102, 73, 83, 95, 131; 348/441, 443, 453, 663, 638, 668
See application file for complete search history.

(56) References Cited

U.S. PATENT DOCUMENTS 4,271,476 A * 6/1981 Lotspiech .................. 382/235

(Continued)

FOREIGN PATENT DOCUMENTS

| JP | 4-349496 | 12/1992 |
| WO | WO 98/41011 | * 9/1998 |

OTHER PUBLICATIONS

Koopman, Main Memory Architecture, Oct. 19, 1998.*
Calabria et al., Memory Centric Architectures for Video Production, Jun. 2000, Pinnacle Systems.*

*Primary Examiner*—Thai Tran
*Assistant Examiner*—Hung Q Dang
(74) *Attorney, Agent, or Firm*—Frommer Lawrence & Haug LLP; William S. Frommer; Thomas F. Presson

(57) ABSTRACT

A picture processing apparatus for processing picture signals of different formats. A memory stores input picture signals. A read-out section reads the picture signals stored in the memory in terms of a preset number of the picture signals as a unit. An interpolation section interpolates picture signals for a preset position by executing preset calculations on the plural picture signals read out. For picture signals of an HD format, the picture signals are simultaneously read out in terms of the four pixels as a unit to execute four-point interpolation processing. Whilst for picture signals of an SD format, after a conversion to a 960.times.720 frame picture by applying field/frame conversion and doubling the number of the pixels in the vertical direction, the picture signals are stored in the memory. The operating frequency and the number of times of operations of the read-out section and the interpolation section are changed to values as large as four times those. Thus, the picture signals of the SD format are simultaneously read out four times in terms of the four pixels as a unit to execute the 16-point interpolation processing.

28 Claims, 53 Drawing Sheets

U.S. PATENT DOCUMENTS

| | | | |
|---|---|---|---|
| 5,130,786 A * | 7/1992 | Murata et al. | 375/240.25 |
| 5,185,876 A * | 2/1993 | Nguyen et al. | 710/21 |
| 5,249,037 A * | 9/1993 | Sugiyama et al. | 348/452 |
| 5,331,346 A * | 7/1994 | Shields et al. | 348/441 |
| 5,448,301 A * | 9/1995 | Michener | 348/578 |
| 5,774,601 A * | 6/1998 | Mahmoodi | 382/298 |
| 5,841,480 A * | 11/1998 | Rhodes | 348/459 |
| 6,069,664 A * | 5/2000 | Zhu et al. | 348/448 |
| 6,177,962 B1 * | 1/2001 | Rumreich et al. | 348/648 |
| 6,239,815 B1 * | 5/2001 | Frink et al. | 345/502 |
| 6,285,408 B1 * | 9/2001 | Choi et al. | 348/555 |
| 6,348,926 B1 * | 2/2002 | Nozawa et al. | 345/603 |
| 6,437,881 B1 * | 8/2002 | Baba et al. | 358/434 |
| 6,441,860 B1 * | 8/2002 | Yamaguchi et al. | 348/555 |
| 6,441,913 B1 * | 8/2002 | Anabuki et al. | 358/1.12 |
| 6,757,008 B1 * | 6/2004 | Smith | 348/143 |

* cited by examiner

4:2:2 Y/U/V

U 4-POINT INTERPOLATION

V 4-POINT INTERPOLATION

4:4:4 Y/U/V aligh 4:4:4 Y/U/V 0  0.5  1  1.5  2  2.5  3  3.5  4  4.5

| ADDRESS [4:0] | REGISTER | DATA [bit] | REMARKS |
|---|---|---|---|
| 0x00 | REG_V_START_XL | 24 | LEFT UPPER POINT(X) |
| 0x01 | REG_V_START_YL | 24 | LEFT UPPER POINT(Y) |
| 0x02 | REG_V_START_TL | 24 | LEFT UPPER POINT(T) |
| 0x03 | REG_V_START_ZL | 24 | LEFT UPPER POINT(Z) |
| 0x04 | REG_V_END_XL | 24 | LEFT LOWER POINT(X) |
| 0x05 | REG_V_END_YL | 24 | LEFT LOWER POINT(Y) |
| 0x06 | REG_V_END_TL | 24 | LEFT LOWER POINT(T) |
| 0x07 | REG_V_END_ZL | 24 | LEFT LOWER POINT(Z) |
| 0x08 | REG_V_START_XR | 24 | RIGHT UPPER POINT(X) |
| 0x09 | REG_V_START_YR | 24 | RIGHT UPPER POINT(Y) |
| 0x0a | REG_V_START_TR | 24 | RIGHT UPPER POINT(T) |
| 0x0b | REG_V_START_ZR | 24 | RIGHT UPPER POINT(Z) |
| 0x0c | REG_V_END_XR | 24 | RIGHT LOWER POINT(X) |
| 0x0d | REG_V_END_YR | 24 | RIGHT LOWER POINT(Y) |
| 0x0e | REG_V_END_TR | 24 | RIGHT LOWER POINT(T) |
| 0x0f | REG_V_END_ZR | 24 | RIGHT LOWER POINT(Z) |

FIG.34

| ADDRESS [11:0] | REGISTER | DATA[bit] | REMARKS |
|---|---|---|---|
| 0x0000 | Coefficient H K0 | 24 | Coefficient H table D0 |
| 0x0001 | Coefficient H K1 | 24 | D1 |
| 0x0002 | Coefficient H K2 | 24 | D2 |
| ⋮ | ⋮ | ⋮ | ⋮ |
| 0x07fe | Coefficient H K2046 | 24 | |
| 0x07ff | Coefficient H K2047 | 24 | D2047 |
| 0x800 | Coefficient V K0 | 24 | Coefficient V table D0 |
| 0x801 | Coefficient V K1 | 24 | D1 |
| 0x802 | Coefficient V K2 | 24 | D2 |
| ⋮ | ⋮ | ⋮ | ⋮ |
| 0xffe | Coefficient V K2046 | 24 | |
| 0xfff | Coefficient V K2047 | 24 | D2047 |

FIG.35

|  | Input A | Input B | MIX Coefficient fKn | Output C |
|---|---|---|---|---|
| MIX(X) | REG_V_START_XL | REG_V_END_XL | X(V)Dn | FF_H_START_X |
| MIX(Y) | REG_V_START_YL | REG_V_END_YL | Y(V)Dn | FF_H_START_Y |
| MIX(T) | REG_V_START_TL | REG_V_END_TL | T(V)Dn | FF_H_START_T |
| MIX(Z) | REG_V_START_ZL | REG_V_END_ZL | Z(V)Dn | FF_H_START_Z |

FIG.36

|  | Input A | Input B | MIX Coefficient fKn | Output C |
|---|---|---|---|---|
| MIX(X) | REG_V_START_XR | REG_V_END_XR | X(V)Dn | FF_H_END_X |
| MIX(Y) | REG_V_START_YR | REG_V_END_YR | Y(V)Dn | FF_H_END_Y |
| MIX(T) | REG_V_START_TR | REG_V_END_TR | T(V)Dn | FF_H_END_T |
| MIX(Z) | REG_V_START_ZR | REG_V_END_ZR | Z(V)Dn | FF_H_END_Z |

FIG.38

|  | Input A | Input B | MIX CoefficientKn | Output C |
|---|---|---|---|---|
| MIX(X) | REG_H_START_X | REG_H_END_X | X(H)Dn | X(H,V) |
| MIX(Y) | REG_H_START_Y | REG_H_END_Y | Y(H)Dn | Y(H,V) |
| MIX(T) | REG_H_START_T | REG_H_END_T | T(H)Dn | T(H,V) |
| MIX(Z) | REG_H_START_Z | REG_H_END_Z | Z(H)Dn | Z(H,V) |

FIG.40

| r' 4bit value | $C_0$ | $C_1$ | $C_2$ | $C_3$ | $C_4$ | $C_5$ | $C_6$ | $C_7$ | $\sum_{i=0}^{7} C_i$ |
|---|---|---|---|---|---|---|---|---|---|
| 0x0 | 0 | 0 | 0 | 2048 | 0 | 0 | 0 | 0 | 2048 |
| 0x1 | -10 | 35 | -103 | 2040 | 122 | -41 | 13 | -8 | 2048 |
| 0x2 | -19 | 64 | -188 | 1998 | 260 | -85 | 27 | -9 | 2048 |
| 0x3 | -25 | 87 | -255 | 1928 | 412 | -131 | 43 | -11 | 2048 |
| 0x4 | -29 | 103 | -302 | 1834 | 575 | -177 | 58 | -14 | 2048 |
| 0x5 | -32 | 114 | -331 | 1718 | 745 | -222 | 74 | -18 | 2048 |
| 0x6 | -32 | 118 | -344 | 1582 | 920 | -263 | 89 | -22 | 2048 |
| 0x7 | -31 | 117 | -342 | 1431 | 1096 | -299 | 101 | -25 | 2048 |
| 0x8 | -28 | 111 | -326 | 1267 | 1267 | -326 | 111 | -28 | 2048 |
| 0x9 | -25 | 101 | -299 | 1096 | 1431 | -342 | 117 | -31 | 2048 |
| 0xA | -22 | 89 | -263 | 920 | 1582 | -344 | 118 | -32 | 2048 |
| 0xB | -18 | 74 | -222 | 745 | 1718 | -331 | 114 | -32 | 2048 |
| 0xC | -14 | 58 | -177 | 575 | 1834 | -302 | 103 | -29 | 2048 |
| 0xD | -11 | 43 | -131 | 412 | 1928 | -255 | 87 | -25 | 2048 |
| 0xE | -9 | 27 | -85 | 260 | 1998 | -188 | 64 | -19 | 2048 |
| 0xF | -8 | 13 | -41 | 122 | 2040 | -103 | 35 | -10 | 2048 |

FIG.45

FIG.52B Cycle 0 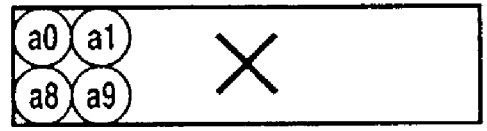
FIG.52C Cycle 1 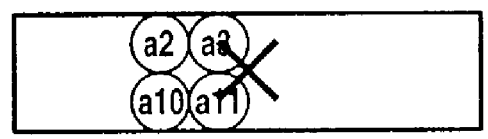
FIG.52D Cycle 2 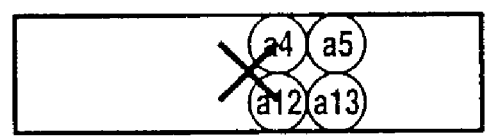
FIG.52E Cycle 3 

FIG.54

IMAGE PROCESSING APPARATUS AND METHOD, AND RECORDED MEDIUM

TECHNICAL FIELD

This invention relates to a picture processing method and apparatus and to a recording medium. For example, it relates to a picture processing method and apparatus conveniently used for arbitrarily changing the shape of a picture and displaying the so changed picture, and to a recording medium.

BACKGROUND ART

The advent of digital storage contributes significantly to the technical progress in the production technique of television programs. The DRAM, among different types of the digital storage, is gradually increasing in its storage capacity so that one scanning line, one field picture, one frame picture and even a sequence of plural pictures can be stored therein. The digital storage is economically practicable even in consideration of its production cost, circuit scale or power consumption. Among the instances of application of the digital storage, such as DRAM, there are so-called DME (digital multi-effects) used when modifying the picture to an optional shape or when moving the picture such as at the time of creation of television programs.

Meanwhile, when e.g., the conventional DME executes processing of interpolation of picture signals of the conventional HD (high definition) format, so-called four-point interpolation, which consists in calculating picture signals of a position for interpolation using picture signals corresponding to four pixels lying around the position for interpolation, is used. If the conventional DME execute processing of the interpolation on picture signals of the SD (standard definition) format, the processing of so-called 16-point interpolation is used, in which, after field/frame conversion, the number of horizontal scanning lines is doubled, and picture signals at the position of interpolation are calculated using picture signals corresponding to 16 pixels lying in the vicinity of the position of interpolation. If now the four-point interpolation is applied to picture signals of the SD format, the picture signals resulting from the interpolation are lower in quality than those obtained on 16-point interpolation. It is therefore desirable if, in implementing DME capable of processing picture signals of the HD format and those of the SD format, the four-point interpolation and the 16-point interpolation can be executed for picture signals of the SD format and those of the HD format, respectively. However, there lacks such DME in the current technical level.

Also, in the DME, it is practiced to interpolate picture signals at a certain position using picture signals of plural signals lying around the position, for example, four pixels lying at upper, lower, left and right positions. However, if the position desired for interpolation is near a picture edge, it may be an occurrence that no sufficient number of neighboring pixels is available. In such case, processing different from the usual interpolation is needed. That is, there is the necessity of verifying whether or not the processing of usual interpolation is applicable to the particular position for interpolation. Consequently, a dedicated circuit for making the decision in this respect is needed.

In the conventional DME, it is also practiced to interpolate picture signals of a preset position with picture signals of pixels lying in the vicinity of the position. However, since the picture signals input to e.g., the DME are of the 4:2:2 (Y/U/Y) format, in which the positions of the chroma signals U, V associated with luminance signals Y are geometrically offset, there is raised a problem that a memory cannot be efficiently utilized. There is also an additional problem that, since the luminance signals Y and the chroma signals U, V are different in the spatial frequencies from each other, processing pertinent to color, such as colored spotlight effect or trailing effects accompanied with color changes, cannot be performed.

In the conventional DME, directed to the processing of the SD format picture signals, a field memory is used for changing the scanning direction from the horizontal direction to the vertical direction. However, if it is considered to process the picture signals of the HD (high definition) format, higher in resolution higher than the picture signals of the SD format, a larger storage capacity and a higher read-write speed, are required, thus raising a problem that the conventional field memory cannot be used.

On the other hand, if a general-purpose memory is usable in producing e.g., the DME, low cost can be achieved. However, in view of the limitations imposed on the sorts of the bit widths of the general-purpose memory, the bit width of input picture signals needs to be matched to the bit width of the general-purpose memory.

DISCLOSURE OF THE INVENTION

In view of the above-described status of the art, it is an object of the present invention to provide a picture processing method and apparatus, and a recording medium, according to which 4-point interpolation can be applied to picture signals of the HD format, whilst 16-point interpolation processing can be applied to picture signals of the SD format.

It is another object of the present invention to provide picture a processing method and apparatus, and a recording medium, according to which, in interpolating picture signals, the same processing of interpolation can be applied regardless of interpolating positions.

It is still another object of the present invention to provide a picture processing method and apparatus, and a recording medium, according to which, by converting the 4:2:2 (Y/U/V) picture signals into 4:4:4 (Y/U/V) picture signals, it becomes possible to make efficient utilization of the memory as well as to effect processing pertinent to color operations.

It is still another object of the present invention to provide a picture processing method and apparatus, and a recording medium, according to which the scanning direction can be changed by exploiting an SDRAM (Synchronous Dynamic Random Access Memory), which features burst transfer, in place of the routinely used field memory.

It is yet another object of the present invention to provide a picture processing method and apparatus, and a recording medium, according to which the information volume taken up by the chroma signals U, V in the picture signals of the 40-bit width of the 4:4:4:4 (Y/U/V/K) format may be curtailed to reduce the cost by conversion to picture signals of 36-bit width to enable the use of the general-purpose memory of 36-bit width.

A picture processing apparatus for processing picture signals of different formats, according to the present invention, includes storage means for storing input picture signals in a memory, read-out means for simultaneously reading out the picture signals stored in the memory in terms of a preset number of the picture signals as a unit, interpolation means for interpolating picture signals for a preset position by executing preset calculations on the plural picture signals read out by the readout means from the memory, and control means for controlling the operating frequency and the number of times of operations of the readout means and the interpolation means in keeping with the formats of the input picture signals.

A picture processing method for processing picture signals of different formats, according to the present invention includes a storage step of storing input picture signals in a memory, a read-out step of simultaneously reading out the picture signals stored in the memory in terms of a preset number of the picture signals as a unit, an interpolation step of interpolating picture signals for a preset position by executing preset calculations on the plural picture signals read out in the readout step from the memory, and a control step of controlling the operating frequency and the number of times of operations of the readout step and the interpolation step in keeping with the formats of the input picture signals.

A recording medium according to the present invention includes a computer-readable program for picture processing, recorded thereon, in which the program includes a storage step of storing input picture signals in a memory, a readout step of simultaneously reading out the picture signals stored in the memory in terms of a preset number of the picture signals as a unit, an interpolation step of interpolating picture signals for a preset position by executing preset calculations on the plural picture signals read out in the readout step from the memory, and a control step of controlling the operating frequency and the number of times of operations of the readout step and the interpolation step in keeping with the formats of the input picture signals.

A picture processing apparatus for interpolating picture signals according to the present invention includes storage means for storing the picture signals corresponding to input pixels in a memory, generating means for setting an imaginary area around a picture formed by the picture signals for generating the picture signals associated with the imaginary area, storage means for storing the picture signals associated with the imaginary area, generated by the generating means, readout means for reading out the plural picture signals associated with plural pixels lying in the vicinity of a preset position, and interpolation means for interpolating the picture signals associated with the preset position using plural picture signals associated with the plural pixels read out by the readout means.

A picture processing method for interpolating picture signals according to the present invention includes a storage step of storing the picture signals corresponding to input pixels in a memory, a generating step of setting an imaginary area around a picture formed by the picture signals for generating the picture signals associated with the imaginary area, a storage step of storing the picture signals associated with the imaginary area, generated by the generating step, a readout step of reading out the plural picture signals associated with plural pixels lying in the vicinity of a preset position, and an interpolation step of interpolating the picture signals associated with the preset position using plural picture signals associated with the plural pixels read out by the readout step.

A recording medium according to the present invention includes a computer-readable program for picture processing, recorded thereon, in which the program includes a storage step of storing the picture signals corresponding to input pixels in a memory, a generating step of setting an imaginary area around a picture formed by the picture signals for generating the picture signals associated with the imaginary area, a storage step of storing the picture signals associated with the imaginary area, generated by the generating step, a readout step of reading out the plural picture signals associated with plural pixels lying in the vicinity of a preset position, and an interpolation step of interpolating the picture signals associated with the preset position using plural picture signals associated with the plural pixels read out by the readout step.

A picture processing apparatus for interpolating picture signals including at least luminance signals and chroma signals, according to the present invention, includes separating means for separating the chroma signals from the picture signals corresponding to sequentially input pixels, interpolation means for interpolating chroma signals associated with a preset position using a plurality of consecutive chroma signals, as separated by the separating means, and outputting means for outputting the chroma signals, interpolated by the interpolation means, simultaneously with corresponding luminance signals.

A picture processing method for interpolating picture signals according to the present invention includes at least luminance signals and chroma signals, in which the method includes a separating step of separating the chroma signals from the picture signals corresponding to sequentially input pixels, an interpolation step of interpolating chroma signals associated with a preset position using a plurality of consecutive chroma signals, as separated by the separating step, and an outputting step of outputting the chroma signals, interpolated by the interpolation step, simultaneously with corresponding luminance signals.

A recording medium includes a computer-readable program for picture processing, recorded thereon, in which the program interpolates picture signals at least including luminance signals and chroma signals, and includes a separating step of separating the chroma signals from the picture signals corresponding to sequentially input pixels, an interpolation step of interpolating chroma signals associated with a preset position using a plurality of consecutive chroma signals, as separated by the separating step, and an outputting step of outputting the chroma signals, interpolated by the interpolation step, simultaneously with corresponding luminance signals.

A picture processing apparatus for converting the scanning direction for picture signals according to the present invention includes writing means for alternately writing the picture signals, input in the horizontal scanning sequence, in different ones of a plurality of banks of a first information recording medium, from one preset unit volume to another, readout/writing means for alternately reading out the picture signals every preset unit volume, for writing the information signals in a second information recording medium, and output control means for outputting the picture signals every preset unit volume from the second information recording medium in accordance with the writing sequence.

A picture processing method for converting the scanning direction for picture signals according to the present invention includes a writing step of alternately writing the picture signals, input in the horizontal scanning sequence, in different ones of a plurality of banks of a first information recording medium, from one preset unit volume of the picture signals to another, a readout/writing step of alternately reading out the picture signals every preset unit volume of the picture signals, for writing the information signals in a second information recording medium, and an output control step of outputting the picture signals every preset unit volume of the picture signals from the second information recording medium in accordance with the writing sequence.

A recording medium includes a computer-readable program for picture processing, recorded thereon, the program causing the scanning direction of picture signals to be changed, in which the program includes a writing step of alternately writing the picture signals, input in the horizontal scanning sequence, in different ones of a plurality of banks of a first information recording medium, from one preset unit volume of the picture signals to another, a readout/writing step of alternately reading out the picture signals every preset unit volume of the input picture signals, for writing the information signals in a second information recording medium, and an output control step of outputting the picture signals every preset unit volume of the input picture signals from the second information recording medium in accordance with the writing sequence.

A picture processing apparatus for changing a bit width of picture signals according to the present invention includes conversion means for reducing the bit width of chroma signals of input picture signals to change the bit width of the picture signals, and storage means for storing the picture signals, converted in bit width by the conversion means to a preset bit width, in a memory.

A picture processing method for changing a bit width of picture signals, according to the present invention, includes a conversion step of reducing the bit width of chroma signals of input picture signals to change the bit width of the picture signals, and a storage step of storing the picture signals, converted in bit width in the conversion step to a preset bit width, in a memory.

A recording medium according to the present invention includes a computer-readable program for picture processing, recorded thereon, the program causing the bit width of picture signals to be changed, in which the program includes a conversion step of reducing the bit width of chroma signals of input picture signals to change the bit width of the picture signals, and a storage step of storing the picture signals, converted in the bit width in the conversion step to a preset bit width, in a memory.

BRIEF DESCRIPTION OF THE DRAWINGS

FIG. 34 shows function values X(0, 0) to Z(1919, 539) held by REG_V_START_XL register 101-X to REG_V_END_ZR register 106-Z.

FIG. 35 shows the relationship between registers enclosed in a mixer coefficient block 92 and mixer coefficients held therein.

FIG. 36 shows the originating point and an outputting destination of the function values for mixers 111-X to 111-Z.

FIG. 38 shows the originating point and an outputting destination of the function values for mixers 111-X to 111-Z.

FIG. 40 shows the originating point and an outputting destination of the function values for mixers 111-X to 111-Z.

FIG. 45 shows values of interpolation coefficients $C_0$ to $C_7$ used in 16-point interpolation processing.

FIG. 54 illustrates the operating timing of the horizontal proportional distribution circuit 123 in the 16-point interpolation processing.

BEST MODE FOR CARRYING OUT THE INVENTION

Figure 1:
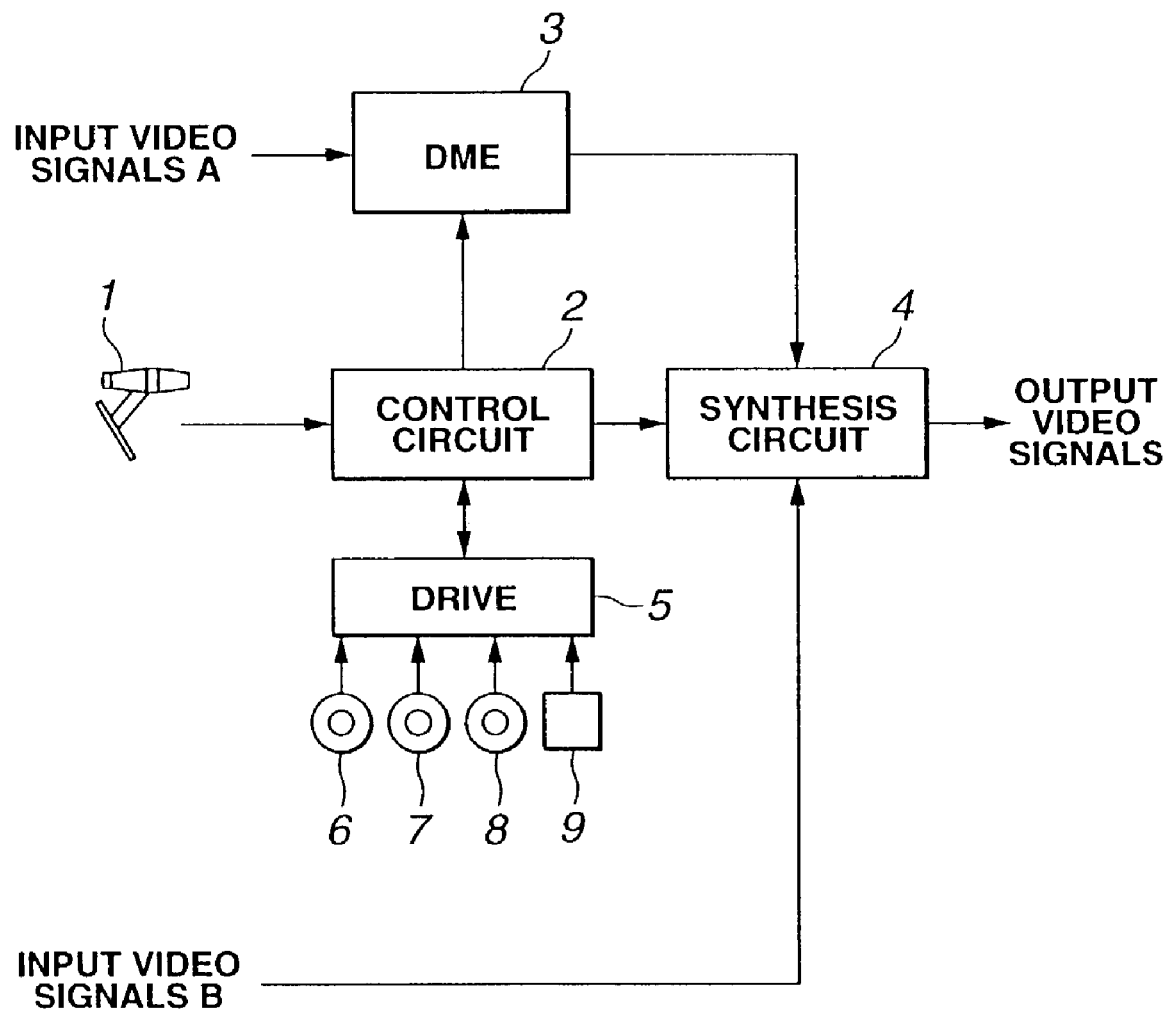
FIG. 1 is a block diagram showing an exemplary structure of a picture synthesis apparatus embodying the present invention.

Referring to the drawings, the picture processing method and apparatus according to the present invention are explained in detail. FIG. 1 shows a block diagram showing the structure of a picture synthesis apparatus embodying the present invention. This picture synthesis apparatus is used in, for example, creating television broadcast programs, and synthesizes pictures of input video signals A and B, already subjected to digital picture processing, such as transformation or translation, to output the resulting synthesized picture.

The picture synthesis apparatus is made up of an arm lever 1, detecting the user's operation to output corresponding operating signals to a control circuit 2, which control circuit 2 controls a drive 5 to cause a control program stored in a magnetic disc 6, inclusive of a floppy disc, an optical disc 7, inclusive of a CD-ROM (Compact Disc-Read Only Memory), a DVD (Digital Versatile Disc) and a magneto-optical disc 8, inclusive of an MD (Mini-Disc), to be read out to control the entire picture synthesizing apparatus based e.g., on the so read out control program and on the operating signals from an arm lever 1, and a DME 3 for applying digital picture processing to the input video signals A to output the resulting signals to a synthesis circuit 4. The synthesis circuit 4 superposes a picture of the input video signals A, subjected to the digital picture processing, to the picture of the input video signals B, to output the resulting signal to the downstream side circuitry.

The operation of a picture synthesis apparatus is now explained. The DME 3 applies digital picture processing, associated with the user's operations on the arm lever 1, to the picture of input video signals A. The synthesis circuit 4 then superimposes the resulting signals on a picture of input video signals B to output the resulting picture.

Figure 2:
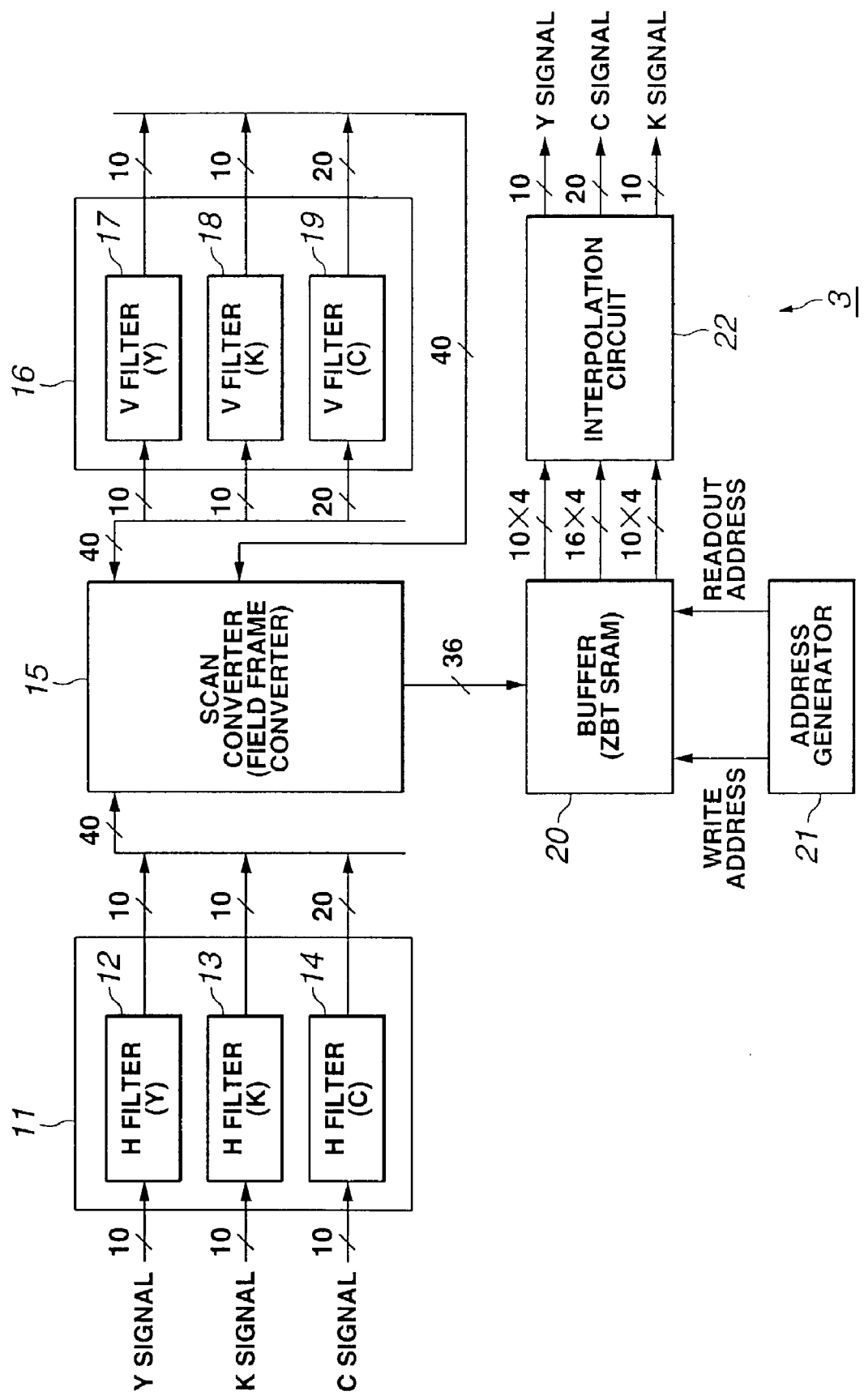
FIG. 2 is a block diagram showing an exemplary structure of DME3.

FIG. 2 shows a block diagram showing a specified structure of the DME 3. The input video signals A, fed to the DME 3, are assumed to be picture signals of a 30 bit width of the 4:2:2:4 (Y/U/V/K) HD format (e.g., 1080i×1920), that is picture signals made up by luminance signals Y of a 10-bit width, chroma signals U, V, each of a 5-bit width and a key signal K of a 10-bit width. The input video signals A may be picture signals of the SD (Standard Definition) format (e.g., 480i×720), or picture signals of any other suitable format, in addition to being picture signals of the HD (High Definition) format. Meanwhile, in FIG. 2, the luminance signals Y are denoted signals Y, the chroma signals U, V, each being of 5 bit widths, are collectively denoted C-signals of the 10-bit width, and the key signals K are denoted K signals.

A horizontal defocus filter (HDFF) 11 of the DME 3 is made up of an H-filter 12, for applying one-dimensional low-pass filtering to the luminance signals Y, input in the horizontal scanning sequence, an H-filter 13, for applying one-dimensional low-pass filtering to the key signals K, input in the horizontal scanning sequence, and an H-filter 14, independently interpolating the chroma signals U, V, input in the horizontal scanning sequence, in a manner explained subsequently in detail with reference to FIGS. 3 to 6, and for applying one-dimensional low-pass filtering to the interpolated signals. Thus, the scan converter 15, downstream of the HDFF 11, is fed with 4:4:4:4 picture signals of a 40 bit width.

The scan converter 15 holds picture signals, input in the horizontal scanning sequence from the HDFF 11, and scans the so-held picture signals in the vertical direction, that is converts the scanning direction from the horizontal to the vertical, to output the picture signals to a vertical defocus filter VDFF 16. The scan converter 15 also curtails the bit width of the chroma signals U, V of the picture signals of the 40 bit width, returned from the VDFF 16 in the vertical scanning sequence, to output the resulting picture signals to the buffer 20. If the picture signals returned from the VDFF 16 are of the SD format, the scan converter 15 converts the field picture to the frame picture and interpolates the resulting frame picture to output the resulting interpolated picture to the buffer 20. If the picture signals, input from the VDFF 16, are of the HD format, the scan converter 15 outputs picture signals in the state of the field picture to the buffer 20.

The VDFF 16 is made up by a V-filter 17, for applying one-dimensional low-pass filtering to the luminance signals Y, input in the vertical scanning sequence, a V-filter 18 for applying one-dimensional low-pass filtering to the key signal K, input in the vertical scanning sequence, and a V-filter 19, for applying one-dimensional low-pass filtering to the chroma signals U, V, input in the vertical scanning sequence. The VDFF 16 returns the 4:4:4:4 picture signals of the 40-bit width, already subjected to the one-dimensional low-pass filtering in the vertical direction, to the scan converter 15.

The buffer 20 is comprised of a ZBT SRAM (Zero Bus Turnaround Static Random Access Memory), and writes picture signals, supplied from the scan converter 15, in accordance with the write address supplied from an address generator 21, while reading out the picture signals every four pixels in accordance with the read address supplied from the address generator 21 to output the so read out picture signals to an interpolation circuit 22. Using the read address, supplied from buffer 20 every four pixels, the interpolation circuit 22 interpolates the picture signals lying at a preset position inwardly of the four pixels to output the resulting interpolated signals to the synthesis circuit 4. Meanwhile, the address generator 21 and the interpolation circuit 22 may also be constituted by an FPGA (Field Programmable Gate Array).

Referring to FIGS. 3 to 6, the processing of independently interpolating the chroma signals U, V of the 4:2:2:4 picture signals, input to the HDFF 11, by the H-filter 14, to convert the signals into 4:4:4:4 picture signals, is now explained. In the following description, the picture signals are sometimes indicated 4:2:2 (Y/U/Y) or 4:4:4 picture signals, with omission of notation for the key signals. FIG. 3 shows the concept of the processing of interpolating the chroma signals U, V.

Figure 3A:
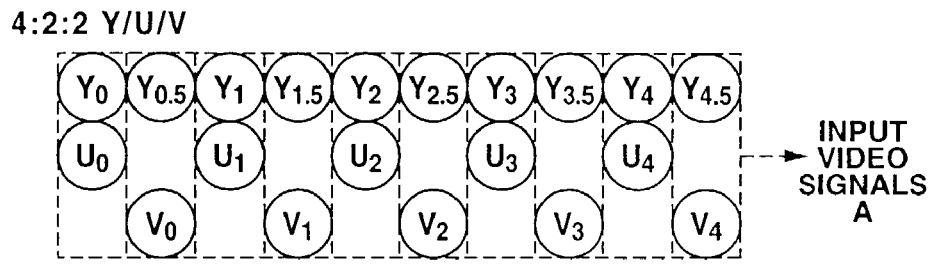
FIGS. 3A to 3C illustrate the concept of the processing for interpolating the chroma signals U, V in an H filter 14.

FIG. 3A shows picture signals input to the HDFF 11 in the sequence of horizontal scanning. Specifically, the HDFF 11 is simultaneously fed with luminance signals $Y_0$ for a certain pixel (number 0 pixel) and with chroma signals $U_0$ for the number 0 pixel. At the next clock, the HDFF 11 is simultaneously fed with luminance signals $Y_{0.5}$ for a pixel which is a right-hand side neighbor to the number 0 pixel, and with chroma signals V0 for the number 0 pixel. At the next clock, the HDFF 11 is simultaneously fed with luminance signals $Y_1$ for the number 1 pixel, which is a right-hand side neighbor to the number 0.5 pixel, and with and with chroma signals $U_1$ for the number 1 pixel. In similar manner, the HDFF 11 is then simultaneously fed with luminance signals $Y_N$ for a number N pixel and with chroma signals $U_N$ for the number N pixel and, at the next clock, the HDFF 11 is simultaneously fed with luminance signals $Y_{N+0.5}$ for a number (N+0.5) pixel, which is a right-hand side neighbor to the number N pixel, and with chroma signals $V_N$ for the number N pixel.

Figure 3B:
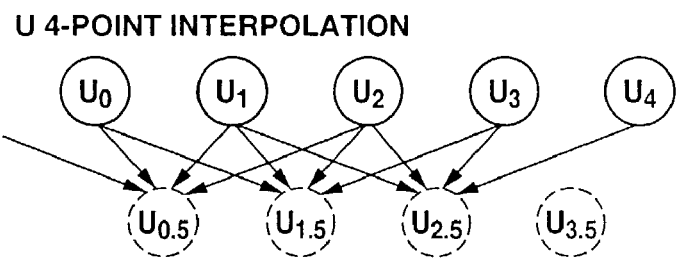
Figure 3C:
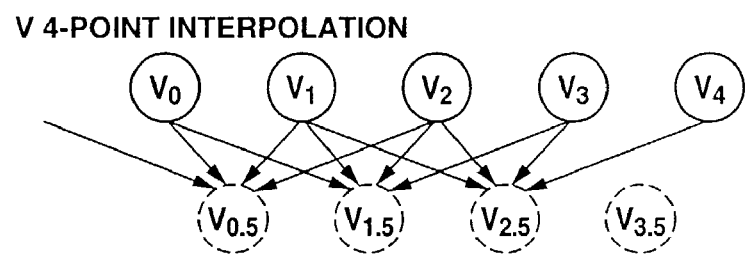

It never occurs that the luminance signals $Y_N$ and the chroma signals $U_N$, $V_N$ for the number N pixel are input simultaneously, while there lack chroma signals $U_{N+0.5}$, $V_{N+0.5}$ for the number (N+0.5) pixel, as shown in FIG. 3A. Thus, in order to match the input timing of the luminance signals $Y_N$ to that of the chroma signals $U_N$, $V_N$ and in order to unify the spatial frequencies of the luminance and chroma signals, the chroma signals $U_{N+0.5}$, $V_{N+0.5}$ for the number (N+0.5) pixel are interpolated. For interpolating the chroma signals $U_{N+0.5}$, for the number (N+0.5) pixel, chroma signals lying on the left and right hand sides of the pixel, namely chroma signals $U_{N-1}$ for the number (N-1) pixel, chroma signals $U_N$ for the number N pixels, chroma signals $U_{N+1}$ for the number (N+1) pixel and chroma signals $U_{N+2}$ for the number N+2 pixels, as shown in FIG. 3B. Similarly, for interpolating the chroma signals $V_{N+0.5}$, for the number (N+0.5) pixel, chroma signals lying on the left and right hand sides of the pixel, namely chroma signals $V_{N-1}$ for the number (N-1) pixel, chroma signals $V_N$ for the number N pixels, chroma signals $V_{N+1}$ for the number (N+1) pixel and chroma signals $V_{N+2}$ for the number N+2 pixels, as shown in FIG. 3C.

Figure 3D:
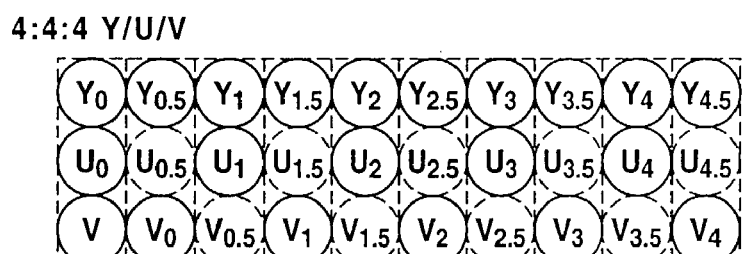
Figure 4:
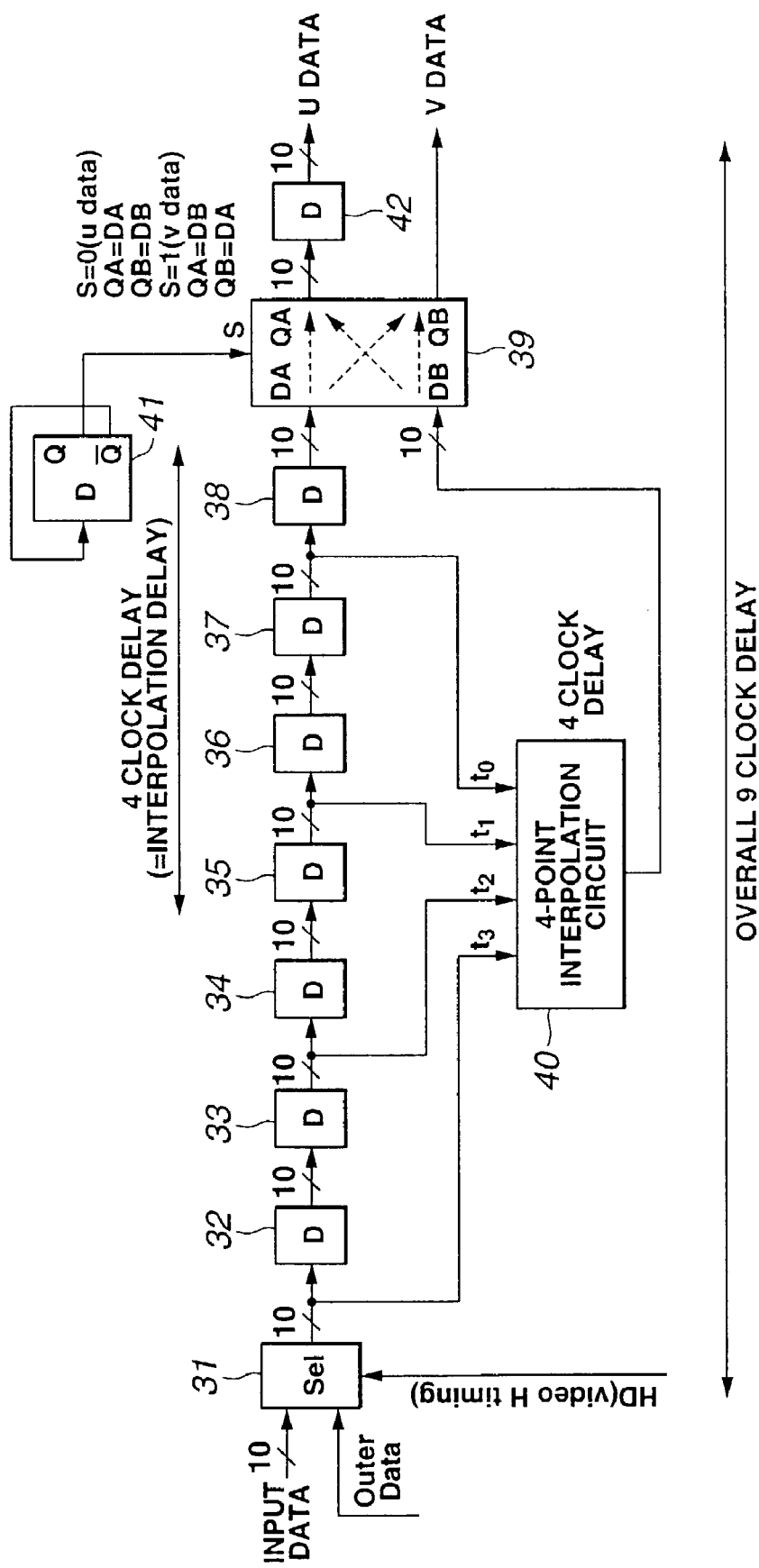
FIG. 4 is a block diagram showing an exemplary structure of a portion concerning the processing of interpolating the chroma signals U, V in the H-filter 14.

FIG. 4 is a block diagram showing the structure of a portion of the H-filter 14 pertinent to the processing of interpolating the chroma signals U, V of the H-filter 14. A selector 31 outputs chroma signals U, V, input sequentially from the upstream side, to the delay circuit (D) 32 and to a four-point interpolation circuit 40. On the other hand, delay circuits 32 to 37 and 42 output chroma signals, input from the upstream side, with a delay of one clock period, while delay circuits 33, 35 and 37 also output chroma signals, delayed by one clock period, to the four-point interpolation circuit 40. If a control signal S from a D-flipflop 41 is 0, a selector 39 sends an output of the delay circuit 38, input to its own DA terminal, from a QA terminal to a delay circuit 42, while sending an output of the four-point interpolation circuit 40, fed to its own DB terminal, at a QB terminal. If conversely a control signal S from the D-flipflop 41 is 1, the selector 39 sends an output of the delay circuit 38, input to its own DA terminal, from a QB terminal, while sending an output of the four-point interpolation circuit 40, fed to its own DB terminal, at the QA terminal to the delay circuit 42. Meanwhile, chroma signals $U_N$ and $U_{N-5}$ are output simultaneously from the selector 39, as shown in FIG. 3D.

The four-point interpolation circuit 40 interpolates chroma signals, by pipeline processing, which requires four clock periods, using the following equation:

$$(\text{Value of chroma signals to be interpolated}) =$$
$$(t_0 * C_0 + t_1 * C_1 + t_2 * C_2 + t_3 * C_3) / (C_0 + C_1 + C_2 + C_3)$$

where $t_0$ is the value of the chroma signal $U_{N-1}$ or $V_{N-1}$ for the pixel number (N-1) input from the delay circuit 37, $t_1$ is the value of the chroma signal $U_N$ or $V_N$ for the pixel number N input from the delay circuit 35, $t_2$ is the value of the chroma signal $U_{N+1}$ or $V_{N+1}$ corresponding to the pixel number (N+1) input from the delay circuit 33, $t_3$ is the value of the chroma signal $U_{N+2}$ or $V_{N+2}$ corresponding to the pixel number (N+2) input from the selector 31, and interpolation coefficients $C_0$ to $C_3$ are −163, 1187, 1187 and −163, respectively. The D-flip-flop 41 alternately outputs 0 and 1 as control signals, every clock, to the selector 39.

Figure 5:
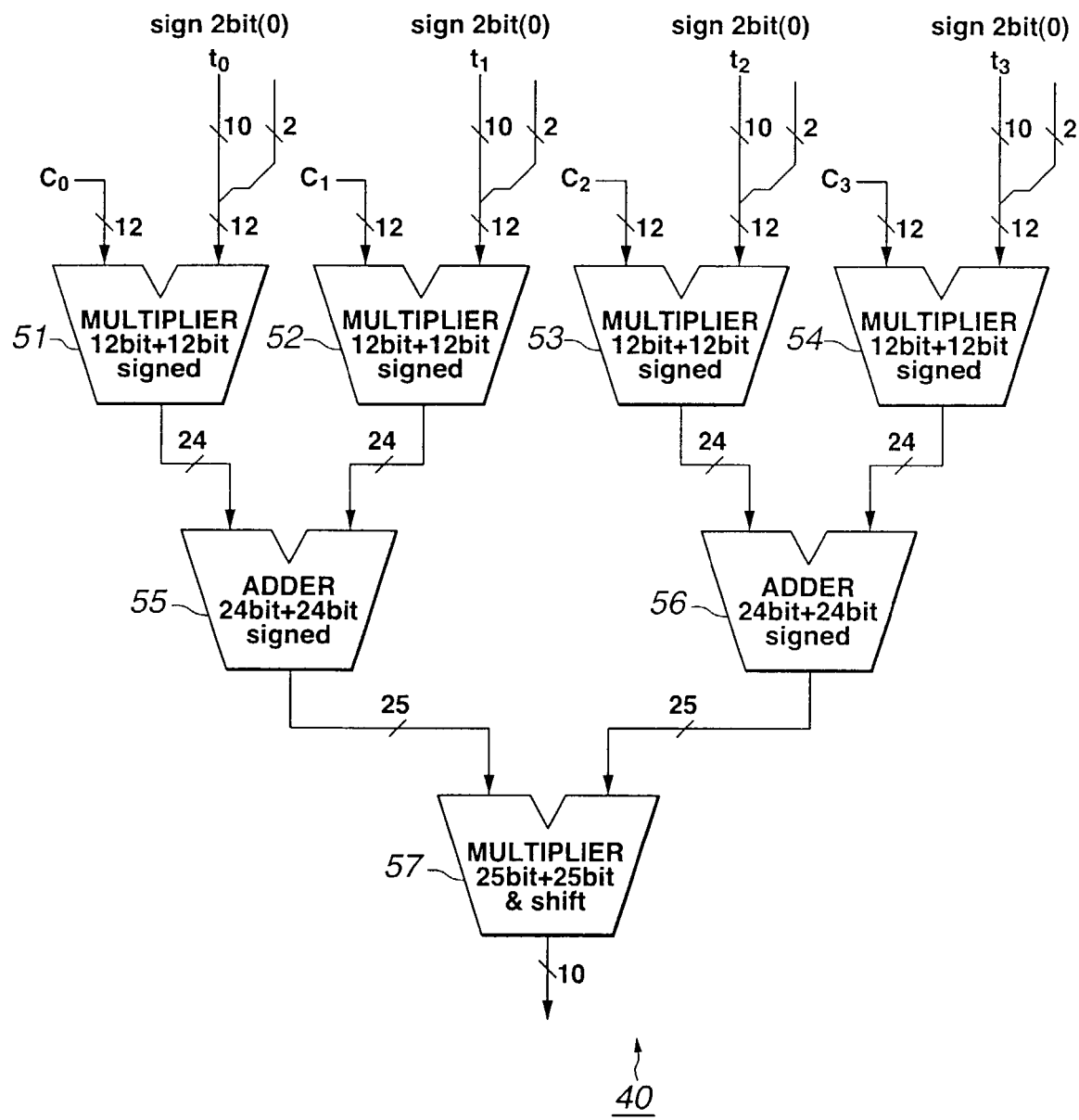
FIG. 5 is a block diagram showing an exemplary structure of a 4-point interpolation circuit 40 of FIG. 4.

FIG. 5 is a block diagram showing a specified structure of the four-point interpolation circuit 40. The four-point interpolation circuit 40 includes multipliers 51 to 54, adders 55, 56 and a multiplier 57. The multiplier 51 multiplies the value $t_0$ of the chroma signal $U_{N-1}$ or $V_{N-1}$ for the number N-1 pixel, fed from the selector 31, with an interpolation coefficient $C_0$, to send the resulting product value $t_0 * C_0$ to the adder 55. The multiplier 52 multiplies the value $t_1$ of the chroma signal $U_N$ or $V_N$ for the number N pixel, fed from the delay circuit 33, with an interpolation coefficient $C_1$, to send the resulting product value $t_1 * C_1$ to the adder 55. The multiplier 53 multiplies the value $t_2$ of the chroma signal $U_{N+1}$ or $V_{N+1}$ for the number N+1 pixel, fed from the delay circuit 35, with an interpolation coefficient $C_2$, to send the resulting product value $t_2 * C_2$ to the adder 56. The multiplier 54 multiplies the value $t_2$ of the chroma signal $U_{N+2}$ or $V_{N+2}$ for the number N+2 pixel, fed from the delay circuit 37, with an interpolation coefficient $C_3$, to send the resulting product value $t_3 * C_3$ to the adder 56. The adder 55 sums the product value $t_0 * C_0$ from the multiplier 51 to the product value $t_1 * C_1$ from the multiplier 52 to send the resulting sum value $t_0 * C_0 + t_1 * C_1$ to the multiplier 57. The adder 56 sums the product value $t_2 * C_2$ from the multiplier 53 to the product value $t_3 * C_3$ from the multiplier 54 to send the resulting sum value $t_2 * C_2 + t_3 * C_3$ to the multiplier 57. The multiplier 57 sums the sums the sum value value $t_0 * C_0 + t_1 * C_1$ from the adder 55 to the sum value $t_2 * C_2 + t_3 * C_3$ from the adder 56 and divides the resulting sum by the sum total value of the interpolation coefficients $C_0$ to $C_3$ to output the resulting quotient as a value of the chroma signal $U_{N+0.5}$ or $V_{N+0.5}$ for the number N+0.5 pixel.

Figure 3E:
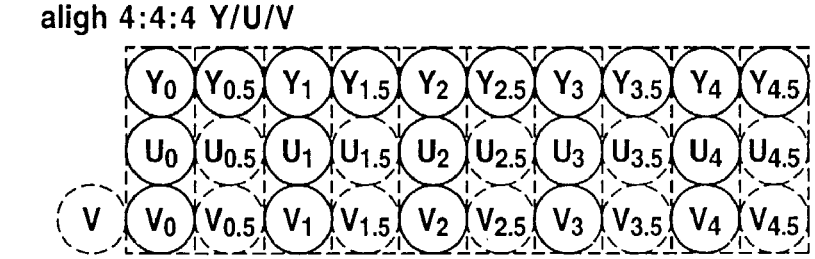

The operation of a functional block pertinent to the processing of interpolating chroma signals U, V is now explained. If, at clock timing $t_0$, the selector 31 and the delay circuits 32 to 38 output chroma signals $V_4, U_4, V_3, U_3, V_2, U_2, V_1, U_1$ to the downstream side circuitry, a chroma signal $V_{2.5}$ is interpolated by the four-point interpolation circuit 40 in the next following four clock periods. Thus, at clock timing $t_4$, a chroma signal $U_3$ is applied from the delay circuit 38 to the DA terminal of the selector 39, whilst a chroma signal $V_{2.5}$, interpolated by the four-point interpolation circuit 40, is applied to its DB terminal. At this time, in synchronism with a control signal S=0 from the D-flipflop 41, the selector 39 outputs the chroma signal $U_3$, input to its DA terminal, to the delay circuit 42 from its QA terminal, while outputting a chroma signal $V_{2.5}$, input to the DB terminal and interpolated, at its QB terminal. In synchronism therewith, the delay circuit 42 outputs the chroma signal $U_{2.5}$, interpolated one clock before and delayed. So, the H-filter 14 simultaneously outputs chroma signals $U_{N+0.5}$, $V_{N+0.5}$, associated with the number (N+0.5) pixel, as shown in FIG. 3E.

Since the HDFF 11 eliminates high frequency components of the 4:2:2 picture signals and interpolates chroma signals for converting the signals to 4:4:4 picture signals, it becomes possible to treat the luminance signals Y and the chroma signals U, V in terms of the same spatial frequency for respective pixels. This allows to perform color spotlight processing or trailing accompanied by color changes by way of processing for picture color manipulating operations.

Figure 6:
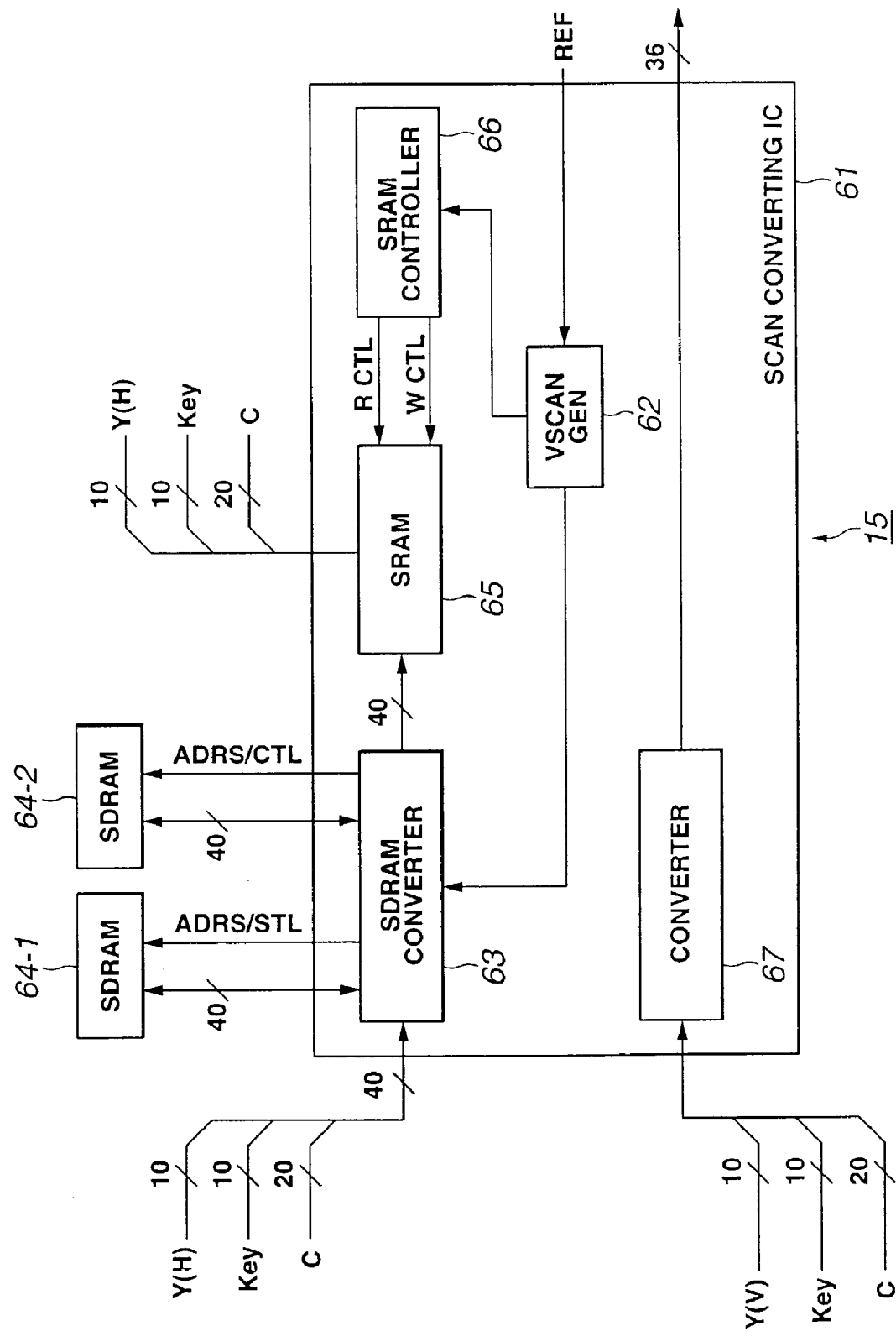
FIG. 6 is a block diagram showing an exemplary structure of a scan converter 15.

FIG. 6 shows a block diagram showing the configuration of the scan converter 15 adapted for converting the scanning direction of the 4:4:4 picture signals, input in the horizontal scanning sequence from the HDFF 11, from the horizontal direction to the vertical direction. The scan converter 15 includes a scan converting IC 61, formed e.g., by FPGA, and SRAMs (Synchronous Dynamic Random Access Memories) 64-1, 64-2. Based on the horizontal scanning timing, represented by a signal REF, supplied from outside, a V-scan generator 62 of the scan converting IC 61 generates a signal, representing the associated vertical scanning timing, which is output to an SDRAM controller 63 and to an SRAM controller 66. The SDRAM controller 63 switches the 4:4:4:4 picture signals, input from the HDFF 11, on the field basis, to store the so read-out signals in the SDRAMs 64-1 and 64-2. The SDRAM controller 63 also reads out the picture signals stored in the SDRAMs 64-1 and 64-2 in a preset sequence, as later explained, to output the so read-out signals to the SRAM (Static Random Access Memory) 65. The SRAM 65, having a capacity per block of 2 bits*2048, uses four memories, each comprised of 20 blocks, and caches picture signals, input from the SDRAM controller 63, to output the so cached picture signals to the VDFF 16, under control by the SRAM controller 66. A converter 67 curtails the information volume of chroma signals U, V of the picture signals, input in the vertical scanning sequence from the VDFF 16, from the 10-bit width to the 8-bit width, in a manner to be explained in detail subsequently by referring to FIG. 18. The converter 67 also converts the field picture to a frame picture in case the picture signals input from the VDFF 16 are of the SD format, in a manner to be explained in detail subsequently by referring to FIG. 47.

Figure 7:
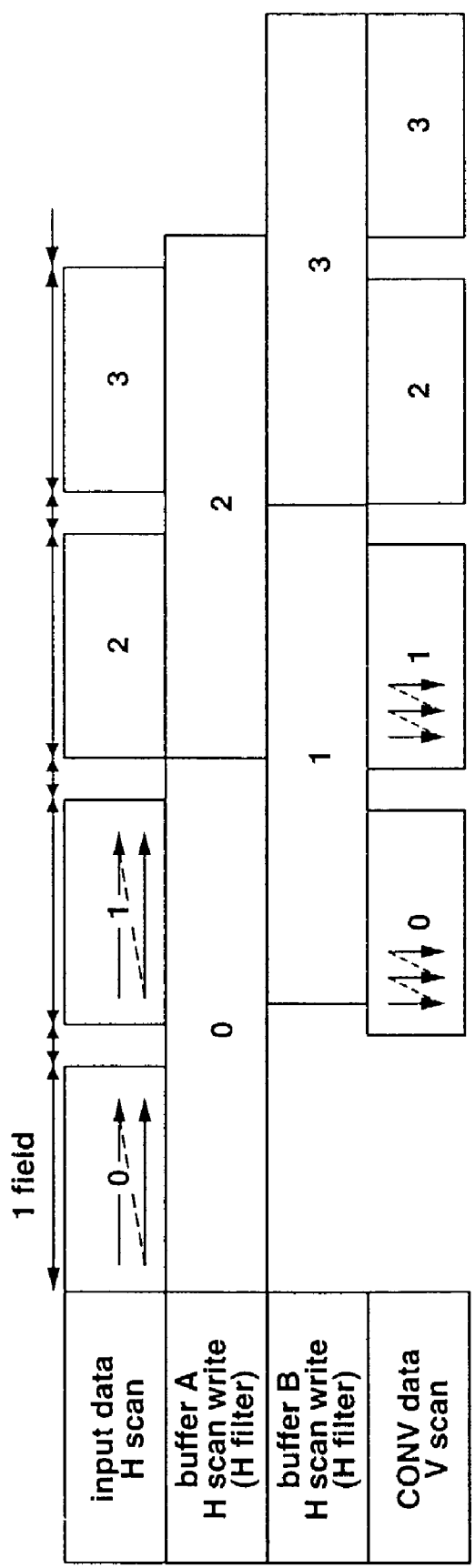
FIG. 7 grossly shows the progress with time of the processing of changing the scanning direction of the scan converter 15 to a perpendicular direction on the field basis.

FIG. 7 shows the gross progress with time of the processing of converting the scanning direction to the vertical direction on the field basis. In FIG. 7 ff., the buffers A and B are associated with one and the other of the SDRAMs 64-1 and 64-2.

Figure 8B:
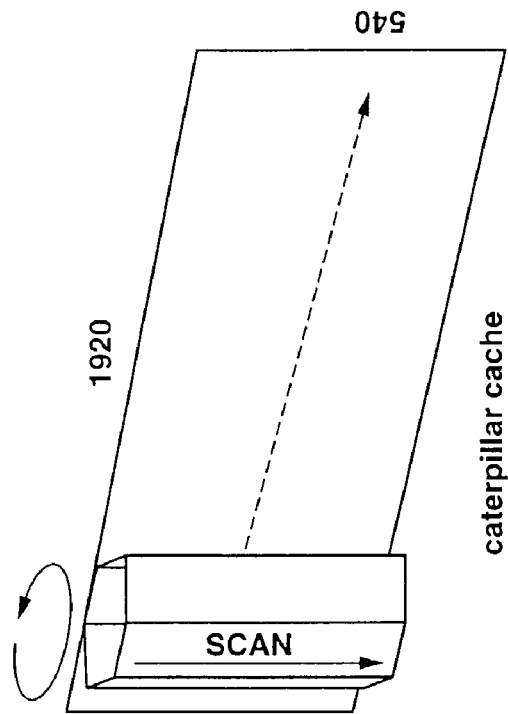
FIGS. 8A, 8B schematically show the relationship between SDRAMs 64-1, 64-2 burst-transferring picture signals stored on the field basis in the sequence of vertical scanning and an SRAM 65 caching the burst-transferred picture signals.
Figure 8A:
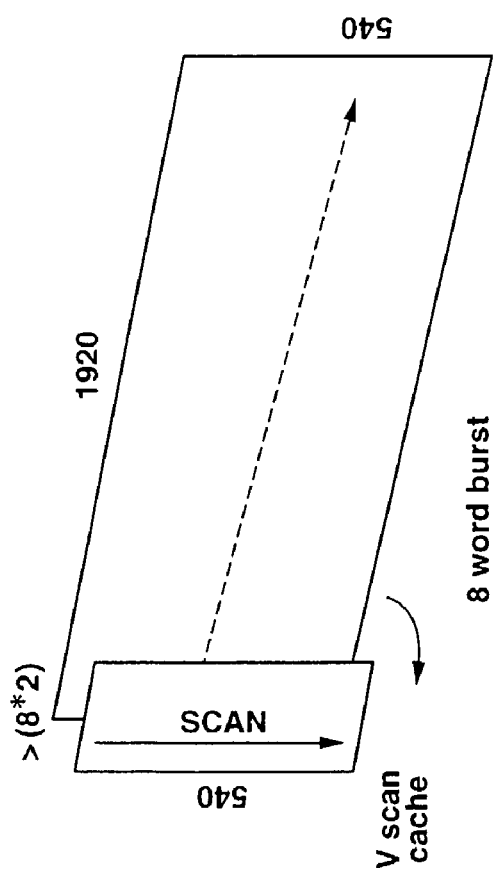
Figure 9:
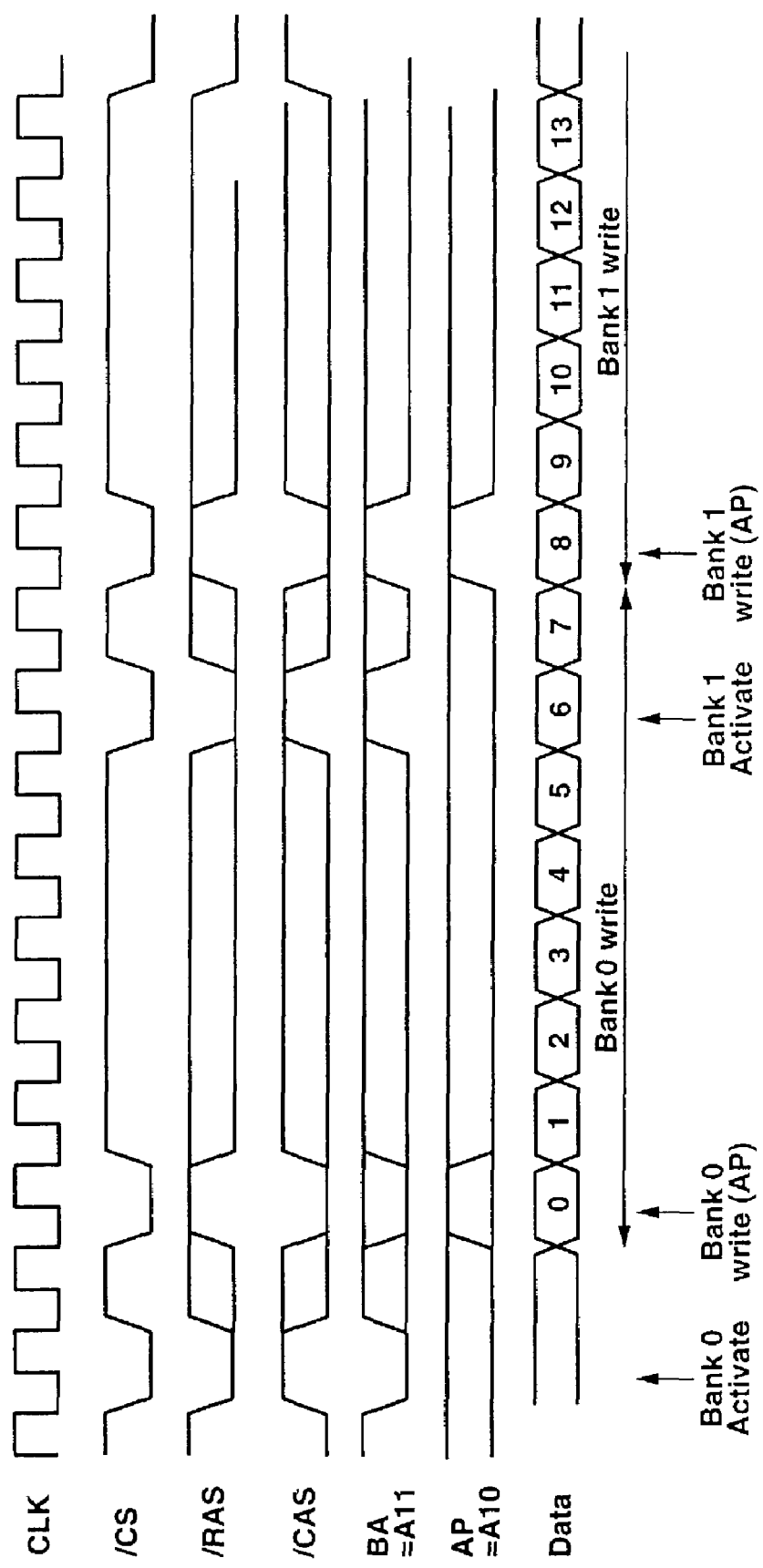
FIG. 9 shows an exemplary timing of continuous accessing to two sorts of banks of the SDRAM 64.

FIGS. 8A, 8B schematically show the relationship between the SDRAMs 64-1 and 64-2, adapted for burst-transferring picture signals, stored on the field basis, in the vertical scanning sequence, and the SRAM 65, adapted for caching the burst-transferred picture signals. Specifically, the SRAM 65 operates as if it is moving in the horizontal direction from left to right of the picture, like a caterpillar, as it scans the picture signals, stored in the SDRAMs 64-1 and 64-2, in the vertical direction, for caching the picture signals. It is noted that, if the amount of transfer per unit time in the inputting direction to the SDRAMs 64-1 and 64-2 in the horizontal scanning direction is equal to that in the outputting direction to the SRAM 65 in the vertical scanning sequence, stable operation is warranted for the system. That is, there is no risk of the read address outrunning the write address in the SDRAMs 64-1 and 64-2. Meanwhile, should there be no necessity for demarcating the SDRAMs 64-1 and 64-2, these are referred to simply as the SDRAM 64. As characteristic of the SDRAM, if burst transfer (auto pre-charge 4 word burst) of an optimum width is carried out alternately on plural, such as two, banks, continuous access (read or write) is warranted. FIG. 9 shows a timing chart of the continuous access (write burst) in alternate burst to the two sorts of banks exploiting these characteristics.

Figure 10:
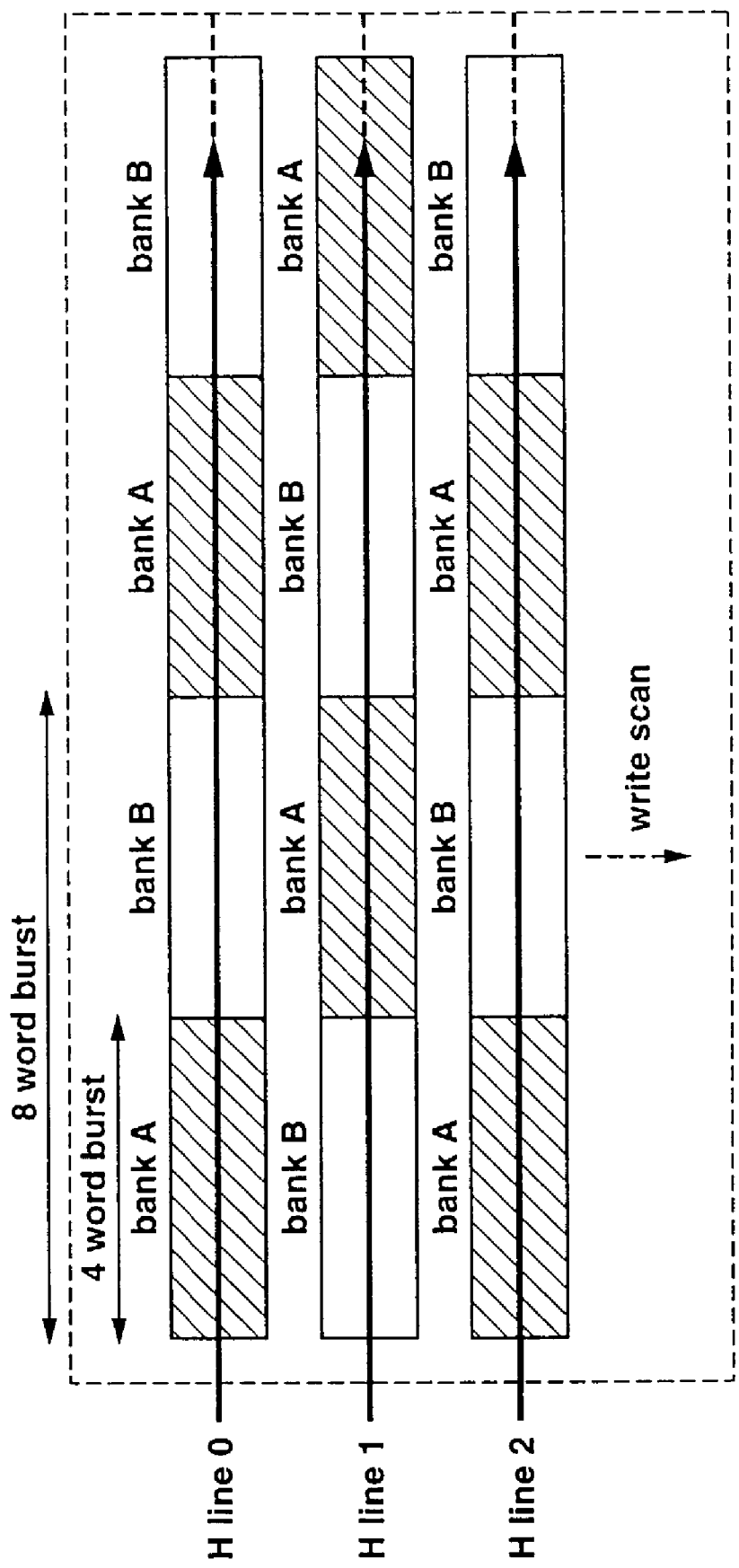
FIG. 10 shows continuous accessing (writing) to the SDRAM 64.
Figure 11:
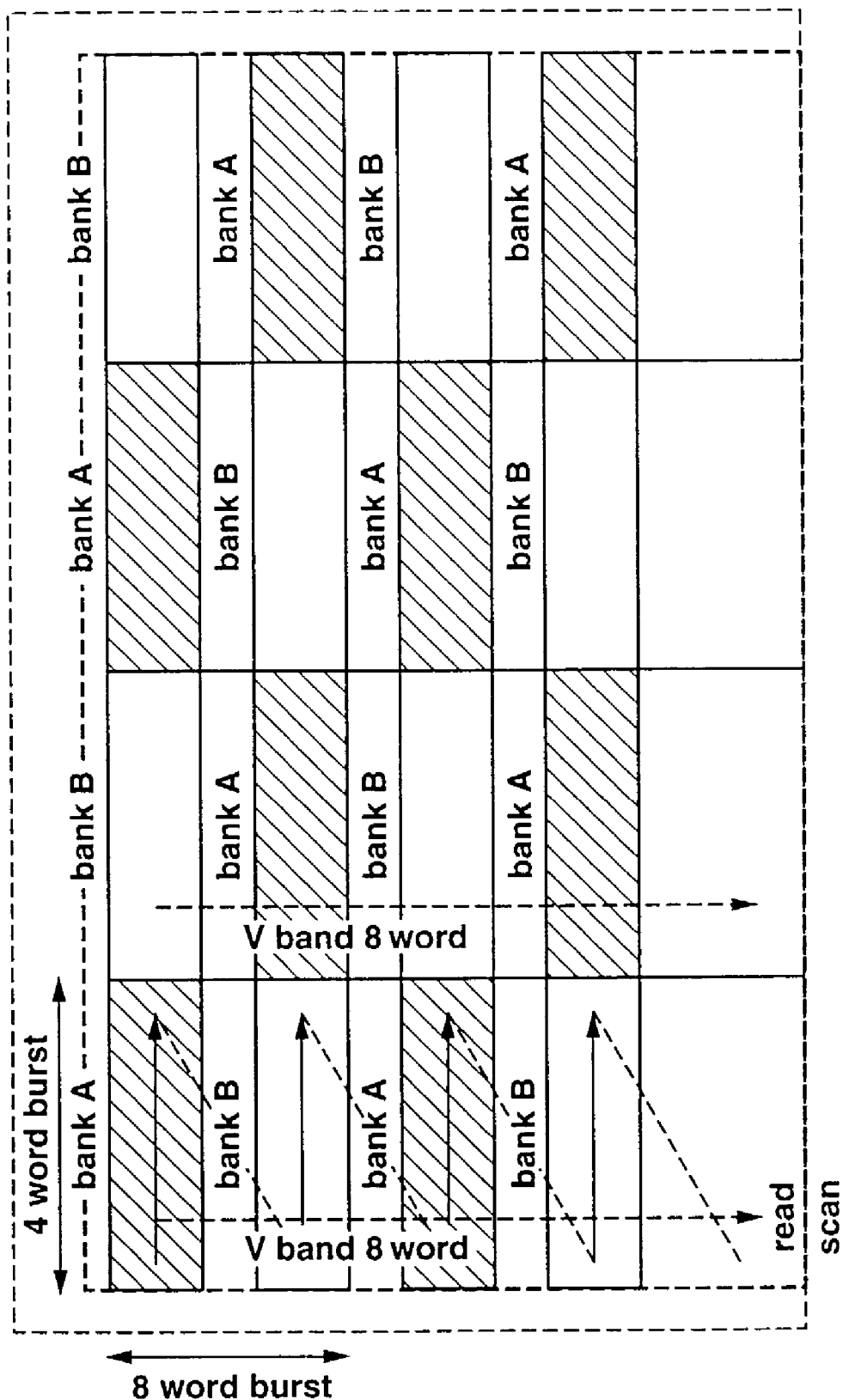
FIG. 11 illustrates continuous accessing (readout) to the SDRAM 64.

Specifically, the picture signals written in the horizontal scanning sequence on the SDRAM 64 are burst-transferred, every eight words, that is at a rate of four words for each bank, as shown in FIG. 10. On the other hand, the picture signals, read out in the vertical scanning sequence from the SDRAM 64, are also burst-transferred, every eight words, that is at a rate of four words from each bank, as shown in FIG. 11. It is noted that a word means the information volume of 40 bits representing luminance signals Y (10 bits), chroma signals U, V (each 10 bits) and key signals K (10 bits) corresponding to one pixel. If the picture signals, burst-transferred at a rate of eight words, corresponding to two rectangular areas in FIG. 11, to the SRAM 65, and cached therein, are read out with a delay of time corresponding to four vertical scanning, from the SRAM 65, the SRAM 65 may be of the smallest capacity corresponding to two rectangular areas equal to 0.4% of one field.

Figure 12:
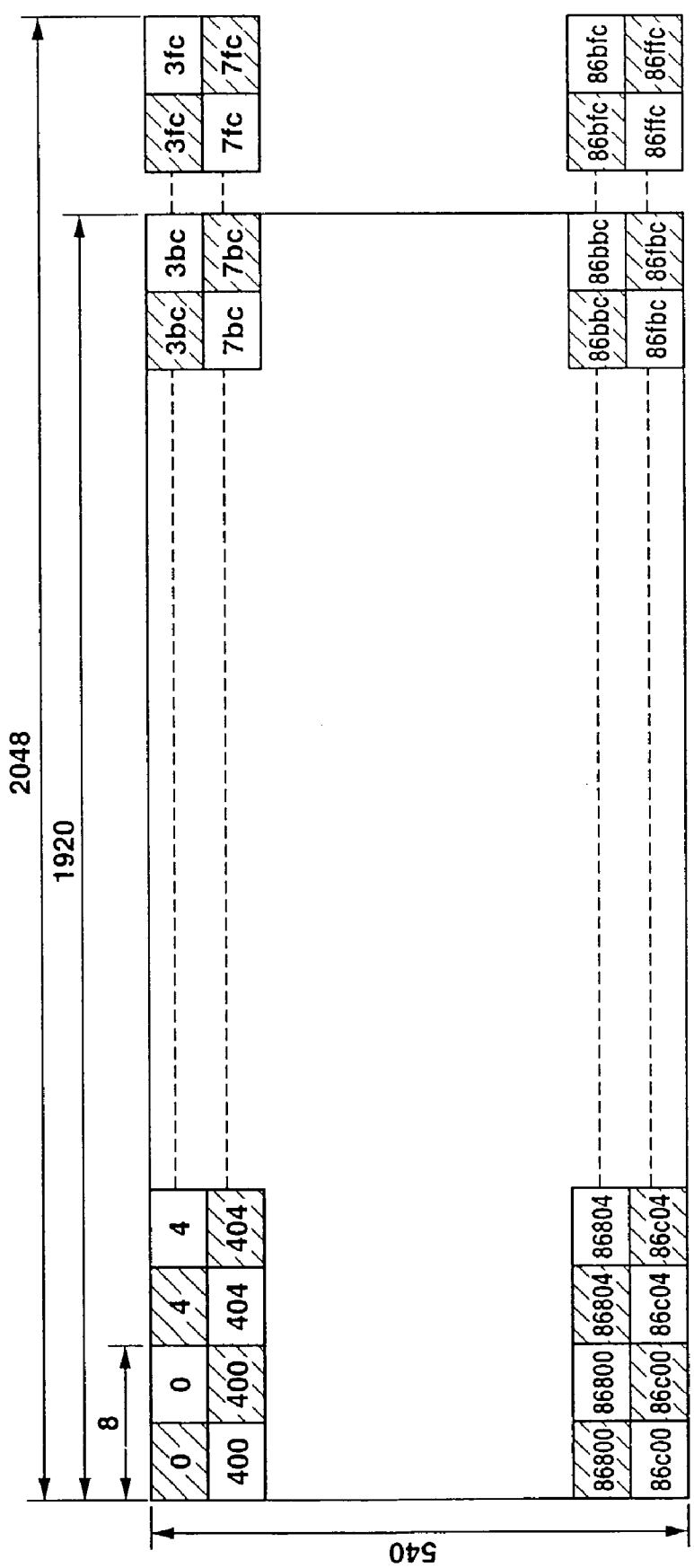
FIG. 12 shows exemplary two-dimensional address allocation in 2-bank 4-word burst of picture signals of the HD format (1080ix1920) for the SDRAM 64.
Figure 13:
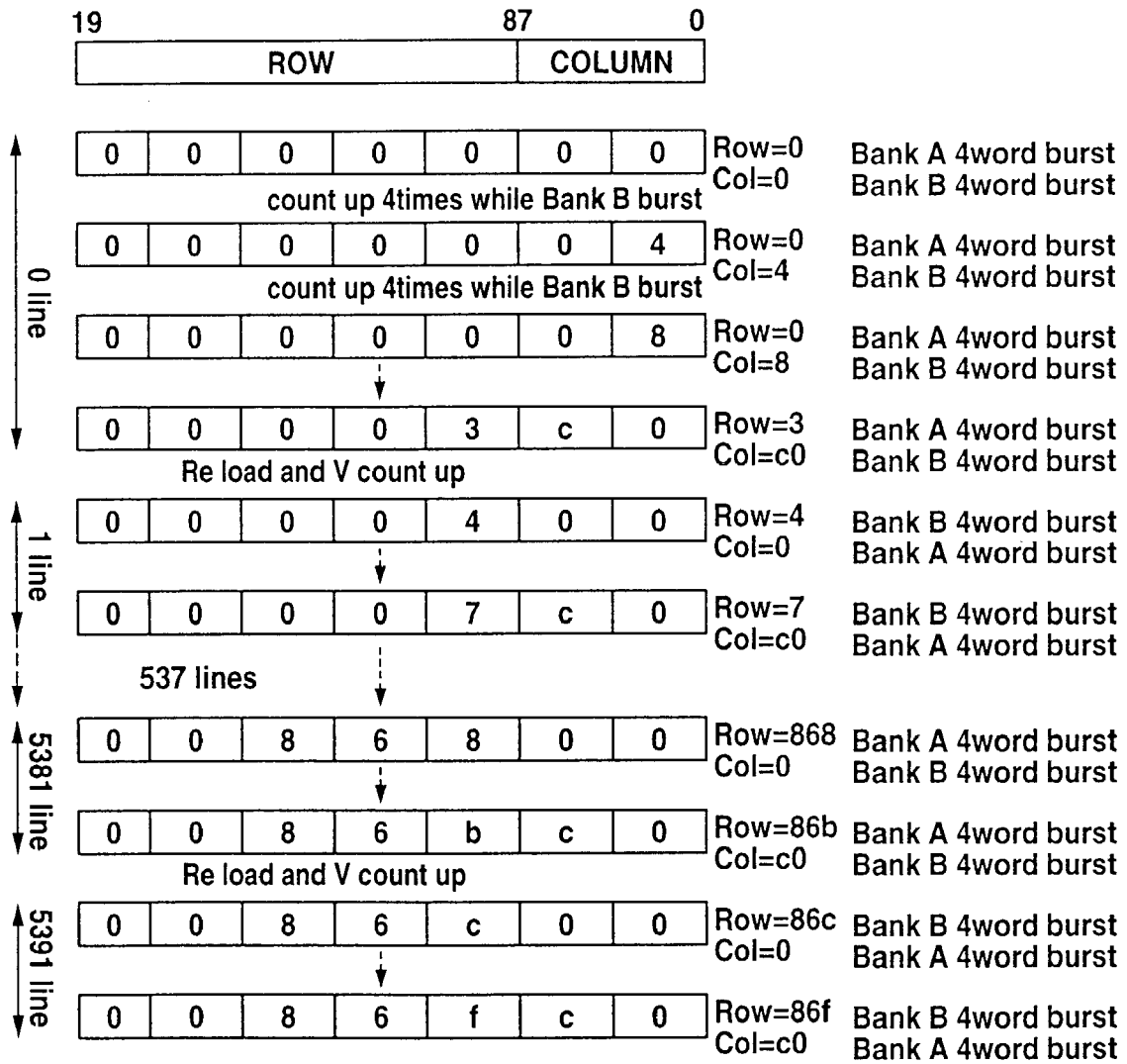
FIG. 13 illustrates a counter mechanism for generating write addresses for the SDRAM 64.

FIG. 12 shows an instance of two-dimensional address allocation of in 2-bank 4-word burst of picture signals of the HD format (1080i×1920) to the SDRAM 64. Referring to FIG. 12, the leading address of the burst is controlled, during writing, so that the address will be written at an address matched to horizontal scanning. In readout, a band of a burst size width is accessed. The write addresses for the SDRAM 64 are generated by a counter mechanism comprised of an upper counter (ROW) and a lower counter (COLUMN), shown in FIG. 13, satisfying the following conditions:

(1) Count-up is by a state machine outputting 4-word bursts as one out of two occurrences. The next time counting occurs during accessing to the late accessed bank.

(2) The counter re-load and 2K up is carried out at 0x3c0. 1 k is summed to the reload data each time lower order 0x3c0 is counted.

(3) When the value of the upper counter reaches 540, one field is finished.

Figure 14:
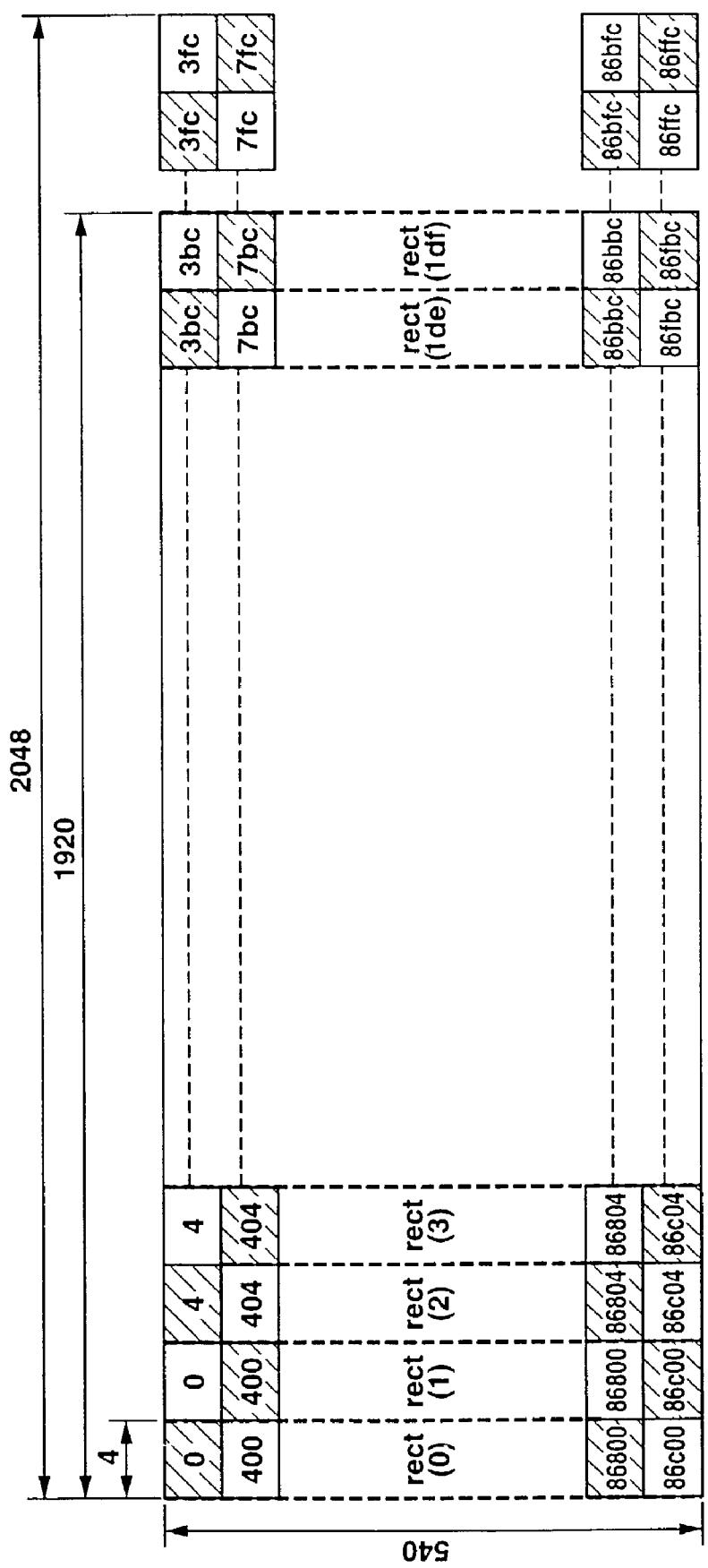
FIG. 14 shows the continuous readout sequence from the SDRAM 64.

FIG. 14 shows the sequence of continuous-readout from the SDRAM 64. Using the 4 word burst 2 bank ping-pong access, readout is to be performed continuously so that the writing area in the SRAM 65 will be in terms of a strip (rectangular(n): n=1, 2, ..., 1 df) comprised of 540 4-word rectangular areas of FIG. 11. The readout addresses from the SDRAM 64 is generated by a counter mechanism, comprised of an upper order counter (ROW) and a lower order counter (COLUMN), shown in FIG. 15, satisfying the following conditions:

(1) The lower order counter is re-loaded each time. As for the re-loading value, 4-word count-up occurs when the value of the upper order counter reaches 540.

(2) When the value of the lower order counter reaches 0x3c0 and the value of the upper order counter reaches 540, the operation is finished.

(3) The reloading and 2K up of the upper order counter occur for each 4 word burst ping-pong.

(4) When the upper order counter reaches 540, the reloading of one strip unit (4 words*540 lines) is finished.

The picture signals, read out in terms of a strip as a unit from SRAM 64, are cached in the SRAM 65 and subsequently accessed. However, the accessing sequence is fixed and completely synchronous so that fully synchronous prediction control occurs instead of the associative control structure as in the case of the general-purpose cache.

Figure 15:
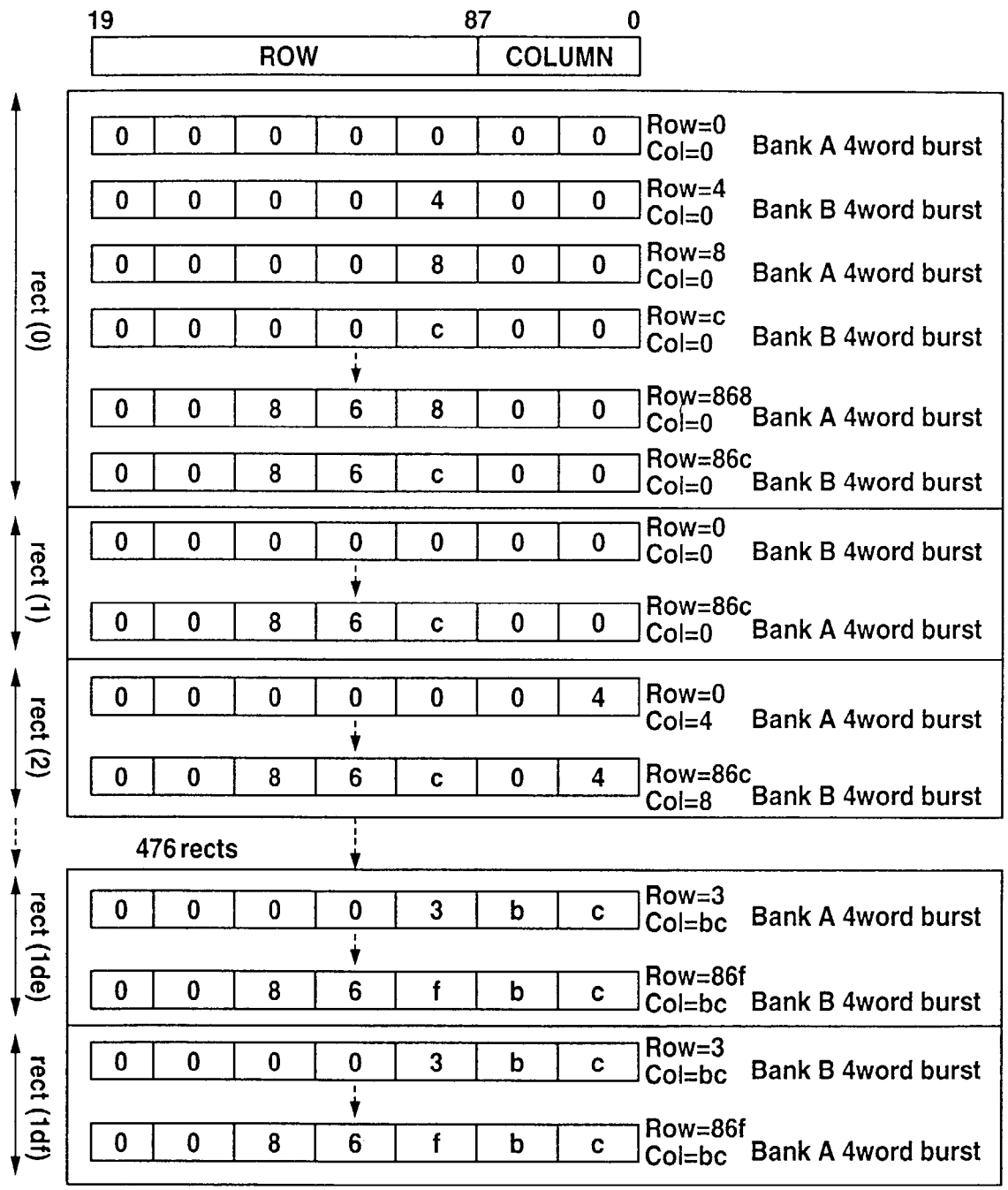
FIG. 15 illustrates a counter mechanism for generating read addresses for the SDRAM 64.
Figure 16:
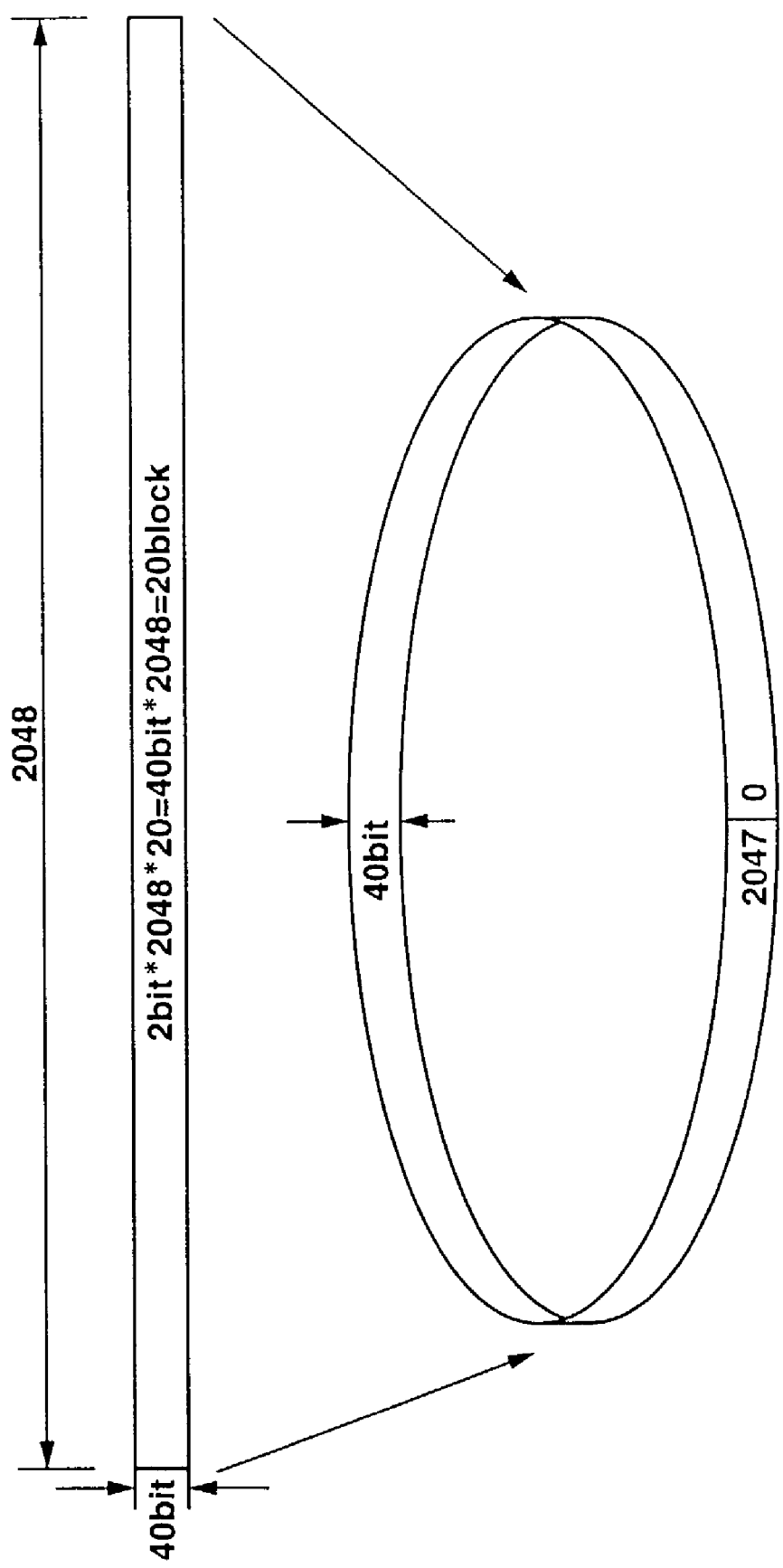
FIG. 16 shows the concept of using a memory forming the SRAM 65 as a ring.
Figure 17A:
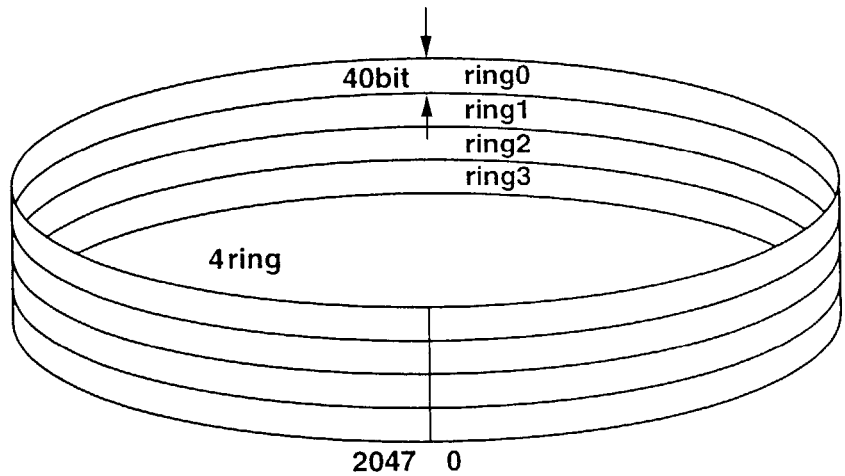
FIGS. 17A to 17C show the concept of using four memories forming the SRAM 65 as a four-fold ring.
Figure 17B:
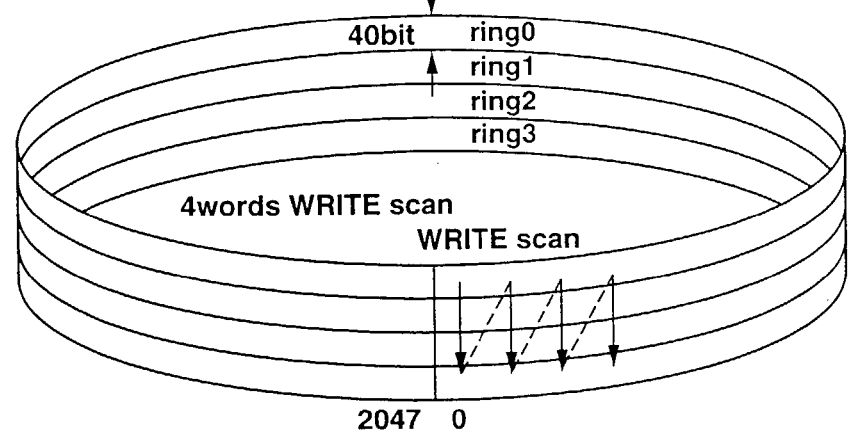
Figure 17C:
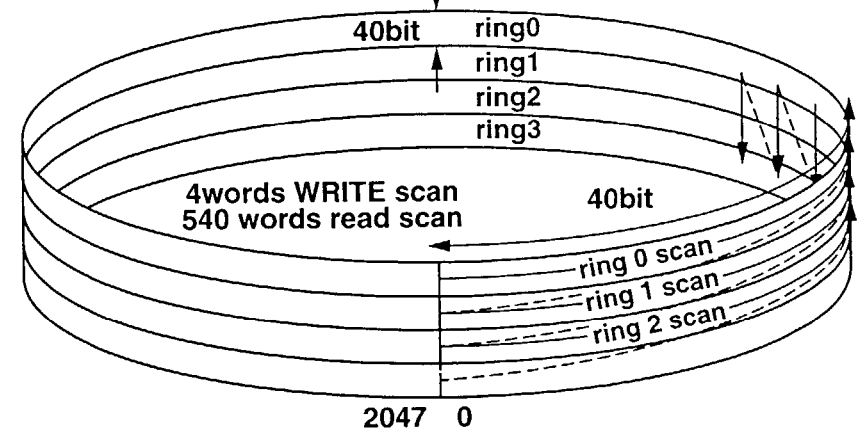

FIG. 16 shows a concept of using four memories making up the SRAM 65 (2 bits*2048*20 blocks) as rings each being 40 bits in width (one word) *2048. In actuality, four rings shown in FIG. 16 are stacked to form a 160-bit-width*2048 caterpillar (FIG. 8B), as shown in FIG. 17A. Specifically, the 4-word rectangular area, read out from the SDRAM 64 in the sequence shown in FIG. 15, is sequentially written word-by-word in the rings 0 to 3 as shown in FIG. 17B. After delay by time corresponding to three vertical scanning, the so written words are read out in the circumferential direction of the ring, as shown in FIG. 17C. By the above-described sequence of operations, it becomes possible to change the scanning direction of the picture signals from the horizontal to the vertical in real-time to output the picture signals to the downstream side VDFF 16. The picture signals, input to the VDFF 16, are processed with one-dimensional low-pass filtering in the vertical direction and again input to the scan converter 15 so as to be thence sent to the converter 67.

The processing of the converter 67 in converting the 4:4:4:4 picture signals of the 40 bit width, input in the vertical scanning sequence from the VDFF 16, into picture signals of 36 bit width, with a view to adapting the signals to the downstream side buffer 20 employing eight ZBT SRAMs of 36 bit widths, is hereinafter explained.

Figure 18:
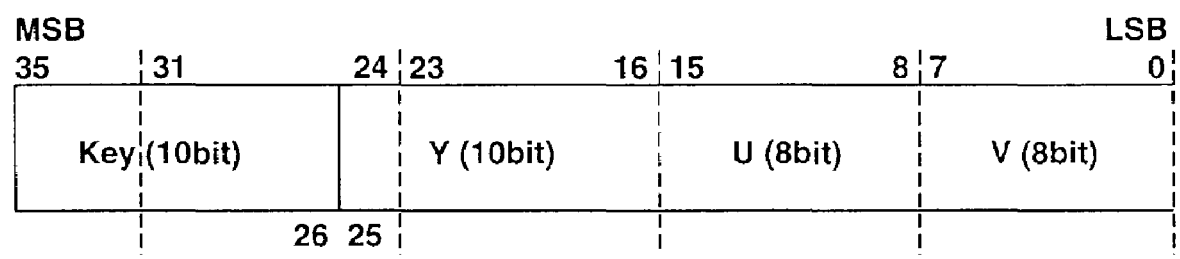
FIG. 18 illustrates the processing of converting picture signals (Y/U/V/K) into 36-bit width signals by a converter 67 curtailing the values of chroma signals U, V to 8 bits.

Referring to FIG. 18, the converter 67 converts the picture signals (Y/U/V/K) to a 36 bit width by curtailing the values of the chroma signals U, V in the 4:4:4:4 picture signals of the 40 bit width (made up of 10 bits of the luminance signals Y, 10 bits of chroma signals U, 10 bits of chroma signals V and 10 bits of key signals K), input from the VDFF 16 in the vertical scanning sequence, which chroma signals ultimately revert the spatial frequency characteristics to one-half, to respective 8 bits by rounding or truncation, to output the resulting signals to the downstream side buffer 20. Meanwhile, the curtailment of the bit width of the chroma signals U, V is not limited to that to 8 bit width. Specifically, the curtailing width may be appropriately changed, such as by curtailing the chroma signals U to 9 bits and curtailing the chroma signals V to 7 bits.

With the above-described converter 67, it is possible to adapt the bit width of the picture signals of the picture signals (Y/U/V/K) to the ZBT SRAM of the 36-bit width in the downstream side buffer 20, without impairing the information volume of the luminance signals Y nor that of the key signals critical in digital video effect.

Figure 19:
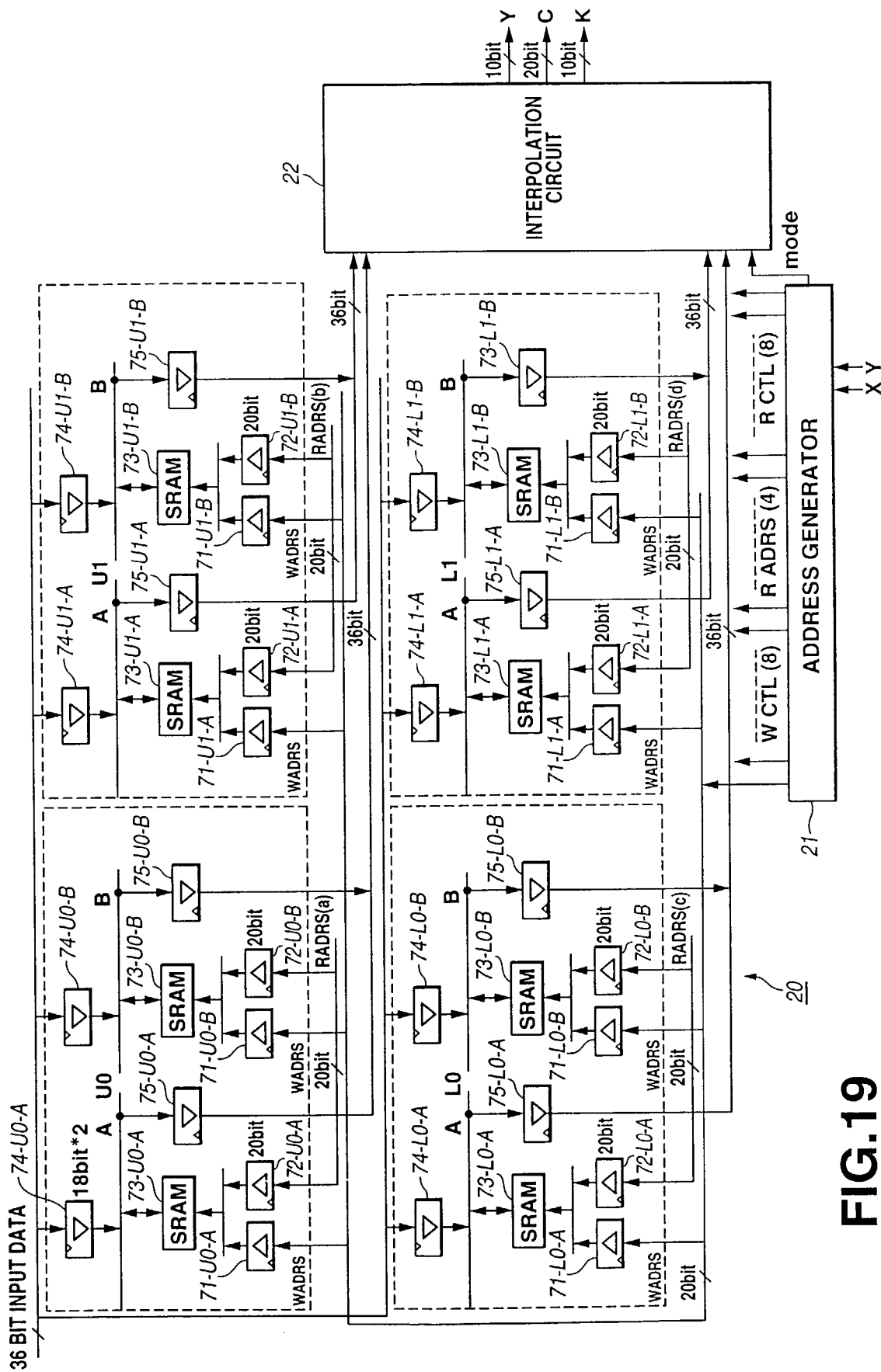
FIG. 19 is a block diagram showing n illustrative structure of a buffer 20.
Figure 20:
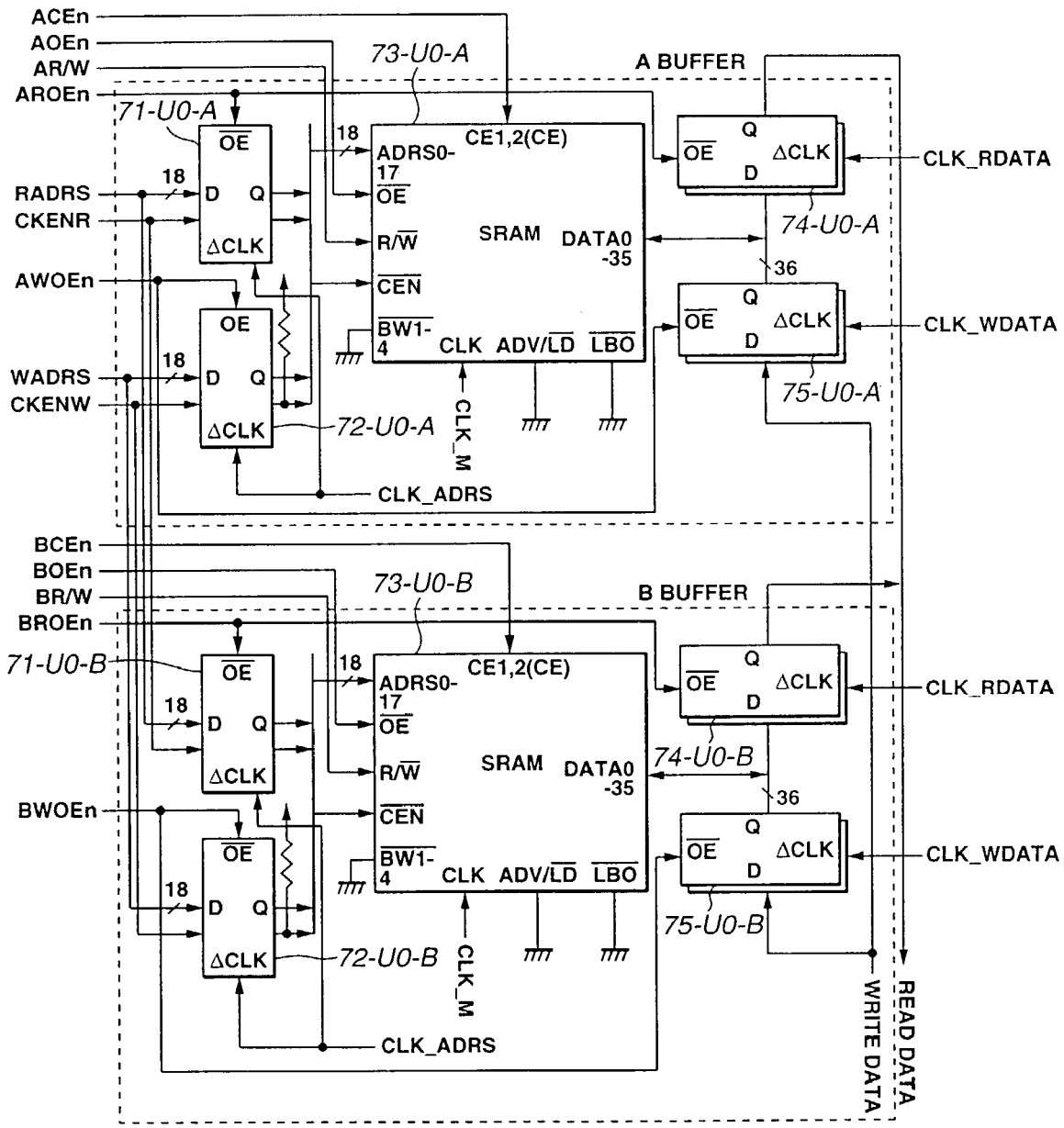
FIG. 20 is a block diagram showing an illustrative structure of unit U0 of the buffer 20.

FIG. 19 shows a detailed exemplary structure of the buffer 20, made up of four units U0, U1, L0 and L1, that may be read out simultaneously. FIG. 20 shows an exemplary structure of the unit U0, which is of a double-buffer structure comprised of an A-buffer comprised of an SRAM 73-U0-A and a B-buffer comprised of an SRAM73-U0-B. Thus, the unit U0 is capable of performing two-dimensional readout and concurrent writing. Similarly, each of the units U0 to L1 is also of the double buffer structure to provide for two-dimensional readout and concurrent writing. Meanwhile, if there is no necessity of demarcating the SRAM 73-U0-A to 73-L1-B from each other, the SRAMs are collectively referred to as SRAM 73.

Figure 21A:
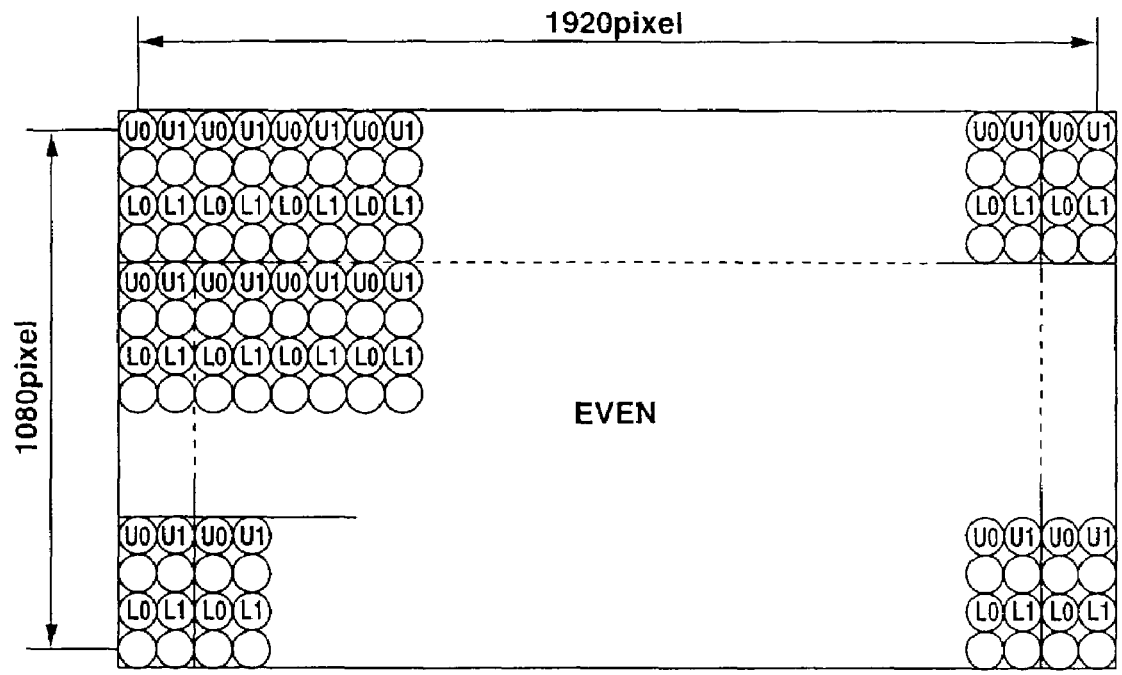
FIGS. 21A and 21B show allocation to units U0 to L1 of HD format picture signals input from the scan converter 15.
Figure 21B:
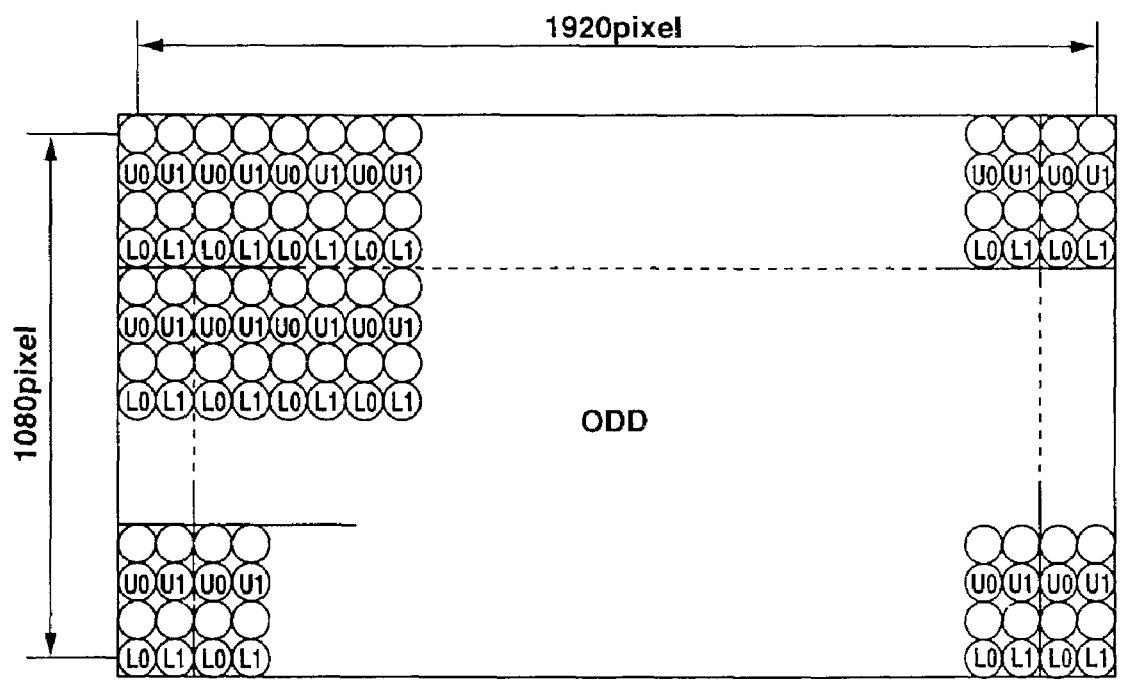

FIG. 21 shows allocation of picture signals input from the scan converter 15 to the units U0 to L1. That is, in writing the picture signals of the even field, output by the scan converter 15, in the buffer 20, the two neighboring pixels on the number m horizontal scanning line, where m=0, 2, 4, . . . , and two neighboring pixels on the number (m+2) horizontal scanning line directly below the first stated pixels, totaling at four pixels, are written in the A-buffers of respective different units U0 to L1, as shown in FIG. 21A. Also, in writing the picture signals of the odd field, output by the scan converter 15, in the buffer 20, the two neighboring pixels on the number (m+1) horizontal scanning line, where m=0, 2, 4, . . . , and two neighboring pixels on the number (m+3) horizontal scanning line directly below the first stated pixels, totaling at four pixels, are written in the B-buffers of respective different units U0 to L1, as shown in FIG. 21B. By writing the four pixels, neighboring to one another in the vertical and transverse directions, in the respective different units U0 to L1, these can be read out simultaneously, thus enabling the operation of interpolating a pixel, lying centrally of the four pixels with the picture signals of the four pixels, to be performed efficiently.

Figure 22:
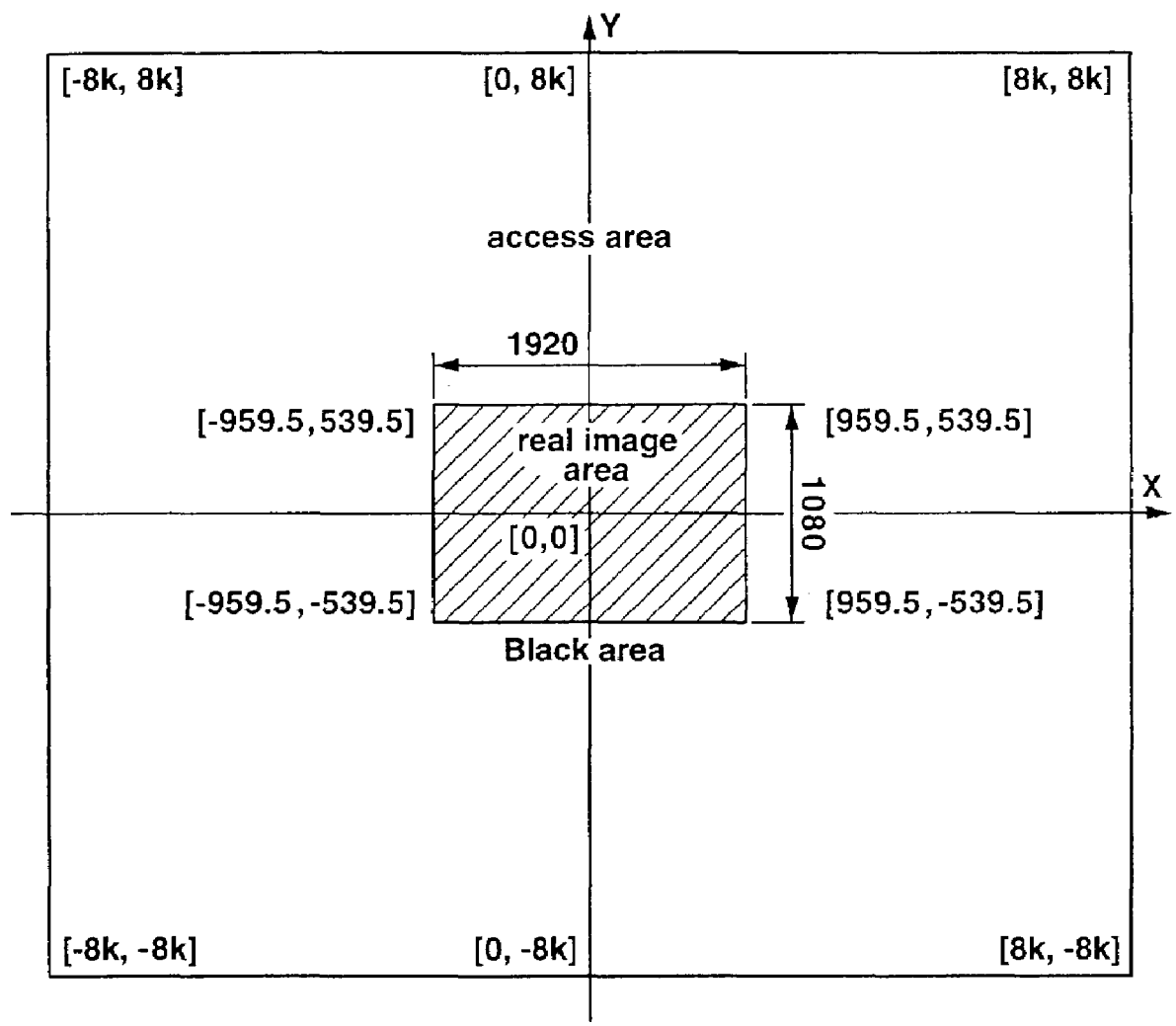
FIG. 22 shows a coordinate system of read-out addresses set in the buffer 20.
Figure 23:
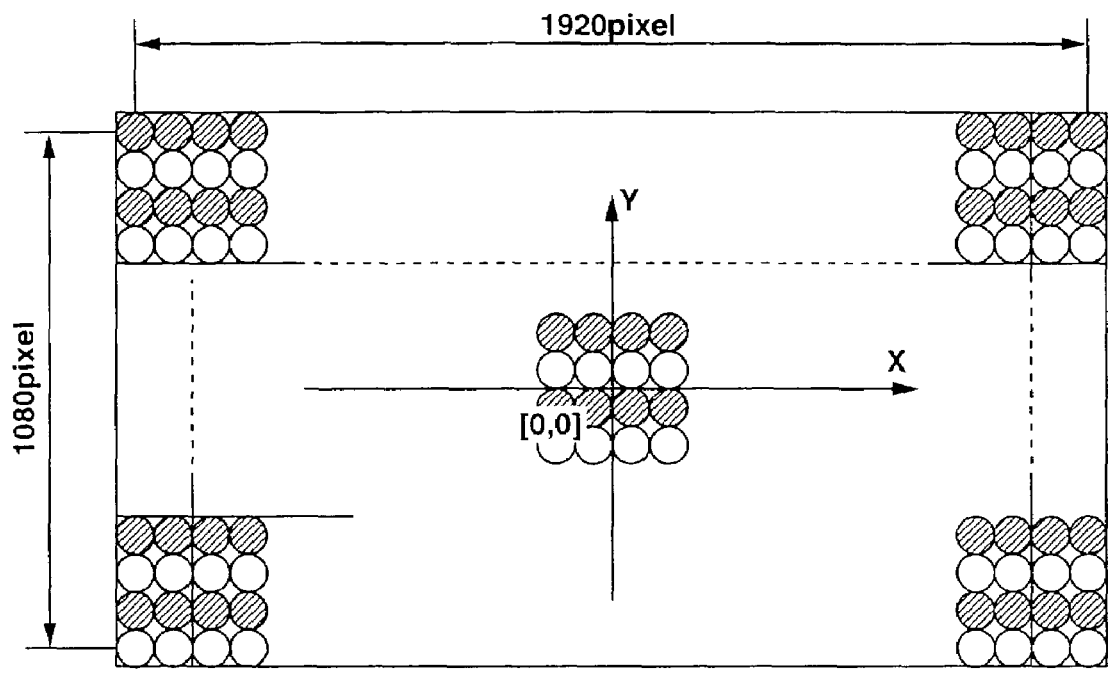
FIG. 23 shows the state of the writing of even-field picture signals in a data area of the buffer 20.

Referring to FIGS. 22 to 28, an ex-area data band (black area), to be set around the data area carrying the written picture signals (real image data) in an effective access area of the buffer 20, is explained with reference to FIGS. 22 to 28. FIG. 22 shows a coordinate system of read-out addresses, also termed linear addresses, as set in the buffer 20, while FIG. 23 shows the state in which even-field picture signals are being written in the data area (real image area) shown in FIG. 22.

In general, in reading out picture signals written in the buffer 20, the readout addresses on the buffer 20 are determined based on the addresses on the display when the picture signals processed with digital effect by the DME 3 are demonstrated on a display. The addresses on the display are herein termed screen addresses. The relationship between the screen addresses and the read addresses will be explained subsequently in detail by referring to FIG. 29.

Figure 24:
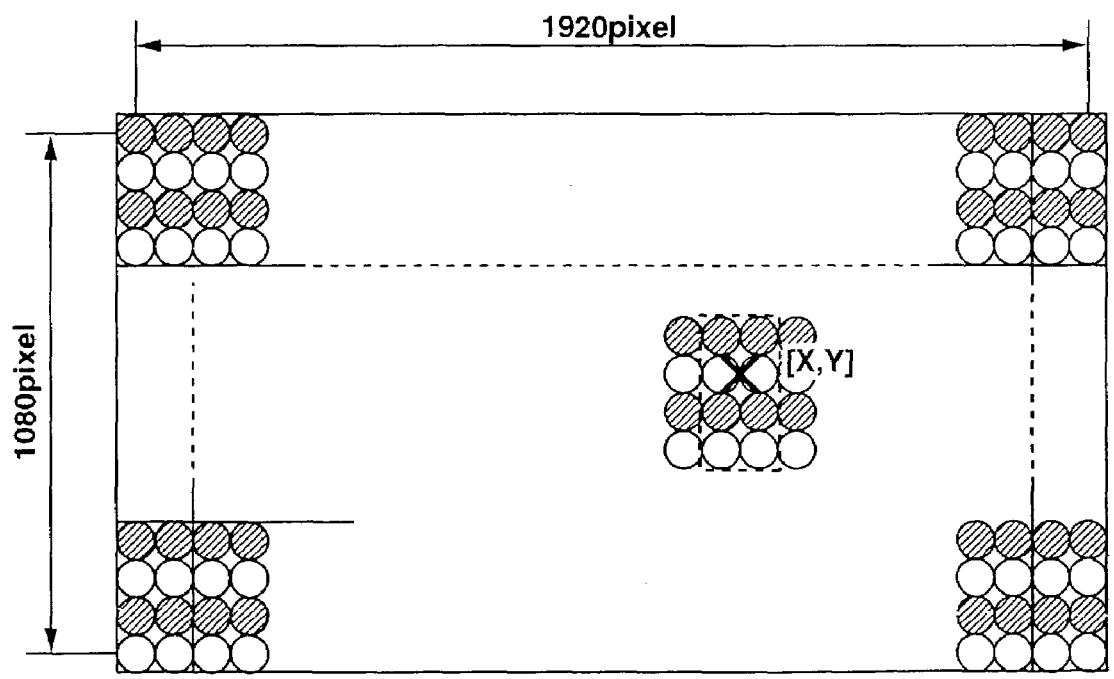
FIG. 24 shows positions of four pixels used for four-point interpolation processing.

If the readout address [X, Y] are determined at the positions indicated with x in FIG. 24, the picture signals of the four pixels lying at upper and lower and left and right positions relative to the readout address [X, Y] are read out and sent to the interpolation circuit 22 to interpolate the picture signals of the pixel lying at the readout address [X, Y]. It should be noted that the interpolation processing employing four pixels is for picture signals of the HD format and that the interpolation processing employing 16 pixels is applied to the picture signals of the SD format.

Figure 25:
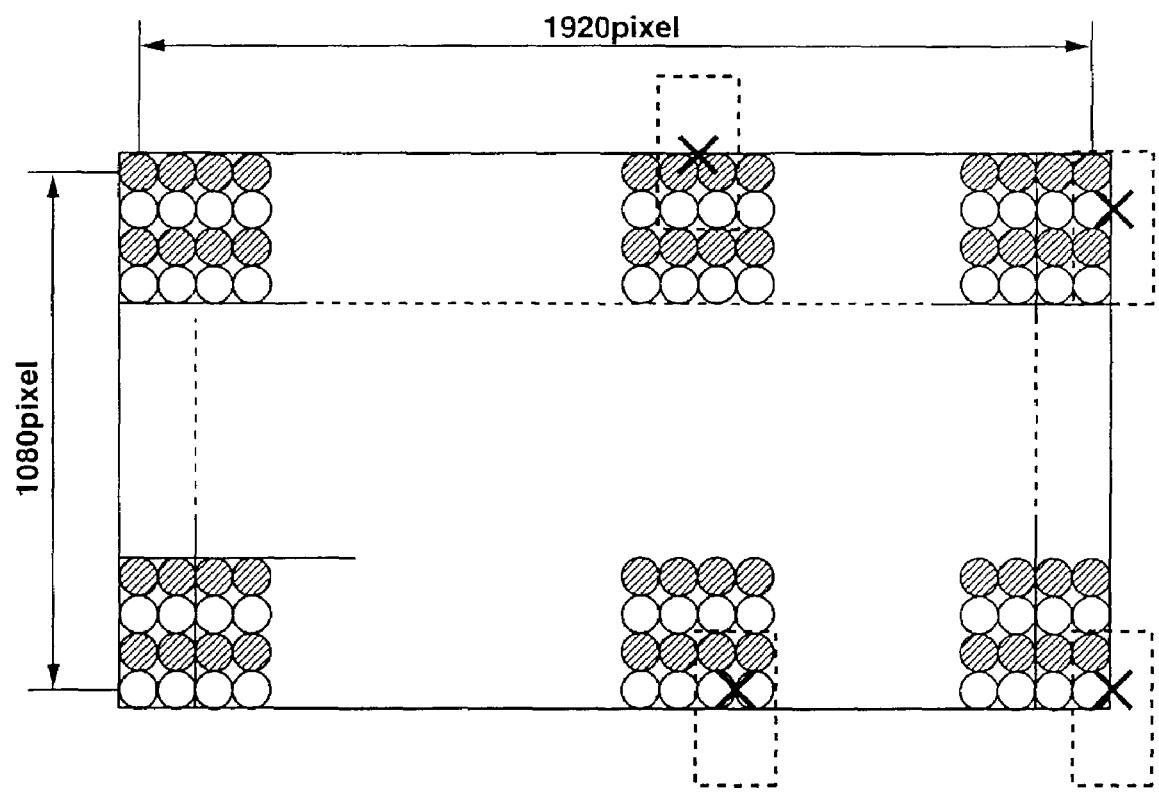
FIG. 25 shows an instance where there lack four pixels used for four-point interpolation processing.
Figure 26:
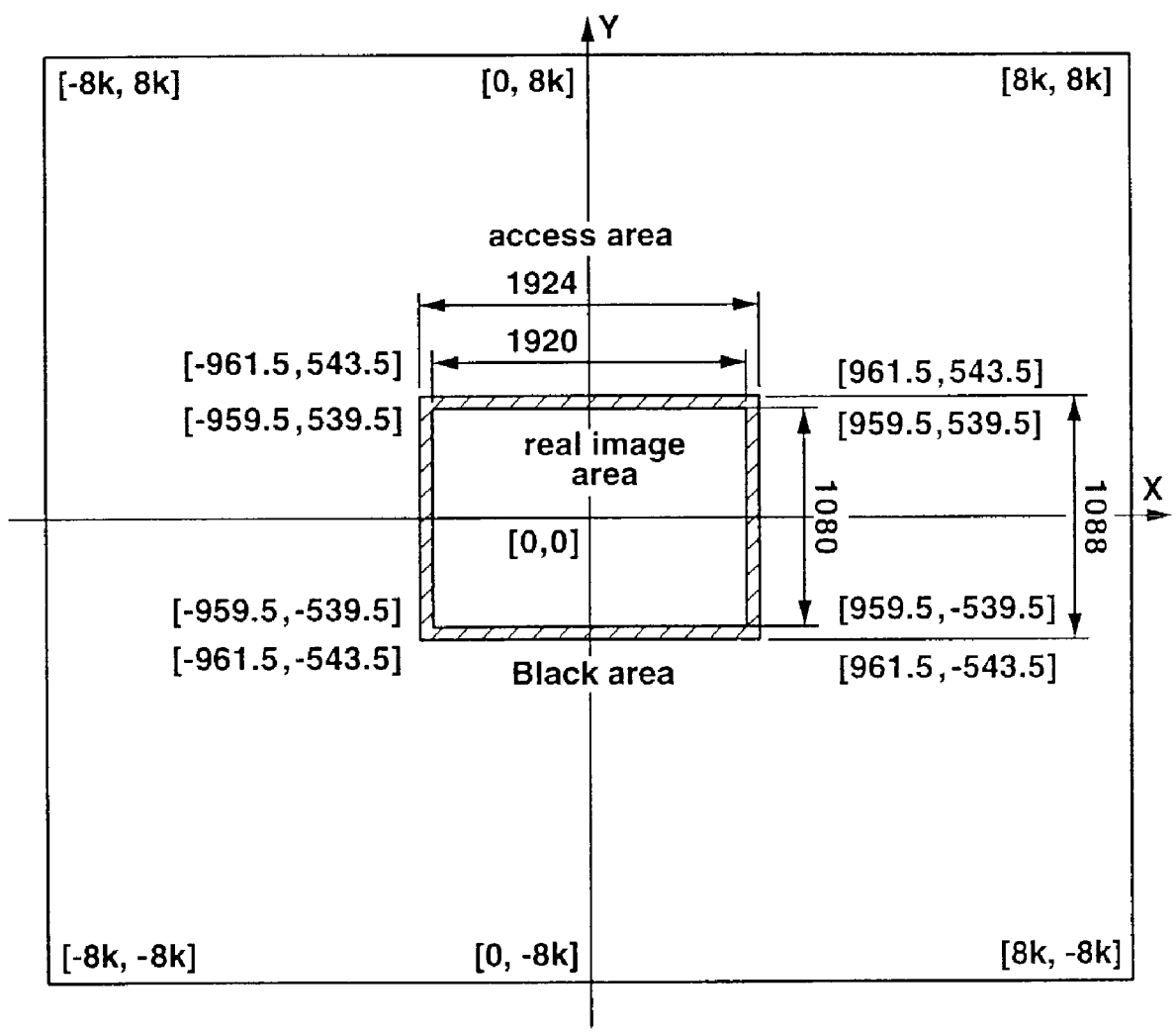
FIG. 26 shows an ex-area data band provided in an effective access area of the buffer 20.
Figure 27:
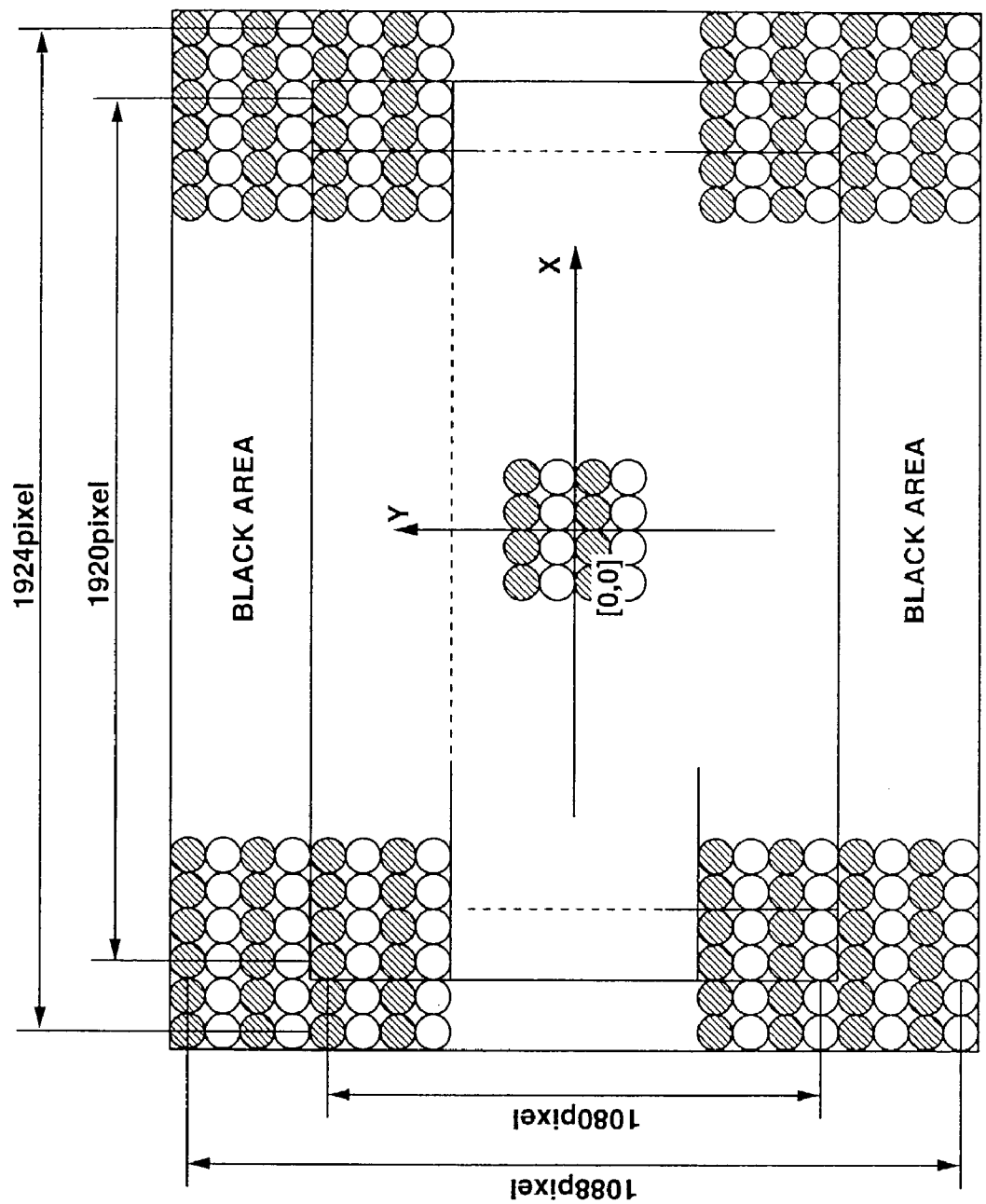
FIG. 27 shows a state in which even-field picture signals are written in a data area of a buffer 20, with an ex-area data band being set therearound.

Meanwhile, if the position indicated x in FIG. 25 is the read address [X, Y], there lack the four pixels at upper and lower and left and right positions thereof, so that processing different from the usual interpolation processing employing four pixels is needed. Thus, given the read address [X, Y], it is necessary to determine whether or not usual interpolation processing can be applied for the read address [X, Y], such that it becomes necessary to provide a dedicated circuit for making a corresponding decision. So, with a view to dispensing with such dedicated circuit, an ex-area data band is set in the buffer 20. Specifically, dummy output signals corresponding to two pixels are written in each of the upper and lower positions and the left and right positions of the data area in which to write picture signals (real image area), as shown in FIGS. 26 and 27, to set the ex-area data band (black area). Meanwhile, FIG. 27 shows the state in which the picture signals of the even field are written in the data area (real image area) of FIG. 26, with the ex-area data band being set therearound.

It is now proved that, insofar as the recording capacity is concerned, a data area in which to write picture signals and an ex-area band can be set in the buffer 20. There are provided eight SRAMs 73-U0-A to 73-L1-B in the buffer 20, as shown in FIG. 19 and picture signals of the field picture are adapted to be stored in four of these SRAMs. The effective access area of one of the SRAMs 73 is 256 k words=256*1024 words=262144 words. The data area and the ex-area data band, to be written therein, are ¼ of picture signals of the field picture (540×1920) and each two pixels on the upper, lower, left and right sides thereof, so that the capacity required is 544*1924/4=261664 words, which may be fully stored in one effective access area of the SRAM 73. Thus, insofar as the recording capacity is concerned, it is possible to set the x-area data band in the buffer 20.

Figure 28:
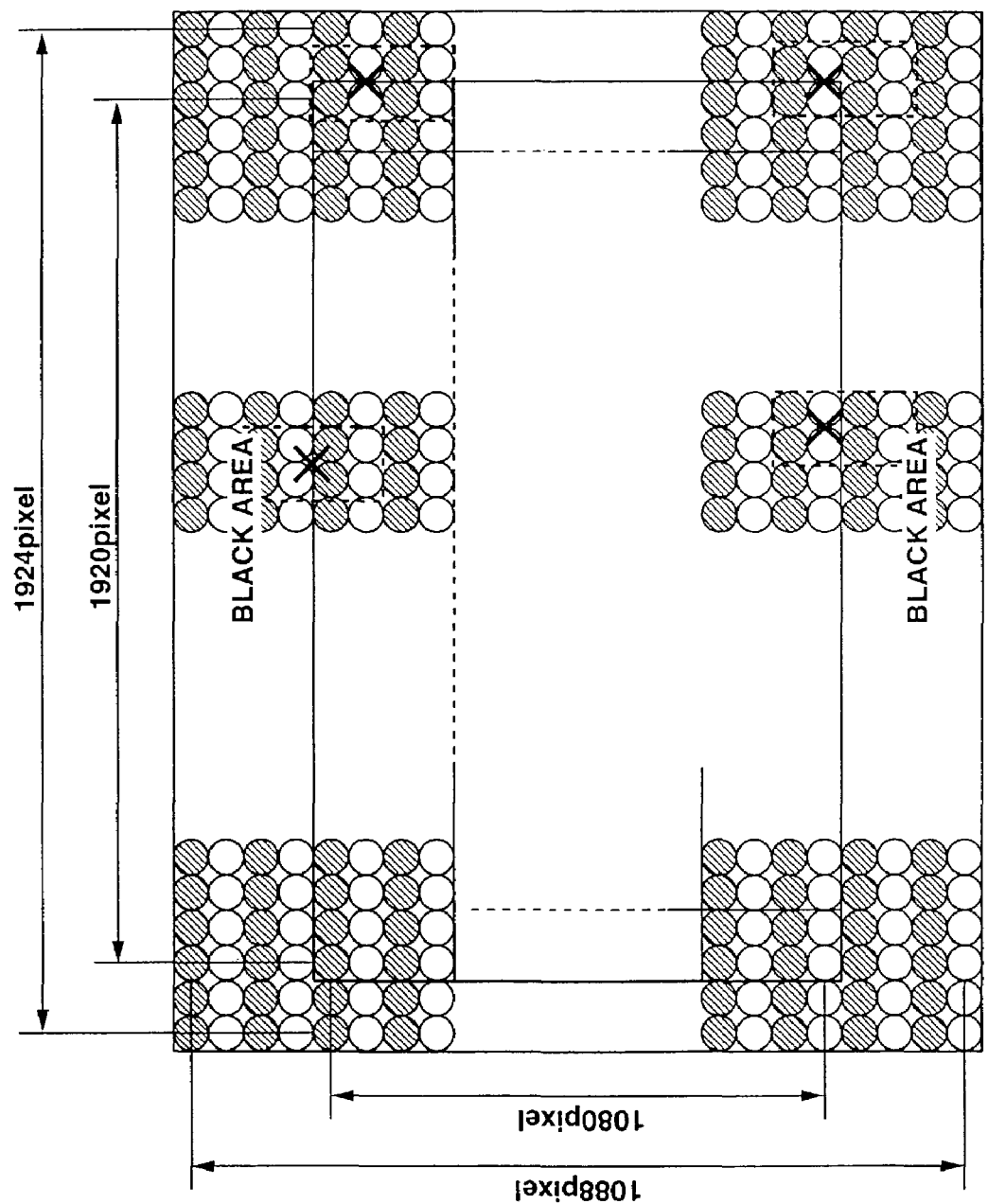
FIG. 28 illustrates the state in which 4-point interpolation becomes possible by the ex-area data band being set in the buffer 20.

By setting the data area and the ex-area data band within the effective access area of the buffer 20, four pixels are present on the upper, lower, left and right sides of a position occasionally set as a read address [X, Y] as indicated by a mark x in FIG. 28, so that routine interpolation processing employing four pixels can be applied. Thus, given the readout address [X, Y], it is unnecessary to verify whether or not the routine interpolation processing is applicable to the read address [X, Y] to render it possible to omit the dedicated circuit adapted for making the decision. The read address that can be generated is

-960.5<*X*<960.5 and

-540.5<*Y*<540.5.

Figures 29A, 29B:
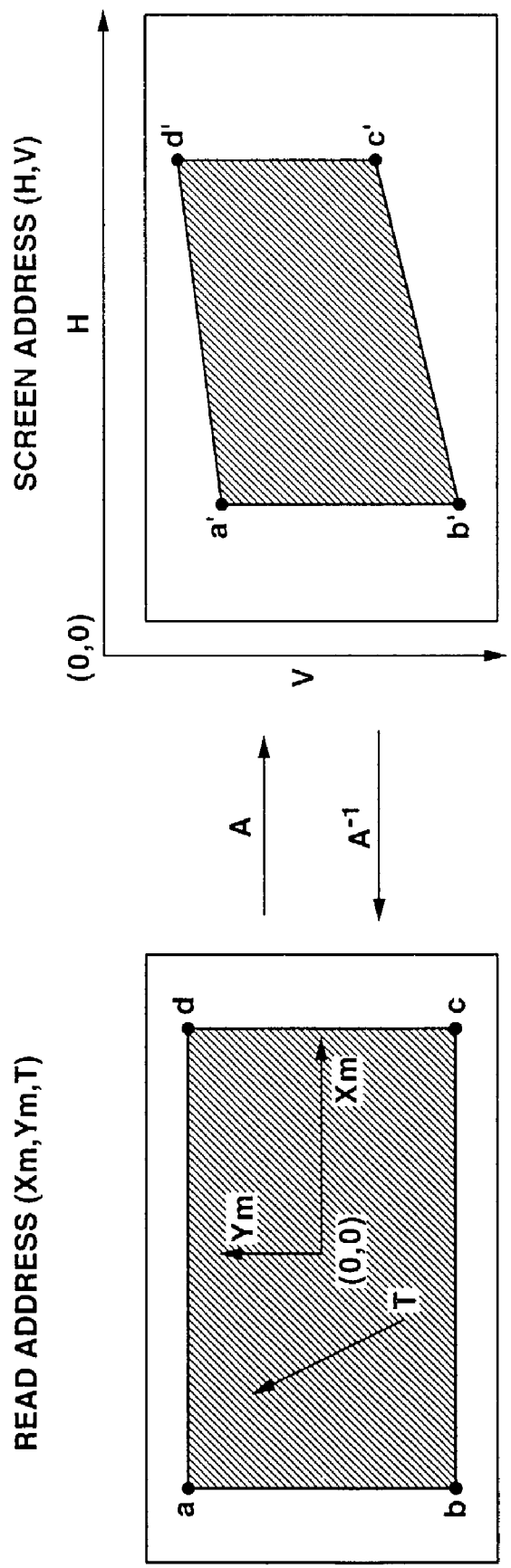
FIG. 29A, 29B illustrate the relationship between a screen address and a read address.

Before proceeding to description of the address generator 21 furnishing the read address to the buffer 20, the relationship between the screen address and the read address is explained in detail with reference to FIG. 29. FIG. 29A shows the coordinate system of the readout address ($X_m$, $Y_m$, T) set in the buffer 20. This readout address is equivalent to the above-mentioned read address [X, Y]. In the coordinate system of the read address, the point of origin is set at the center of a picture. Meanwhile, T indicates the lighting modulation axis (T-axis) used for specifying the lighting occasionally added to the picture. FIG. 29B shows the coordinate system of the screen address (H, V). In the coordinate system of the screen address, the point of origin is at an upper left side of a picture. In the coordinate system of the reading address, points a to d are associated with points a' to d' of the coordinate system of the read addresses, respectively.

The screen address (H, V) corresponds to the read address ($X_m$, $Y_m$, T) transformed using a 3×3 transformation matrix A. Thus, the read addresses ($X_m$, $Y_m$, T) can be calculated in a reverse sequence, that is by multiplying the sequentially scanned screen address (H, V) with an inverse matrix $A^{-1}$ of the transformation matrix A. Specifically, the read addresses ($X_m$, $Y_m$, T) is calculated as indicated by the following equation 1:

$$Xm = \frac{a_{11} \cdot H + a_{12} \cdot V + a_{13}}{a_{31} \cdot H + a_{32} \cdot V + a_{33}} = \frac{X(H, V)}{Z(H, V)} \quad (1)$$

$$Ym = \frac{a_{21} \cdot H + a_{22} \cdot V + a_{23}}{a_{31} \cdot H + a_{32} \cdot V + a_{33}} = \frac{Y(H, V)}{Z(H, V)}$$

$$T = \frac{(p \cdot a_{11} + q \cdot a_{21}) \cdot H + (p \cdot a_{12} + q \cdot a_{22}) \cdot V + p \cdot a_{13} + q \cdot a_{23}}{a_{31} \cdot H + a_{32} \cdot V + a_{33}}$$

$$= \frac{T(H, V)}{Z(H, V)}.$$

Meanwhile, the effect parameters $a_{11}$ to $a_{33}$ are components of the inverse matrix $A^{-1}$, as indicated by the equation 2:

$$A^{-1} = \begin{bmatrix} a_{11} & a_{12} & a_{13} \\ a_{21} & a_{22} & a_{23} \\ a_{31} & a_{32} & a_{33} \end{bmatrix}. \quad (2)$$

It is noted that rotation coefficients p, q of the lighting modulation axis T are given by p=cosè and q=sinè.

Figure 30:
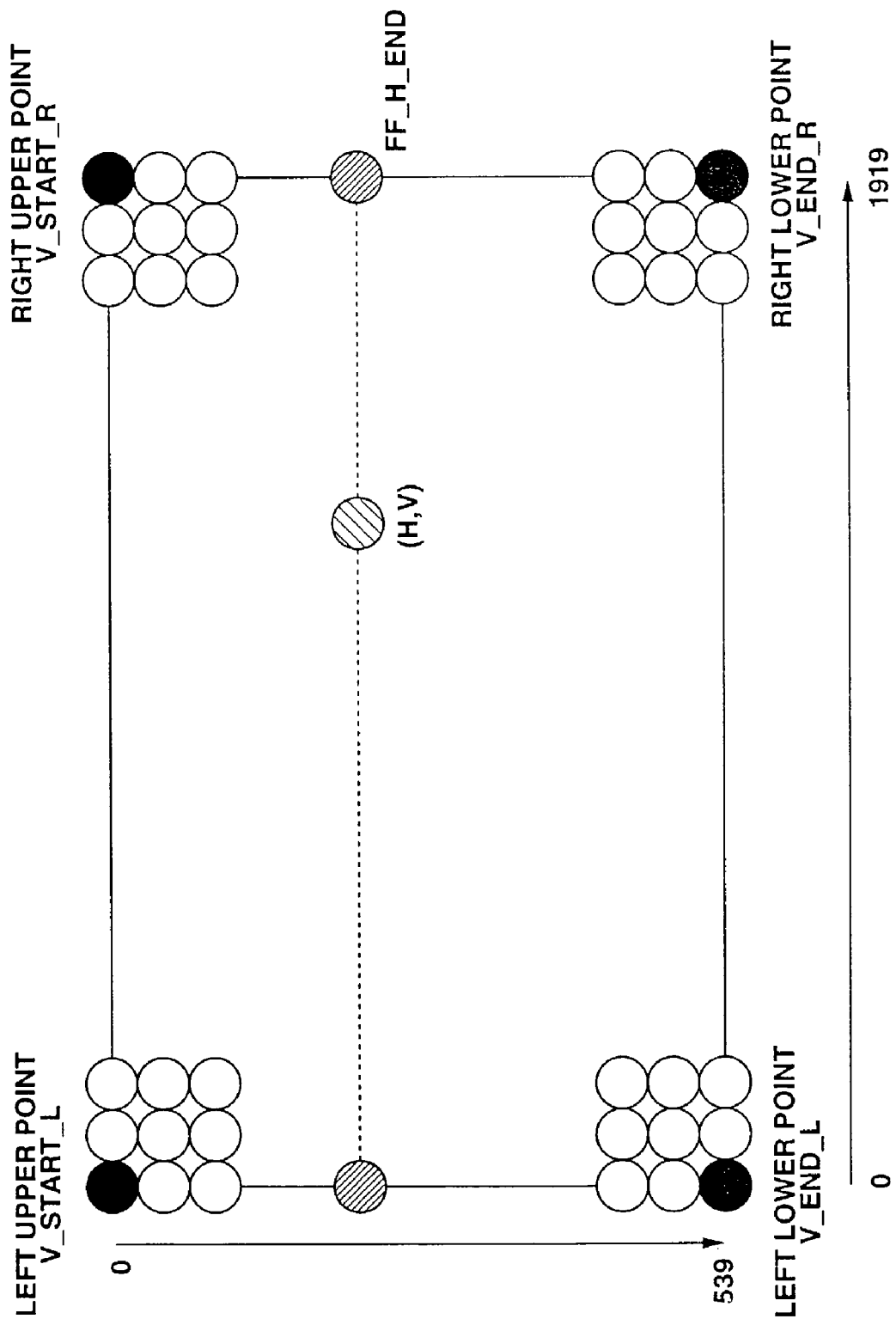
FIG. 30 illustrates super-interpolation by an address generator 21.

Thus, the read addresses ($X_m$, $Y_m$, T) may be calculated using function values X(H, V), Y(H, V), T(H, V) and Z(H, V) having the screen address (H, V) as parameters. Meanwhile, the read address is calculated from one pixel of the sequentially scanned screen addresses to another, that is from one clock to another. It the function values X(H, V), Y(H, V), T(H, V) and Z(H, V) are calculated for all pixels of the screen addresses to calculate the read addresses, the processing is voluminous, thus necessitating a dedicated circuit for making these calculations. So, function values X(0, 0), Y(0, 0), T(0, 0), Z(0, 0), X(0, 539), Y(0, 539), T(0, 539), Z(0, 539), X(1919, 0), Y(1919, 0), T(1919, 0), Z(1919, 0), X(1919, 539), Y(1919, 539), T(1919, 539) and Z(1919, 539), referred to below as function values X(0, 0) to Z(1919, 539), are calculated at the outset for four terminal points of the screen addresses, namely a left upper point (0, 0), a left lower point (0, 539), a right upper point (1919, 0) and a right lower point (1919, 539), as shown in FIG. 30. The function values X(H, V), Y(H, V), T(H, V) and Z(H, V) of the remaining pixels of the screen addresses are interpolated, using the function values X(0, 0) to Z(1919, 539), calculated for the four terminal points, to calculate the corresponding read addresses.

The processing of using the function values X(0, 0) to Z(1919, 539), calculated for the four terminal points of the screen addresses, to interpolate the function values X(H, V), Y(H, V), T(H, V) and Z(H, V) of the remaining pixels of the screen addresses, is termed below the super-interpolation. In particular, the interpolation processing in the vertical direction between the left upper point (0, 0) and the left lower point (0, 539) or between the right upper point (1919, 0) and the right lower point (1919, 539) is termed the super-interpolation (V), and the processing of interpolation in the horizontal direction employing the function values of the left and right end points on the horizontal scanning lines, obtained e.g., by the super-interpolation (V), is termed the super-interpolation (H).

Figure 31:
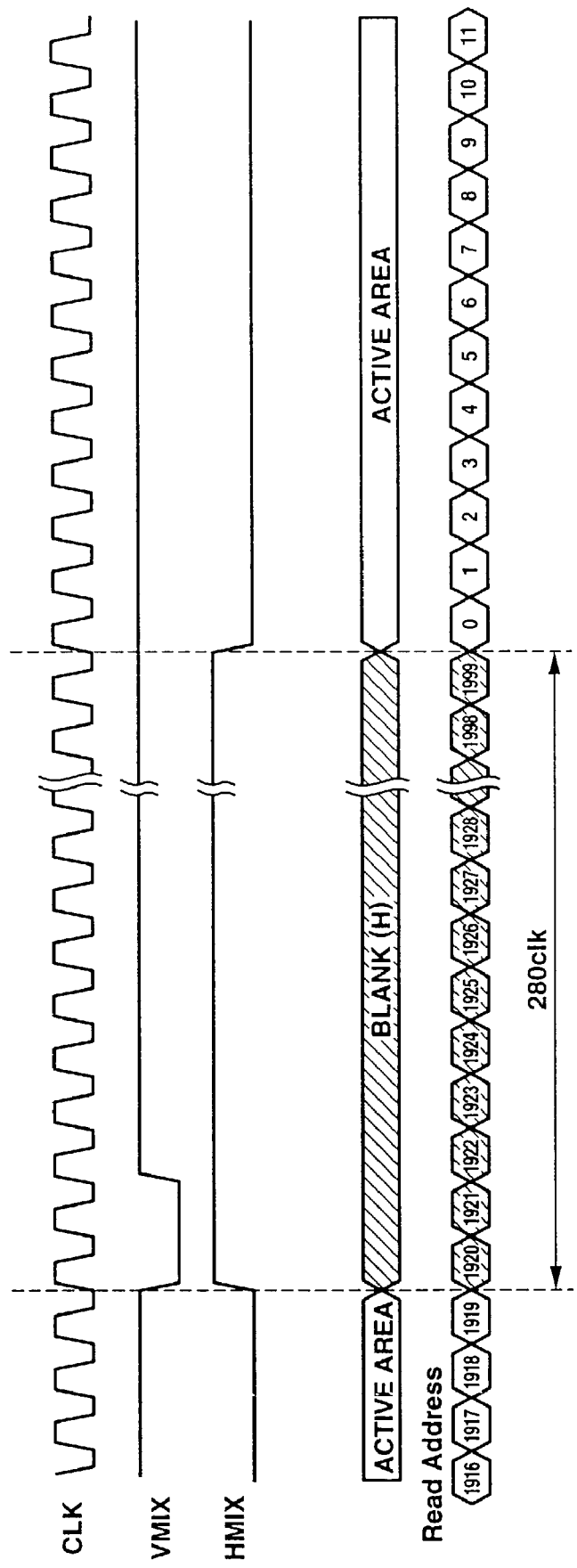
FIG. 31 illustrates processing timing of super-interpolation.

Referring to FIG. 31, the processing timing of the super-interpolation is explained with reference to FIG. 31. If super-interpolation is applied to a given field picture, the function values X(0, 0) to Z(1919, 539) are calculated at the outset for each of the four terminal points of the screen addresses, before the time of the field directly previous to the field picture, and are held at a preset register, which will be explained subsequently. The super-interpolation (V) is executed at an initial stage of the horizontal blanking period (BLANK(H)), in synchronism with the Enable of the timing signal VMIX, while super-interpolation (H) is executed every clock during the period of horizontal scanning (ACTIVE AREA) of the screen addresses in synchronism with the Enable of the timing signal HMIX. That is, the execution timing of the super-interpolation (H) differs from that of the super-interpolation (V).

Figure 32:
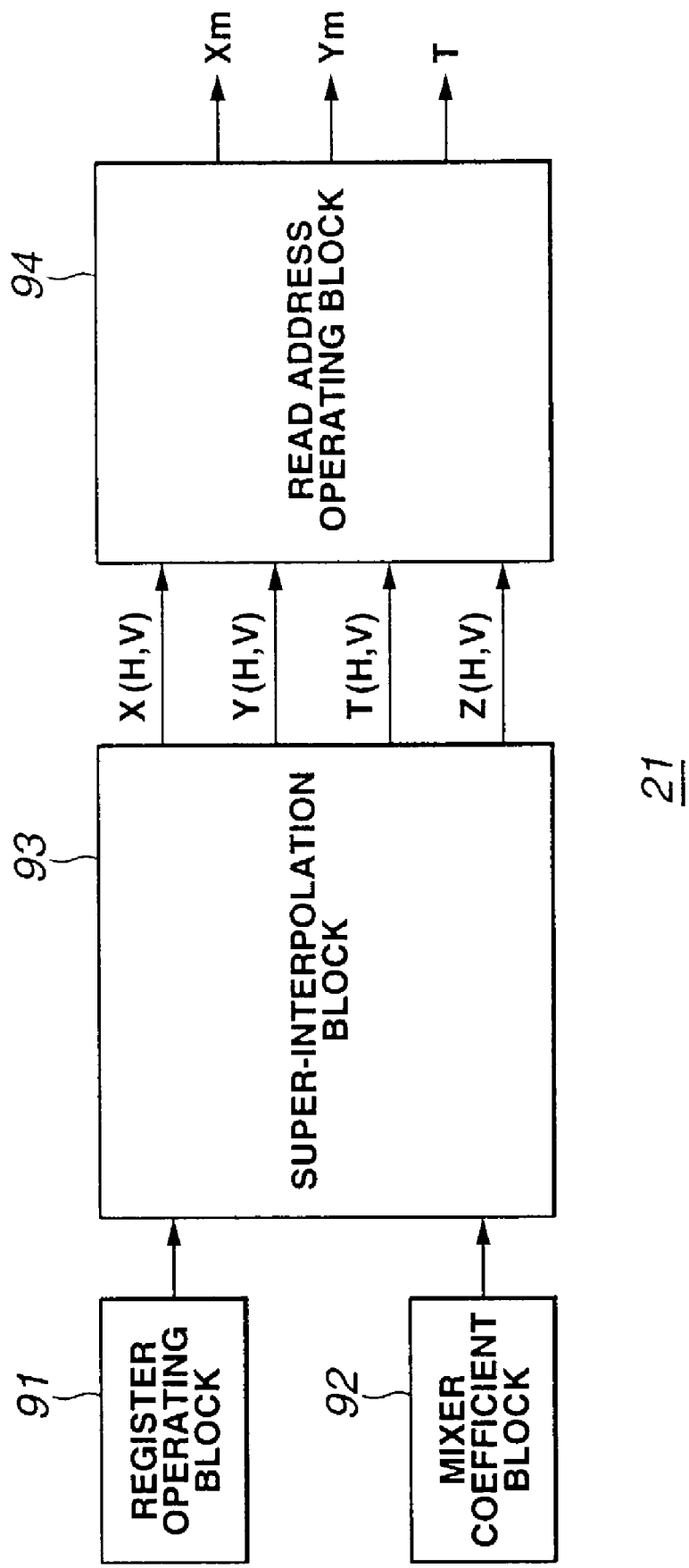
FIG. 32 is a block diagram showing an illustrative structure of the address generator 21.

FIG. 32 shows an exemplary structure of the address generator 21. A register calculating block 91 calculates function values X(0, 0) to Z(1919, 539) of the four terminal points of the screen addresses to route the so calculated values to a super-interpolation block 93. The mixer coefficient block 92 sends mixer coefficients, held at the outset in an enclosed register, to the super-interpolation block 93. Using the function values X(0, 0) to Z(1919, 539) of the four terminal points of the screen addresses, supplied form the register calculating block 91, and the mixer coefficients, supplied from the mixer coefficient block 92, the super-interpolation block 93 executes the super-interpolation (H) and the super-interpolation (V) and interpolates the corresponding function values X(H, V), Y(H, V), T(H, V) and Z(H, V) in the pixels other than the four terminal points on the screen addresses so obtained to output the interpolated values to a read address operating block 94. Using the function values X(H, V), Y(H, V), T(H, V) and Z(H, V), associated with all of the pixels of the screen addresses, input from the super-interpolation block 93, the read address operating block 94 generates read addresses, which are output to the buffer 20.

Figure 33:
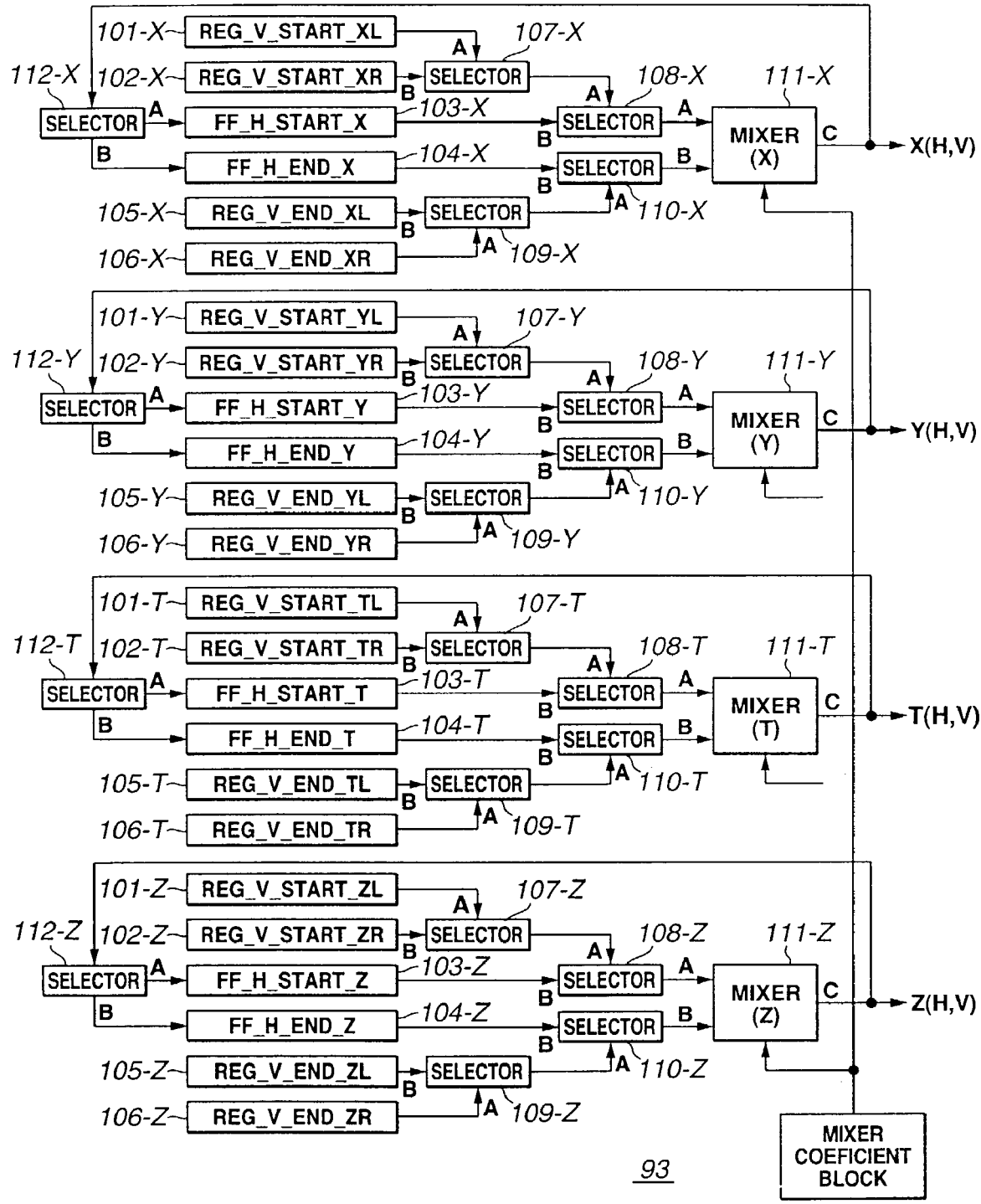
FIG. 33 is a block diagram showing an illustrative structure of a super-interpolation block 93.

FIG. 33 shows an illustrative structure of the super-interpolation block 93. The super-interpolation block 93 is made up of a block interpolating the function value X(H, V), a block interpolating the function value Y(H, V), a block interpolating the function value T(H, V) and a block interpolating the function value Z(H, V).

A REG_V_START_XL register 101-X of the block interpolating the function value X(H, V) holds the function value X(0, 0) for the left upper point (0, 0) supplied from the register calculating block 91, and outputs the so held value to a terminal A of a selector 107-X. A REG_V_START_XR register 102-X of the block holds the function value X(1919, 0) for the right upper point (1919, 0) supplied from the register calculating block 91 and outputs the so held value to a terminal B of the selector 107-X. An FF_H_START_X register 103-X holds an output of a mixer 111-X input via B-terminal of a selector 112-X to output the so-held value to the B-terminal of a selector 108-X. An FF_H_END_XL register 104-X holds an output of a mixer 111-X input via B-terminal of the selector 112-X to output the so-held value to the B-terminal of a selector 110-X. A REG_V_END-XL register 105-X holds the function value X(0, 539) for the left lower point (0, 539) supplied from the register calculating block 91 to output the so held value to the B-terminal of a selector 109-X. A REG_V_END_XR register 106-X holds the function value X(1919, 539) for the right lower point (1919, 539) supplied from the register calculating block 91 to output the so held value to the A-terminal of a selector 109-X.

The selectors 107-X to 110-X output inputs to the A or B terminals to the downstream circuitry. The selector 112-X routes an output of the mixer 111-X to an FF_H_START_X register 103-X or to an FF_H_END_X register 104-X. If the output of the selector 108-X input to the A terminal is A, the output of the selector 110-X input to the B terminal is B and the mixer coefficient supplied from the mixer coefficient block 92 is kn, the mixer 111-X outputs an interpolated value C of the following equation:

Interpolated value $C = A \cdot (1.0 - k_n) + B \cdot k_n$ every clock to the downstream side circuitry. In actuality, the following equation:

Interpolated value $C = k_n(B - A) + A$ is used in order to diminish the number of times of multiplication by one.

Meanwhile, the structure of each block for interpolating each of the function values Y(H, V), T(H, V) and Z(H, V) is the same as the structure of the block for calculating the function value X(H, V) and hence the corresponding description is omitted for simplicity. It should be noted that the relation of correspondence between the function REG_V_START_XL register 101X to REG_V_END-ZR register 106-Z and the function values X(0, 0) to Z(1919, 539) these registers hold is as shown in FIG. 34. The registers enclosed in the mixer coefficient block 92, and the mixer coefficients held therein, are shown in FIG. 35.

The operation of the super-interpolation block 93 is now explained. It is assumed that the function REG_V_START_XL register 101X to REG_V_END_ZR register 106-Z are fed with corresponding function values (0, 0) to (1919, 539) from the register calculating block 91.

Figure 37:
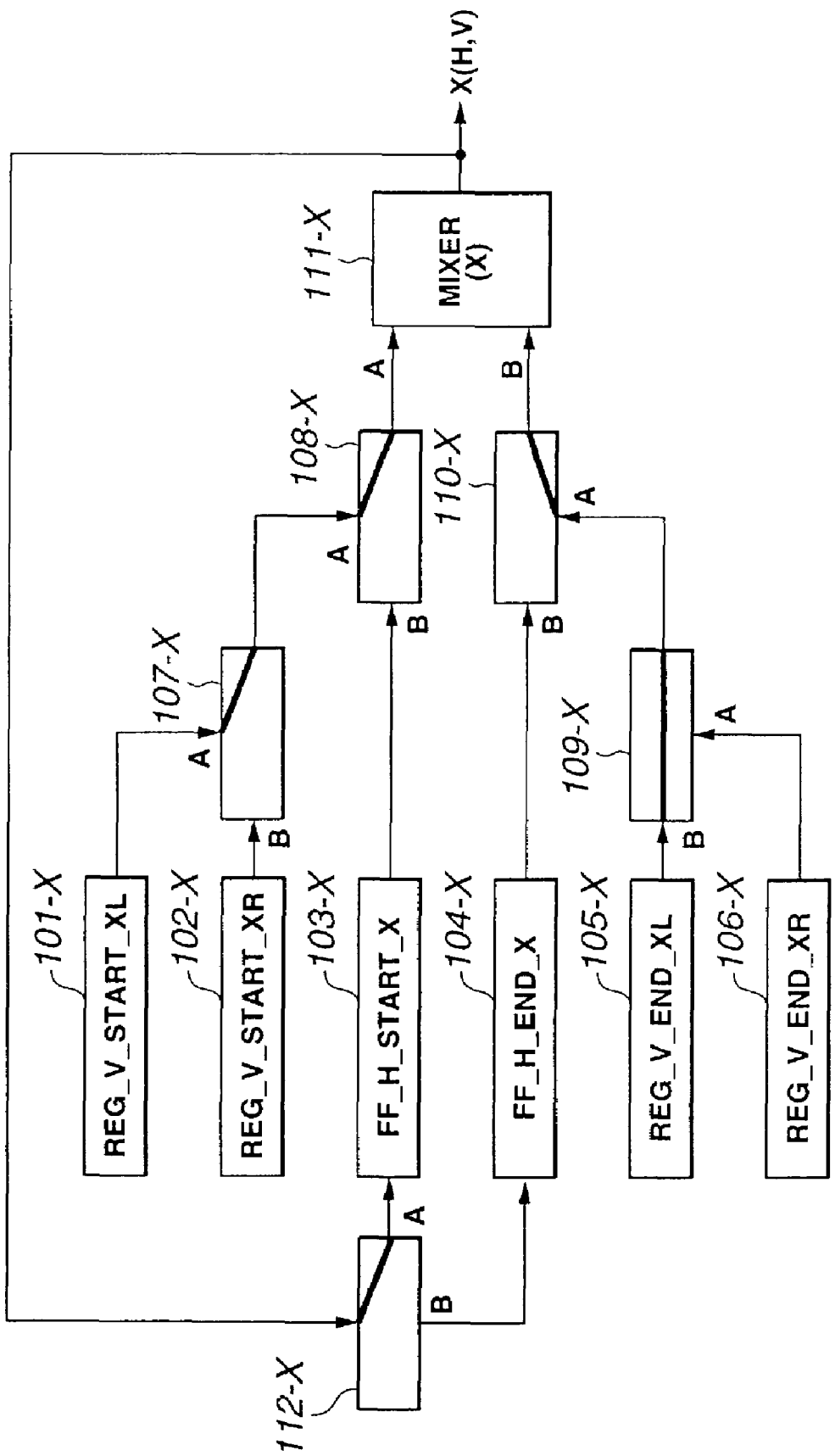
FIG. 37 shows the state of a block for interpolating the function values X(H, V) in association with FIG. 36.

First, the vertical component of the screen address is initialized to V=0, and super-interpolation (V) is started in synchronism with Enable of the timing signal VMIX. First, for executing the super-interpolation (V) of the left end point (0, V) of the screen address, switching etc is made at each block so that the input originating point and output destination point of the function values for the mixers 111-X to 111-Z will be as shown in FIG. 36. Specifically, selectors 107-X to 110-X and 112X are switched in a block interpolating the function values X(H, V), as shown in FIG. 37. This causes the function value X(0, 0) for the left upper point (0, 0), held in the function REG_V_START_XL register 101-X, to be input to a terminal A of the mixer 111-X, while causing the function value X(0, 539) for the left lower point (0, 539), held in the function REG_V_END_XL register 105X, to be input to a terminal B of the mixer 111-X. The mixer 111-X is also fed with mixer coefficients from the mixer coefficient block 92. The mixer 111-X interpolates the function values X(0, V) pertinent to the left end point X(0, V) of the screen address. The interpolated function values X(0, V) is latched via selector 12-X in an FF_H_START_X register 103-X. Similar processing is applied to the remaining blocks, whereby function values Y(0, V), T(0, V) and Z(0, V) pertinent to the left end point (0, V) of the screen address are latched in associated FF_H_START_Y register 103-Y to FF_H_START_Z register 103-Z.

Figure 39:
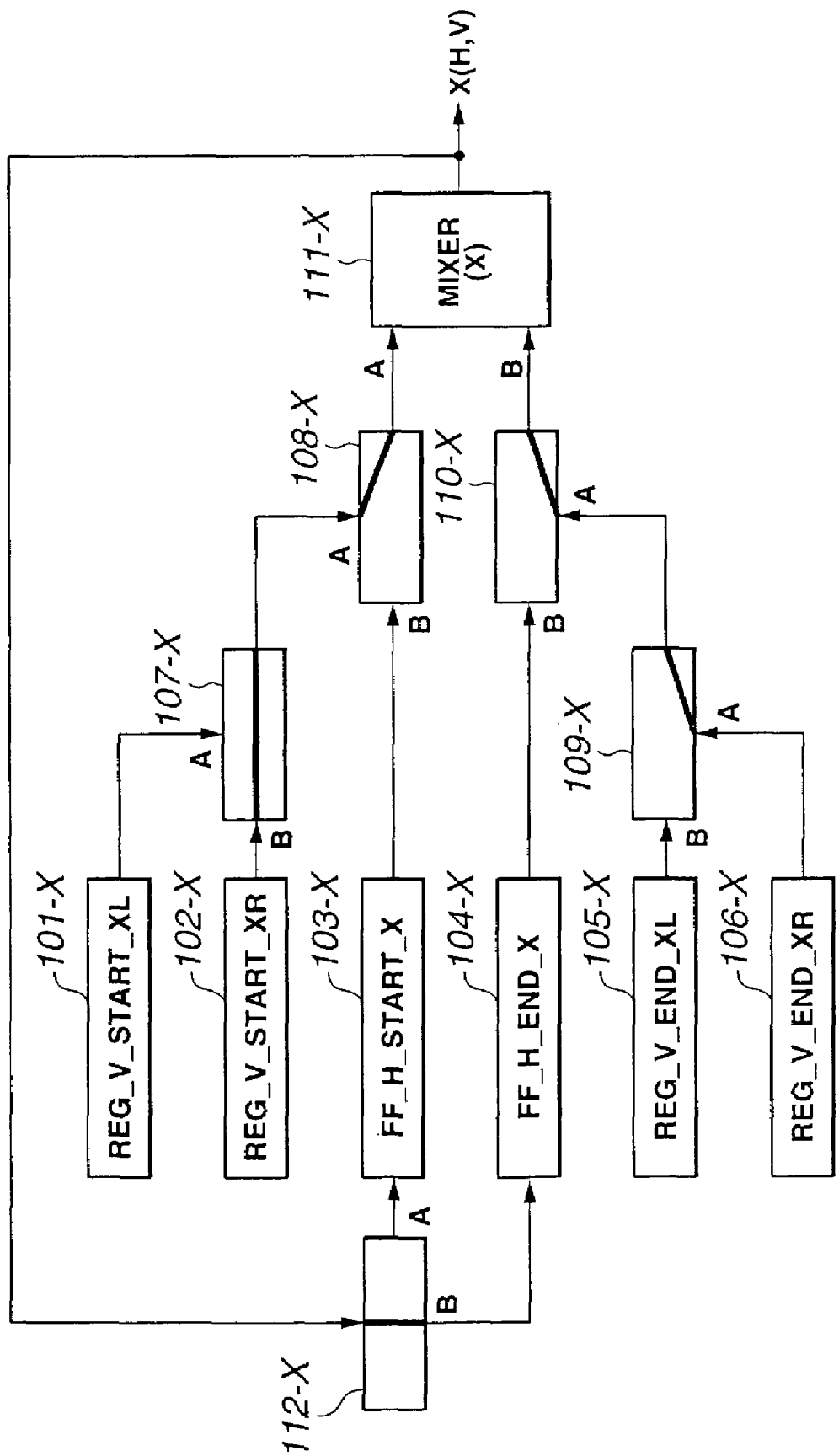
FIG. 39 shows the state of a block for interpolating the function values X(H, V) in association with FIG. 38.

Then, for executing super-interpolation (V) of the right end point (1919, V) of the screen address, switching etc is made at each block so that the input originating point and output destination point of the function values for the mixers 111-X to 111-Z will be as shown in FIG. 38. Specifically, selectors 107-X to 110-X and 112X are switched in a block interpolating the function values X(H, V), as shown in FIG. 39. This causes the function value X(1919, 539) for the right upper point (1919, 539), held in the REG_V_START_XR register 102-X, to be input to the terminal A of the mixer 111-X, while causing the function value X(1919, 539) for the right lower point (1919, 539), held in the function REG_V_END_XR register 106X, to be input to a terminal B of the mixer 111-X. The mixer 111-X is also fed with mixer coefficients from the mixer coefficient block 92. The mixer 111-X interpolates the function values X(1919, V) pertinent to the right end point X(1919, V) of the screen address. The interpolated function values X(1919, V) are latched via selector 112-X in an FF_H_END_X register 104-X. Similar processing is applied to the remaining blocks, whereby function values Y(1919, V), T(1919, V) and Z(1919, V) pertinent to the right end point (1919, V) of the screen address are latched in associated FF_H_END_Y register 104-Y to FF_H_END-Z register 104-Z.

Figure 41:
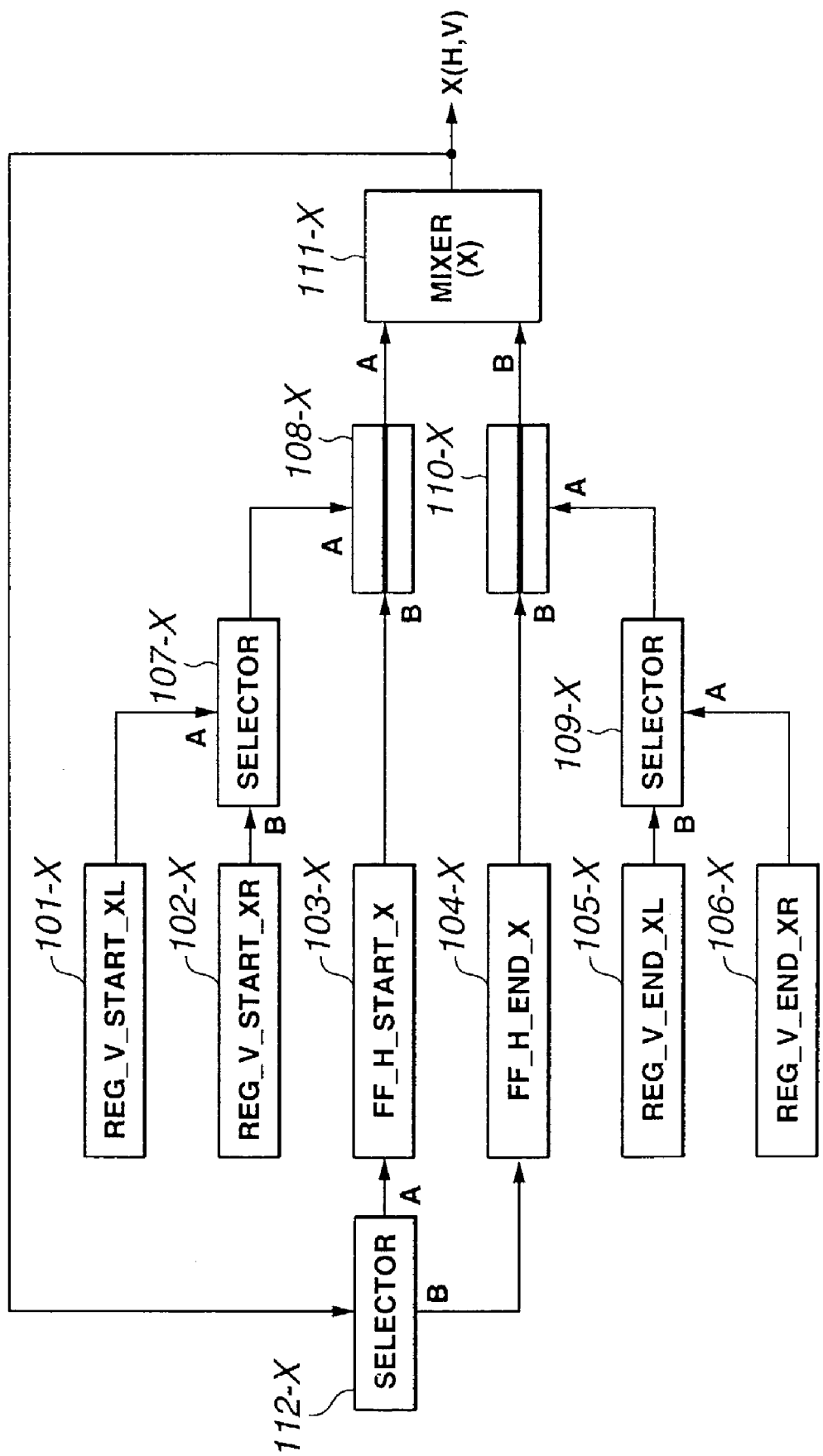
FIG. 41 shows the state of a block for interpolating the function values X(H, V) in association with FIG. 40.

The processing up to this point is executed during the horizontal blanking period. Subsequently, the horizontal component H of the screen address is initialized in synchronism with an Enable of the timing signal HMIX, so that H=0 to start super-interpolation (H). For executing the super-interpolation (H), switching etc is made at each block so that the input originating point and output destination point of the function values for the mixers 111-X to 111-Z will be as shown in FIG. 40. Specifically, selectors 108-X to 110-X are switched in a block interpolating e.g., the function values X(H, V), as shown in FIG. 41. This causes the function value X(0, V) for the left end point (0, V), held in the FF_H_START_X register 103-X, to be input to the terminal A of the mixer 111-X, while causing the function value X(1919, V) for the right end point (1919, V), held in the FF_H_END-X register 104X, to be input to a terminal B of the mixer 111-X. The mixer 111-X is fed with mixer coefficients from the mixer coefficient block 92 on the clock basis. The mixer 111-X sequentially interpolates function values X(H, V) for the left end point (0, V) up to the right end point (1919, V) on the clock basis to send the so interpolated function values to the read address operating block 94. Similar processing is performed for the remaining blocks so that function values Y(H, V), T(H, V) and Z(H, V) from the left end point (0, V) to the right end point (1919, V) are interpolated and sent to the read address operating block 94.

The processing up to this stage is executed during the horizontal scanning period following initialization of the horizontal component H of the screen address. The vertical component V then is incremented by 1 to repeat the processing as from the aforementioned super-interpolation. When the vertical component V reaches 540, the super-interpolation for the field being processed comes to a close so that the next field is now processed in similar manner.

Since the super-interpolation (V) is executed during the horizontal blanking period and the super-interpolation (H) is executed during the horizontal scanning period, the super-interpolation (V) and the super-interpolation (H) can be executed using the same circuit (super-interpolation block 93) in common.

The interpolation circuit 22 is now explained with reference to FIG. 42. If the picture signals stored in the buffer 20 are of the HD format, the interpolation circuit 22 executes four-point interpolation processing, employing four-pixel picture signals, with an operating frequency of 74.25 MHz. On the other hand, if SD format picture signals are field/frame converted and stored in the buffer 20, 16-point interpolation processing, employing 16-pixel picture signals, is carried out at an operating frequency of 54 MHz (quadrupled speed of the usual operating frequency of 13.5 MHz used in processing SD format picture signals).

Figure 42:
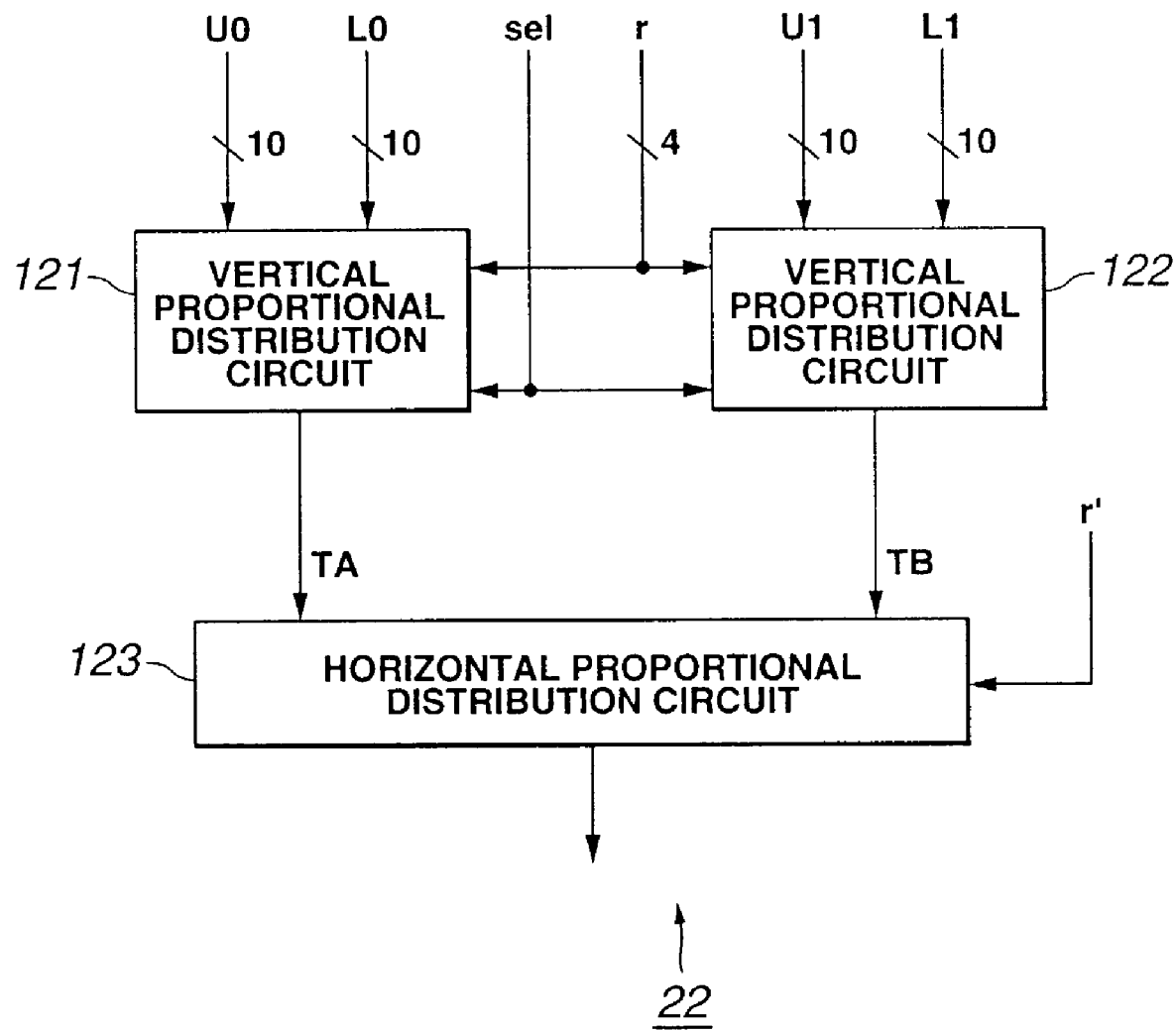
FIG. 42 is a block diagram showing an illustrative structure of an interpolation circuit 42.

FIG. 42 shows an exemplary structure of the interpolation circuit 22 including a proportional distribution circuit for the vertical direction 121, a proportional distribution circuit for the vertical direction 122 and a proportional distribution circuit for the horizontal direction 123. The proportional distribution circuit for the vertical direction 121 proportionally distributes picture signals of two vertically neighboring pixels, input simultaneously from the units U0, L0 of the buffer 20, to calculate an interpolated value TA of picture signals lying intermediate between the two pixels, whilst the proportional distribution circuit for the vertical direction 122 proportionally distributes picture signals of two vertically neighboring pixels simultaneously input from the units U1, L1 of the buffer 20 to calculate the interpolated value TB of the picture signals lying intermediate between the two pixels. The proportional distribution circuit for the horizontal direction 123 proportionally distributes the interpolated values TA input from the proportional distribution circuit for the vertical direction 121 and the interpolated values TB input from the proportional distribution circuit for the vertical direction 122.

Figure 43:
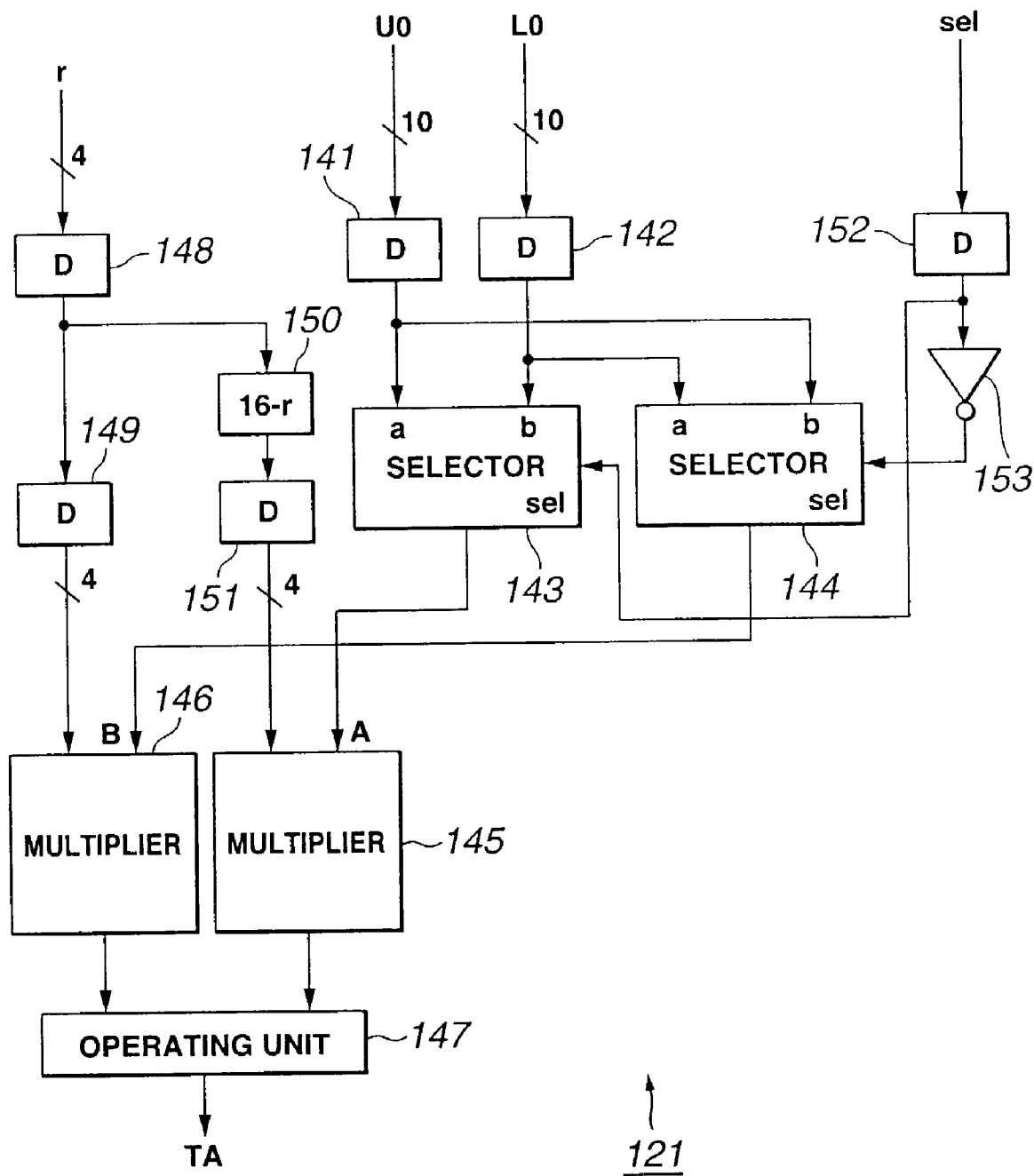
FIG. 43 is a block diagram showing an illustrative structure of a vertical proportional distribution circuit 121.

FIG. 43 shows an exemplary structure of the proportional distribution circuit for the vertical direction 121, which proportional distribution circuit 121 is fed not only with picture signals of two vertically neighboring pixels, simultaneously sent from units U0, L0 of the buffer 20, but also with four-bit position information r, indicating the position in the vertical direction of the interpolating point between the two pixels, and with a signal sel controlling the selectors 143, 144. The picture signals from the unit U0 are input to a delay circuit (D) 141 from the unit U0, while the picture signals from the unit L0 are input to a delay circuit 142. The position information r is input to a delay circuit 148. The signal sel is input to the delay circuit 152. The delay circuit (D) 141 delays the picture signals from the unit U0 by a preset clock period to output the picture signals from the unit U0 to a terminal a of the selectors 143 and to a terminal$_b$ of the selector 144. The delay circuit 142 delays the picture signals from the unit L0 by a preset clock period to output the delayed signals to a terminal$_b$ of the selector 143 and to a terminal a of the selector 144. Based on the signal sel, input from the delay circuit 152, the selector 143 outputs the picture signals from the unit U0, input to the terminal a, or the picture signals from the unit L0, input to the terminal b, to a multiplier 145. Based on an inverted version of the signal sel, input from a NOT circuit 153, the selector 144 outputs the picture signals from the unit L0, input to the terminal$_a$, or the picture signals from the unit U0, input to the terminal b, to a multiplier 146. Thus, one of the multipliers 145, 146 is fed with picture signals from the unit U0, with the other of the multipliers 145, 146 being fed with the picture signals from the unit L0. The values of the picture signals input to the multiplier 145 and to the multiplier 146 are termed A and B, respectively. The multiplier 145 multiplies a value (16−r), input from the delay circuit 151, with the value A of the picture signals input from the selector 143, to output the resulting product to an operating unit 147. The multiplier 146 multiplies a value r of the position information, input from a delay circuit 149, with the value B of the picture signals, input from the selector 144, to output the resulting product value to an operating unit 147, which operating unit sums the output of the multiplier 145 to the output of the multiplier 146 and divides the resulting sum with 16.

The proportional distribution circuit for the vertical direction 121, configured as described above, outputs the interpolated value TA for the vertical direction, represented by the following equation:

(interpolated value) $TA=(A*(16-r)+B*r)/16$ to the proportional distribution circuit for the horizontal direction 123.

Meanwhile, the structure of the proportional distribution circuit for the vertical direction 122 is similar to that of the proportional distribution circuit for the vertical direction 121 and hence is not explained specifically.

Figure 44:
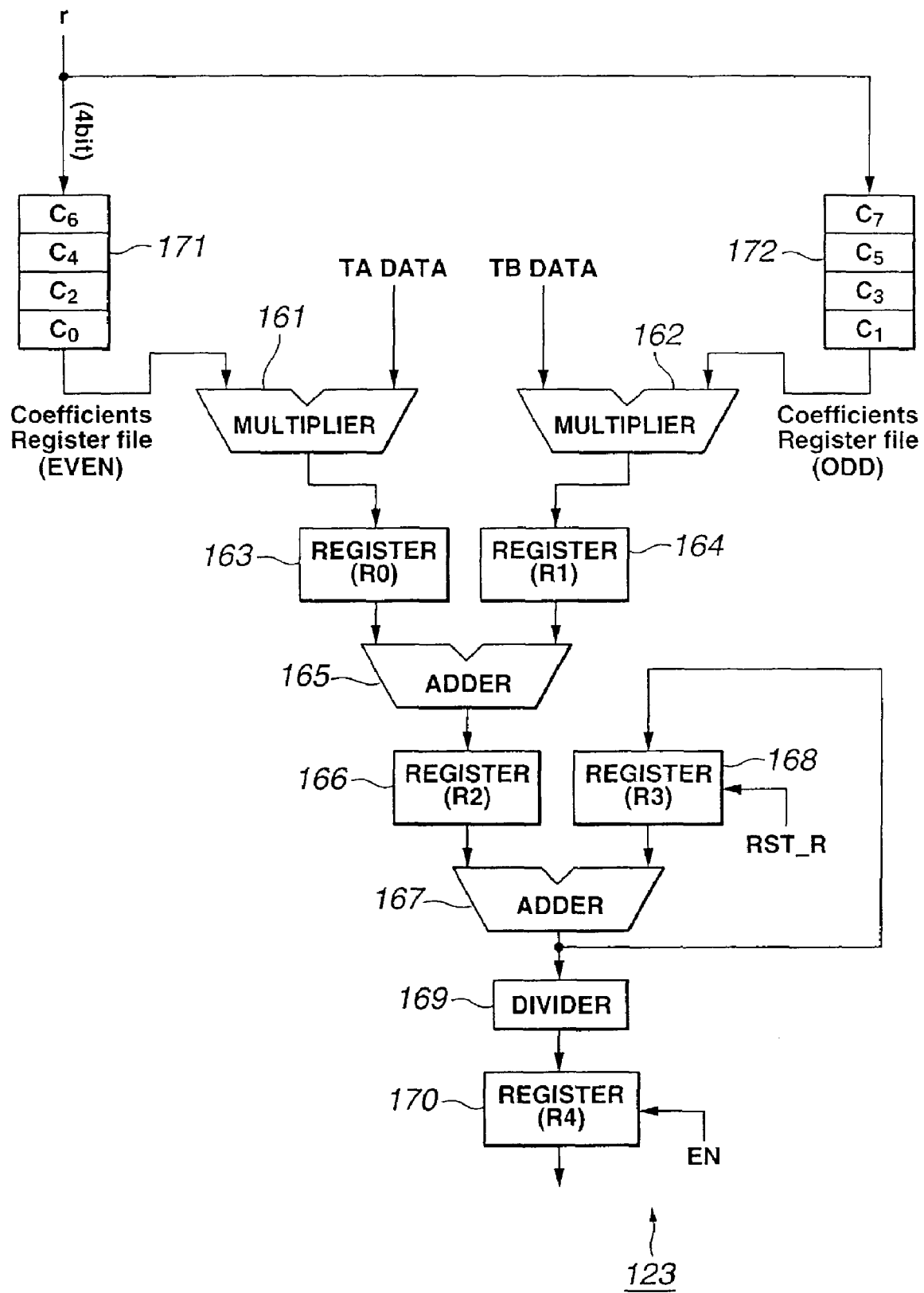
FIG. 44 is a block diagram showing an illustrative structure of a horizontal proportional distribution circuit 123.

FIG. 44 shows an exemplary structure of the proportional distribution circuit for the horizontal direction 123. The proportional distribution circuit for the horizontal direction 123 is fed not only with the interpolated value TA for the vertical direction from the proportional distribution circuit for the vertical direction 121 and with the interpolated value TB for the vertical direction from the proportional distribution circuit for the vertical direction 122, but also with the four-bit position information r', indicating the position in the horizontal direction of the interpolating point, which four-bit position information r' is input to interpolation coefficient furnishing circuits 171, 172. A multiplier 161 multiplies the interpolated value TA for the vertical direction from the proportional distribution circuit for the vertical direction 121 with an interpolation coefficient Ci, input from the interpolation coefficient furnishing circuit 171, to output the resulting product to a register (R0) 163. A multiplier 162 multiplies the interpolated value TB for the vertical direction from the proportional distribution circuit for the vertical direction 122 with the interpolation coefficient Ci input from the interpolation coefficient furnishing circuit 172 to output the result to the register (R1) 164. An adder 165 sums an output of the register (R0) 163 to an output of a register (R1) 164 to output the result to a register (R2) 166. An adder 167 sums the output of the register (R2) 166 to an output of a register (R3) 168, which is the output of the adder 167 itself, one clock period before, as held by the register (R3) 168, to output the result to the register (R3) 168 and to a divider 169. The divider 169 divides the output of the adder 167 (cumulative value of output of the adder 165 during a preset period) with the sum ΣCi of the interpolation coefficients to output the result to a register (R4) 170. The register (R0) 163, register (R1) 164, register (R2) 166 and the register (R3) 168 output inputs from respective upstream side components with a delay of preset clock periods. The register (R3) 168 is reset responsive to RSR_R signal to initialize the value it holds. The register (R4) 170 outputs the value it holds responsive to an EN signal. The interpolation coefficient furnishing circuits 171, 172 send interpolation coefficient Ci, corresponding to the four-bit position information r', indicating the position of the interpolation point in the horizontal direction, to the multipliers 161, 162.

The proportional distribution circuit for the horizontal direction 123, constructed as described above, outputs an interpolated value for the horizontal direction, represented by the following equation:

interpolated value $X=\Sigma(Ci*Ti)/\Sigma Ci$ where i=0, 1 for four-point interpolation and i=0, 1, 2, ..., 7 for 16-point interpolation. FIG. 45 shows the value of the interpolation coefficients Ci in case of 16-point interpolation of field/frame converted SD format picture signals.

Figure 46A:
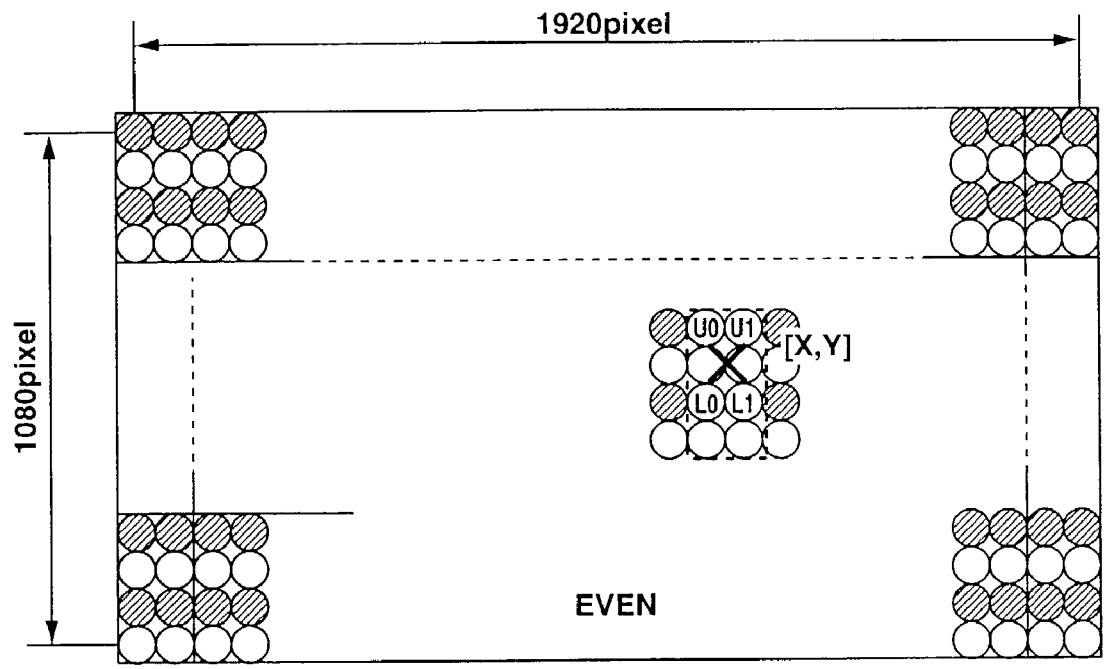
FIG. 46 illustrates four-point interpolation processing for picture signals of the HD format.
Figure 46B:
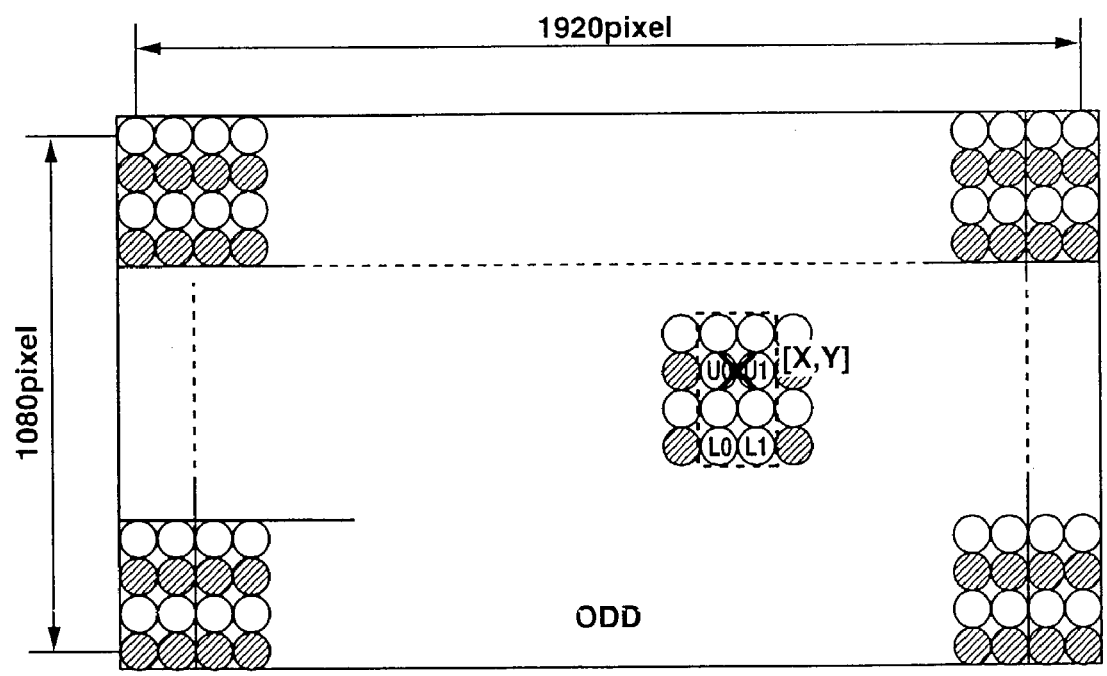

The operation of the interpolation circuit 22 is now explained. First, the four-point interpolation in case the HD format picture signals are stored in the buffer 20 is explained. The HD format picture signals are stored, in terms of a field picture as a unit, so that four pixels neighboring to one another in the up-and-down direction and in the left-and-right direction are separately stored in the units U0, U1, L0 and L1 of the buffer 20, as shown in FIG. 21, so that, in interpolating picture signals corresponding to an interpolation point indicated by a mark x of an even field shown in FIG. 46A, the picture signals of the four pixels lying on the upper and lower sides and on the left and right sides of the interpolation point can be read out simultaneously in one clock period. Of the picture signals, read out simultaneously in one clock period from the units U0, U1, L0, L1, termed signals U0, U1, L0, L1, the signals U0 and L0 are sent to the proportional distribution circuit for the vertical direction 121, while the signals U1, L1 are sent to the proportional distribution circuit for the vertical direction 122. The proportional distribution circuit for the vertical direction 121 proportionally distributes the signals U0, L0, responsive to the position information r for the vertical direction of the interpolation point, to send the resulting interpolated value TA for the vertical direction to the proportional distribution circuit for the horizontal direction 123. The proportional distribution circuit for the vertical direction 122 proportionally distributes the signals U1, L1, responsive to the position information r for the vertical direction of the interpolation point, to send the resulting interpolated value TB for the vertical direction to the proportional distribution circuit for the horizontal direction 123. The proportional distribution circuit for the horizontal direction 123 proportionally distributes the interpolated values TA, TB for the vertical direction, responsive to the position information r' for the horizontal direction of the interpolation point, to obtain an interpolated value for the interpolation point x. Meanwhile, the operation for picture signals of the odd field, shown in FIG. 46B, is the same as that described above and hence is not explained specifically.

Before proceeding to description of the 16-point interpolation processing in case field/frame converted SD format picture signals are stored in the buffer 20, the SD format picture signals as stored are explained, taking 480i×720 SD format picture signals, as an example, by referring to FIG. 47.

Figures 47A, 47B:
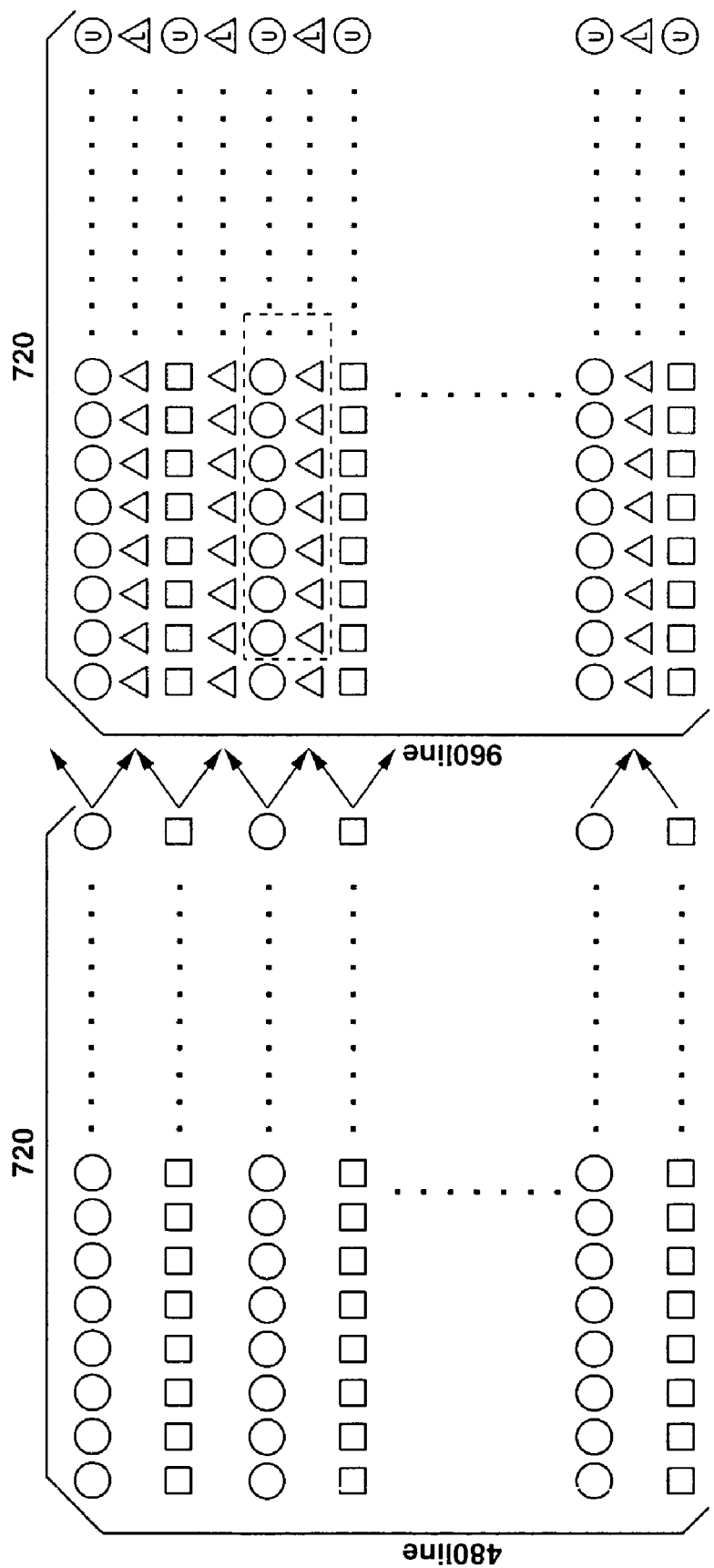
FIG. 47 illustrates field/frame conversion for the picture signals of the SD format by a converter 67 of the scan converter 15.
Figure 48:
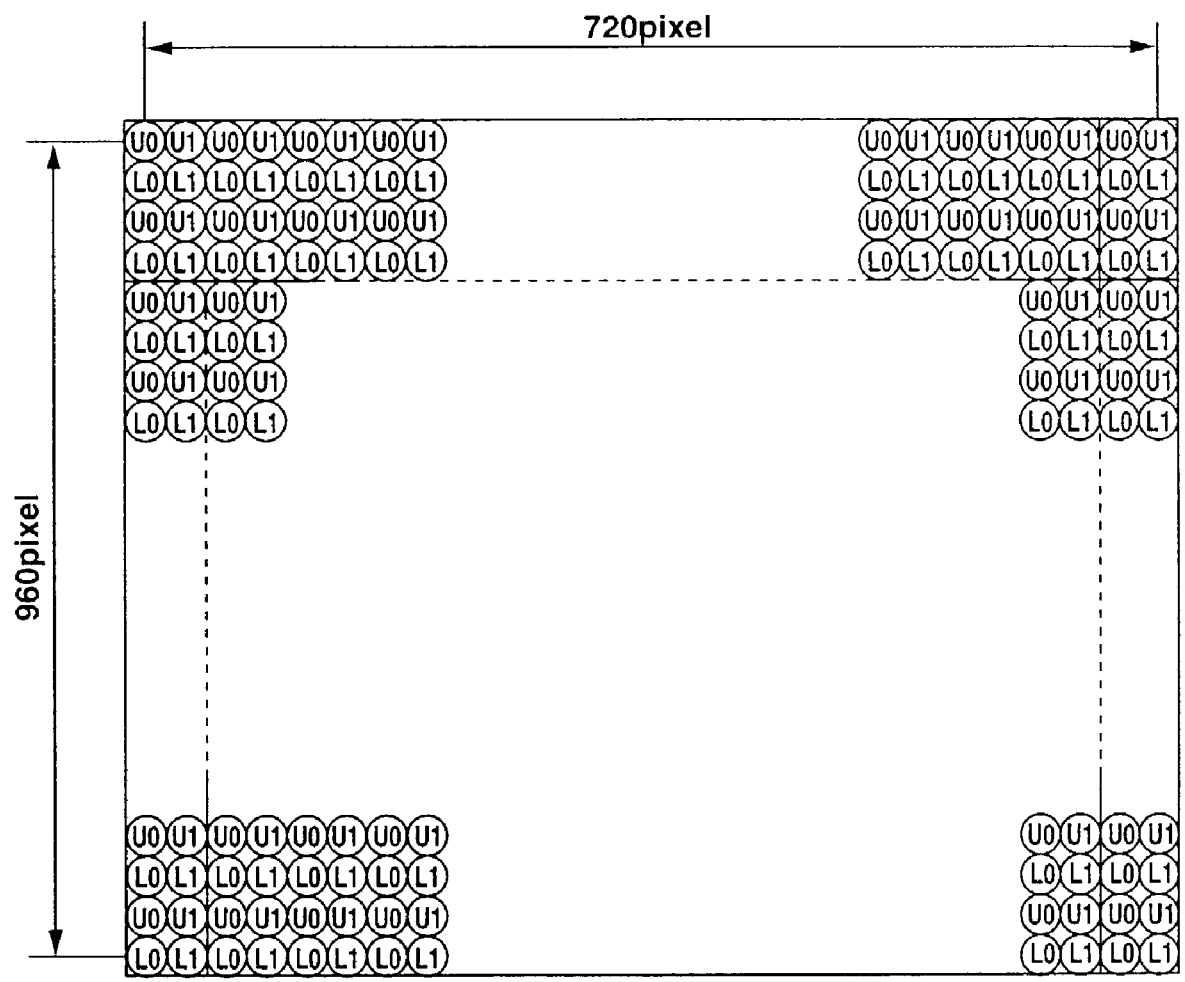
FIG. 48 shows allocation to units U0 to L1 of field/frame converted picture signals of the SD format input from the scan converter 15.

Before being fed to the buffer 20, the SD format picture signals are converted by a converter 67 of the scan converter 15, into a 480×720 frame picture, by synthesizing an even field picture, shown in FIG. 47A, made up of pixels denoted ○ in FIG. 47A, and an odd field picture, made up of pixels denoted □ in FIG. 47A. Additionally, from the vertically neighboring pixels, indicated by ○ and □, pixels lying intermediate between the two pixels, indicated Δ in FIG. 47B, are interpolated, for conversion to a 960×720 frame picture. The SD format picture signals, converted into the 960×720 frame picture, are stored as shown in FIG. 48, that is such that the four neighboring pixels on the upper and lower sides and on the left and right sides are separately stored in the units U0, U1, L0 and L1 of the buffer 20, as in the case of the HD format field picture stored in the buffer 20.

Figure 49:
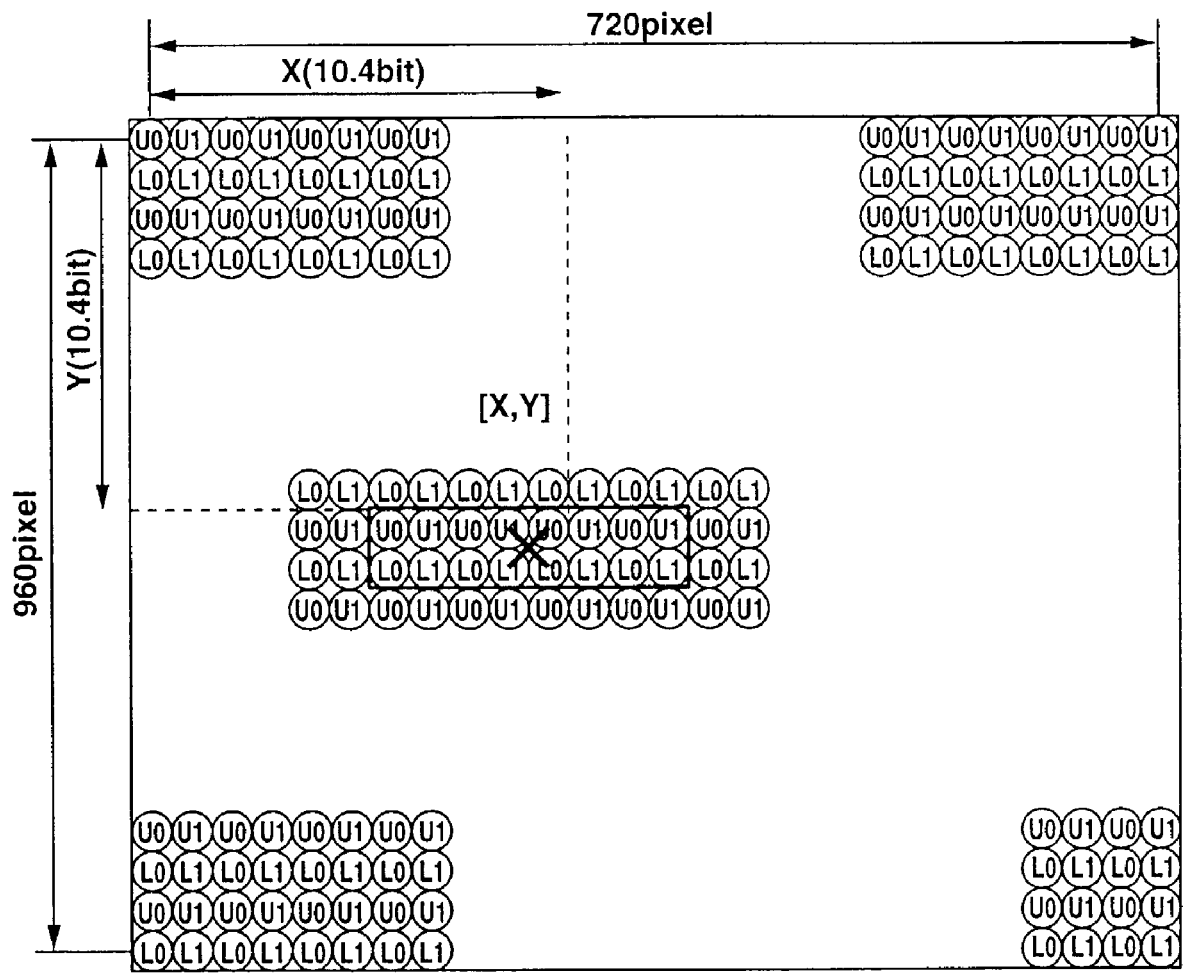
FIG. 49 illustrates 16-point interpolation processing for picture signals of the SD format.
Figure 50:
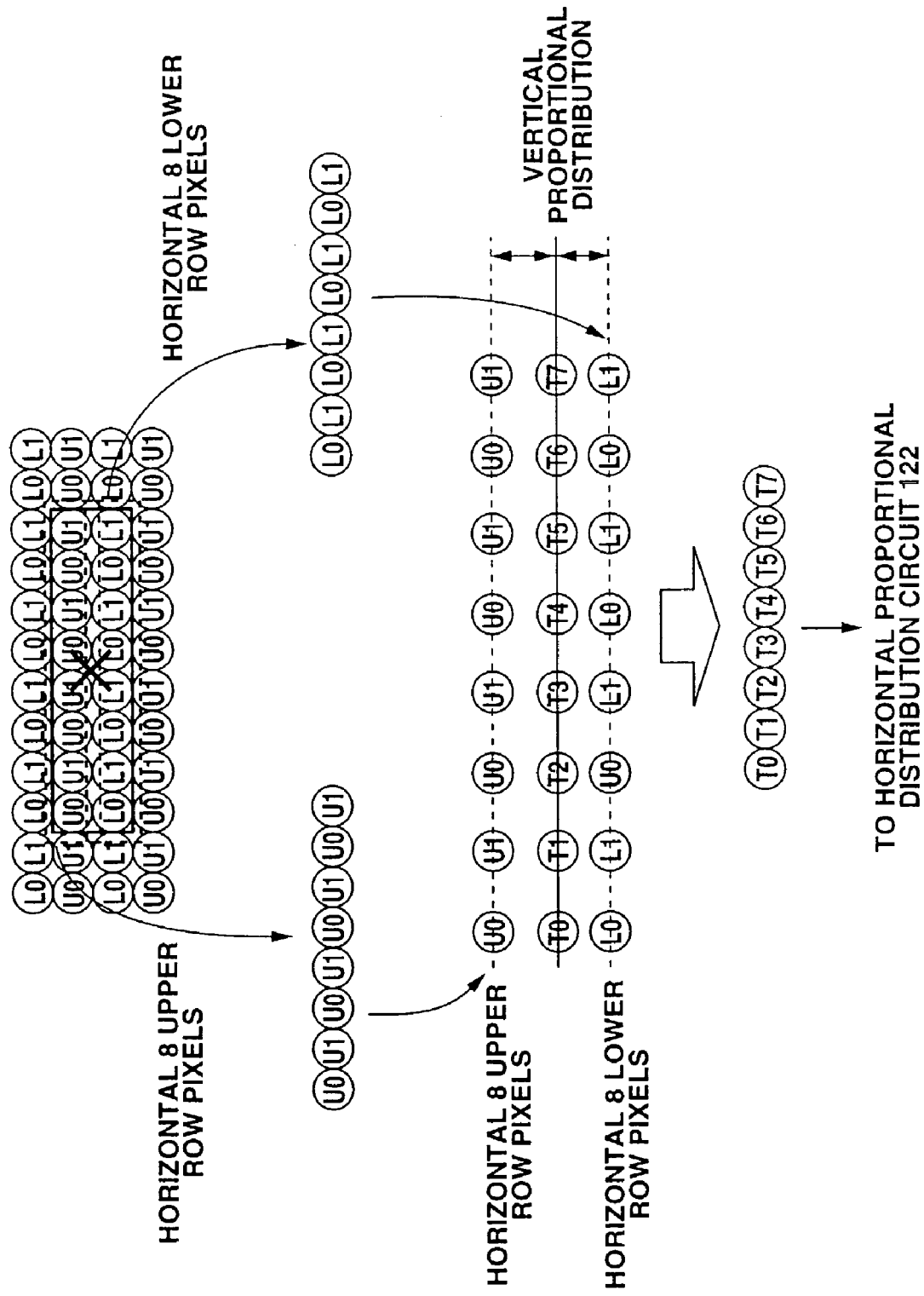
FIG. 50 illustrates the operation of vertical proportional distribution circuits 121, 122 in 16-point interpolation processing.
Figure 51:
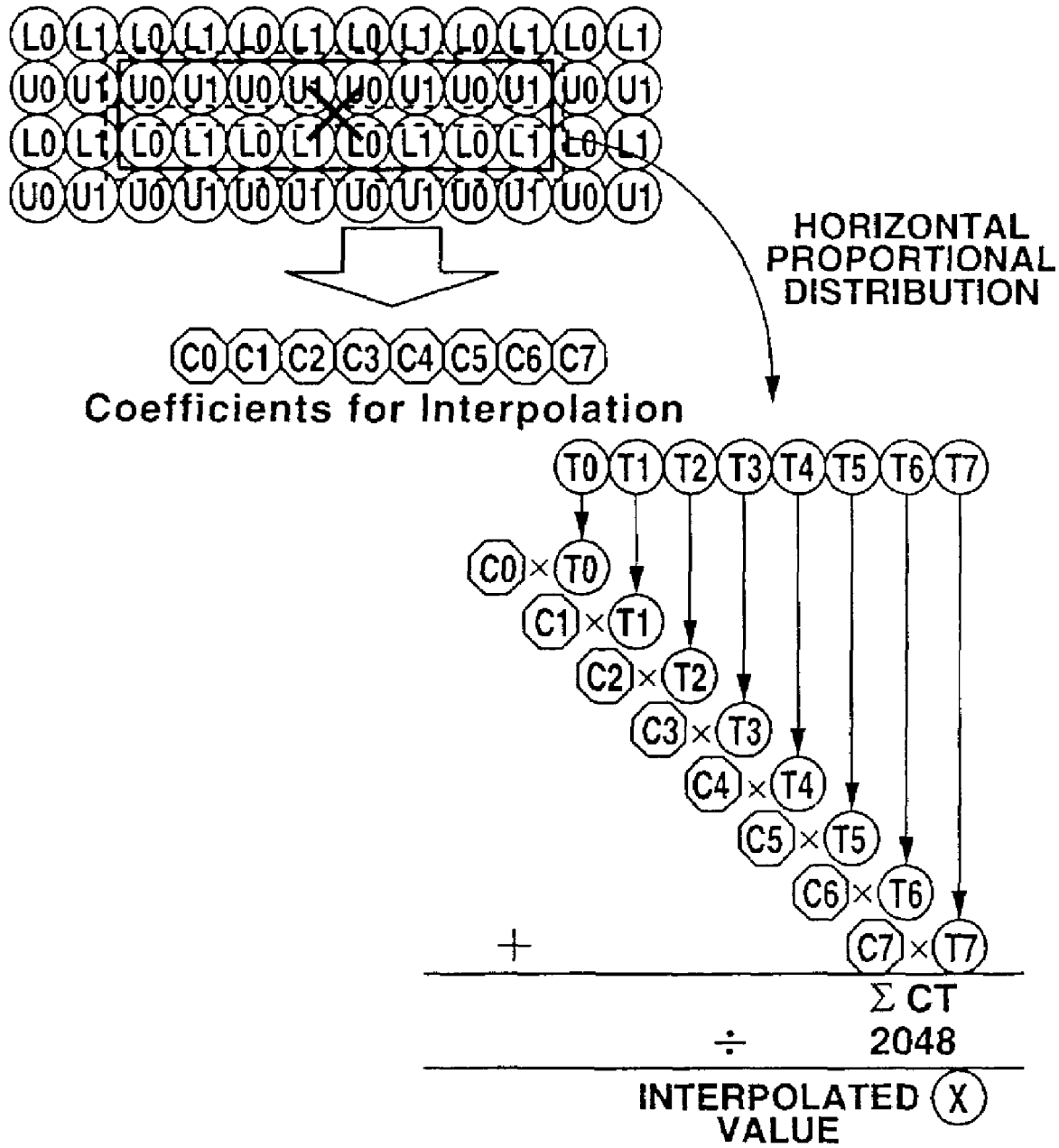
FIG. 51 illustrates the operation of a horizontal proportional distribution circuit 123 in 16-point interpolation processing.

The concept of the operation of the 16-point interpolation processing by the interpolation circuit 22 is now explained. For example, in interpolating picture signals corresponding to the point of interpolation, shown by a mark x in FIG. 49, eight neighboring pixels of an upper row with respect to the point of interpolation and eight neighboring pixels of a lower row with respect to the point of interpolation, totaling at 16 pixels (16 pixels encircled by a horizontally elongated rectangle) are read out and proportionally distributed. Specifically, the picture signals of the eight pixels of the upper row and those of the associated eight pixels of the lower row are proportionally distributed by the proportional distribution circuit for the vertical direction 121 and by the proportional distribution circuit for the vertical direction 122, respectively, to calculate interpolated values T0 to T7 for the vertical direction, as shown in FIG. 50. The interpolated values T0 to T7 for the vertical direction are multiplied by the proportional distribution circuit for the horizontal direction 123 with interpolation coefficients $C_0$ to $C_7$, as shown in FIG. 51, to give a sum total $\Sigma(Ti*Ci)$, which then is divided by the sum total $\Sigma Ci$ of the interpolation coefficients Ci to calculate an interpolated value of the point of interpolation x. In the present case, i=0, 1, ..., 7.

Figure 52A:
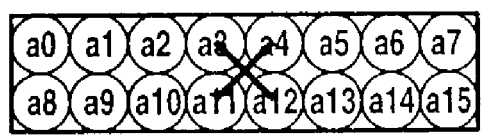
FIG. 52 illustrates the readout timing of picture signals in 16-point interpolation processing.
Figure 54:
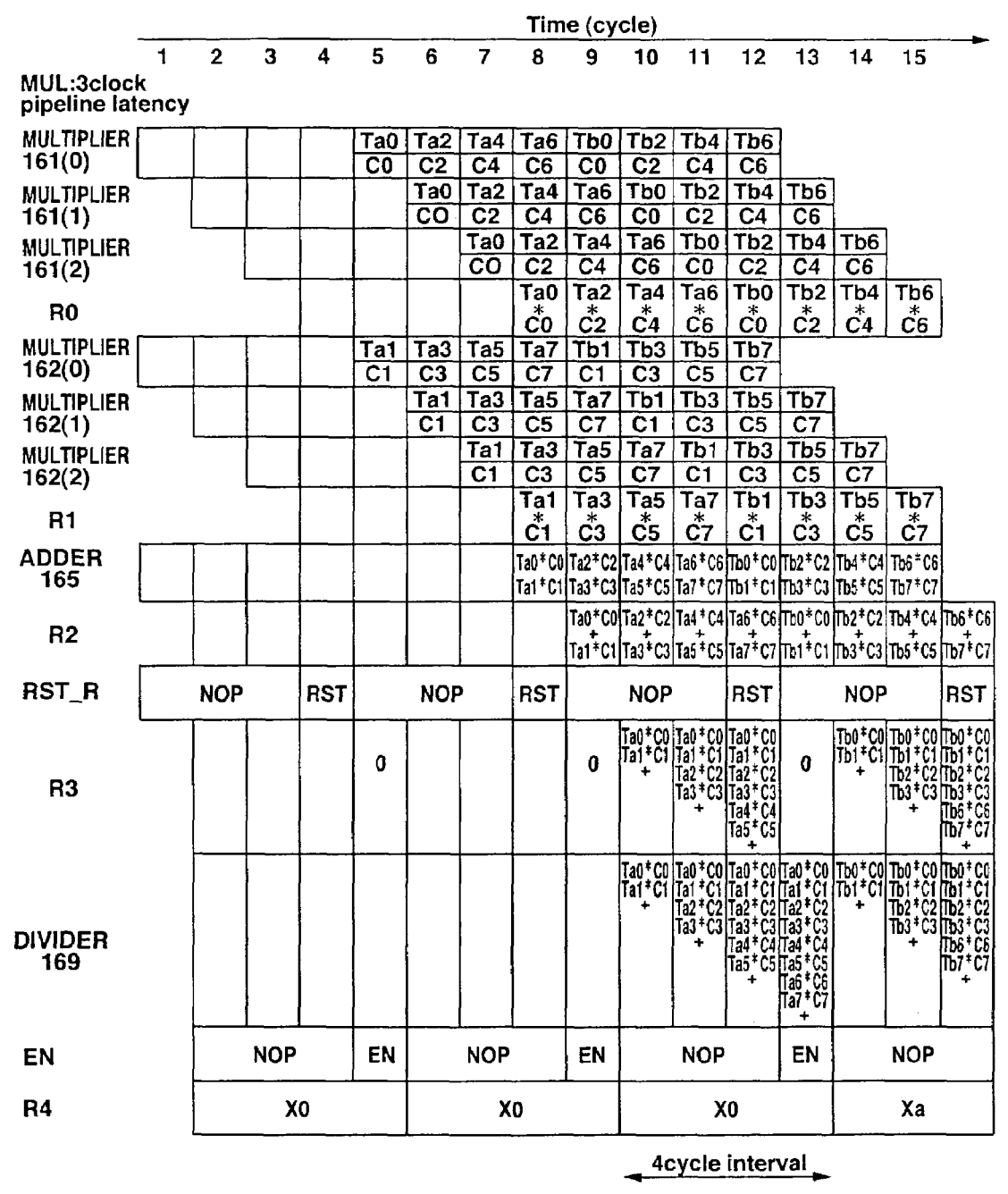

Referring to FIGS. 52 to 54, the operational timing of the 16-point interpolation processing of the interpolation circuit 22 executed with the operating frequency of 54 MHz is explained. Since the units U0, U1, L0 and L1 of the buffer 20 permit concurrent readout, four pixels are read at a time sequentially in the 16-point interpolation processing each clock period. That is, if, as shown in FIG. 52A, the picture signals of 16 pixels, used for interpolation, and which are separately stored in the units U0, U1, L0 and L1 of the buffer 20, are depicted a0 to a15, the picture signals a0, a1, a8 and a9 shown in FIG. 52B are read at a number 0 timing (cycle 0), the picture signals a2, a3, a10 and a11 shown in FIG. 52C are read at a number 2 timing (cycle 1), the picture signals a4, a5, a12 and a13 shown in FIG. 52D are read at a number 3 timing (cycle 2), and the picture signals a6, a7, a14 and a15 shown in FIG. 52E are read at a number 4 timing (cycle 3). The picture signals a0, a8, read out at the number 0 timing (cycle 0) are input to the proportional distribution circuit for the vertical direction 121, whilst the picture signals a1, a9 are input to the proportional distribution circuit for the vertical direction 121. The picture signals a2, a10, read out at the number 1 timing (cycle 1) are input to the proportional distribution circuit for the vertical direction 121, whilst the picture signals a3, a11 are input to the proportional distribution circuit for the vertical direction 122. The picture signals a4, a12, read out at the number 2 timing (cycle 2) are input to the proportional distribution circuit for the vertical direction 121, whilst the picture signals a5, a13 are input to the proportional distribution circuit for the vertical direction 122. The picture signals a6, a14 read out at the number 3 timing (cycle 3) are input to the proportional distribution circuit for the vertical direction 121, whilst the picture signals a7, a15 are input to the proportional distribution circuit for the vertical direction 122.

Figure 53A:
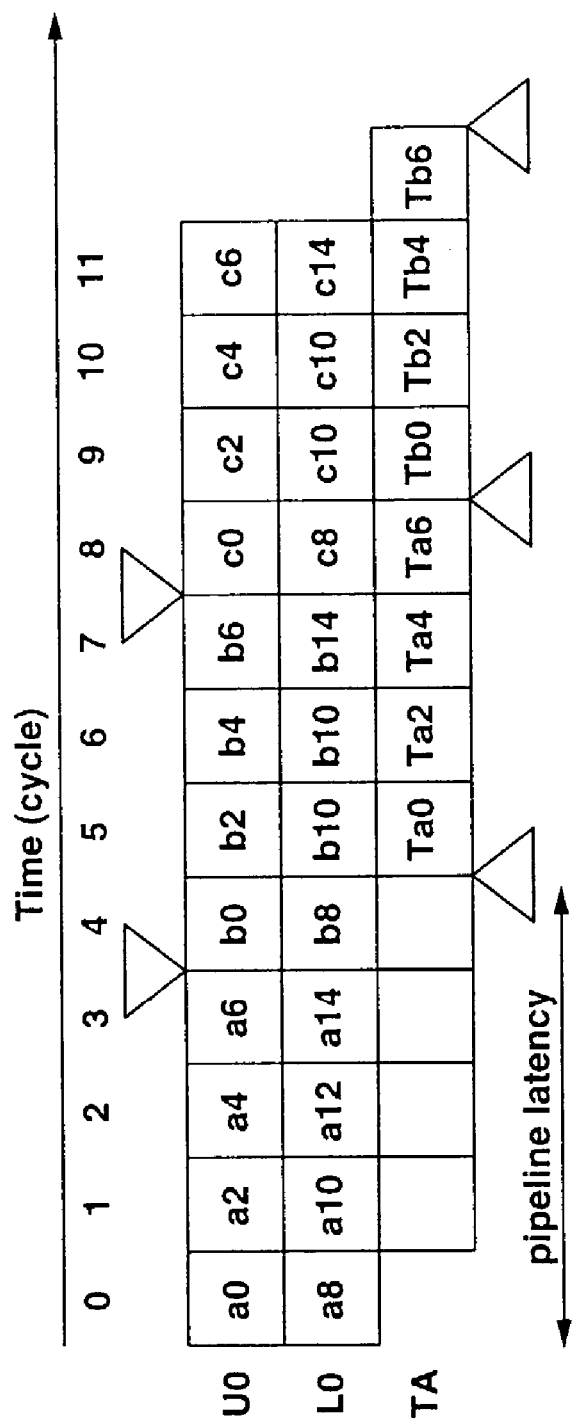
FIG. 53 illustrates the operating timing of the vertical proportional distribution circuits 121, 122 in the 16-point interpolation processing.
Figure 53B:
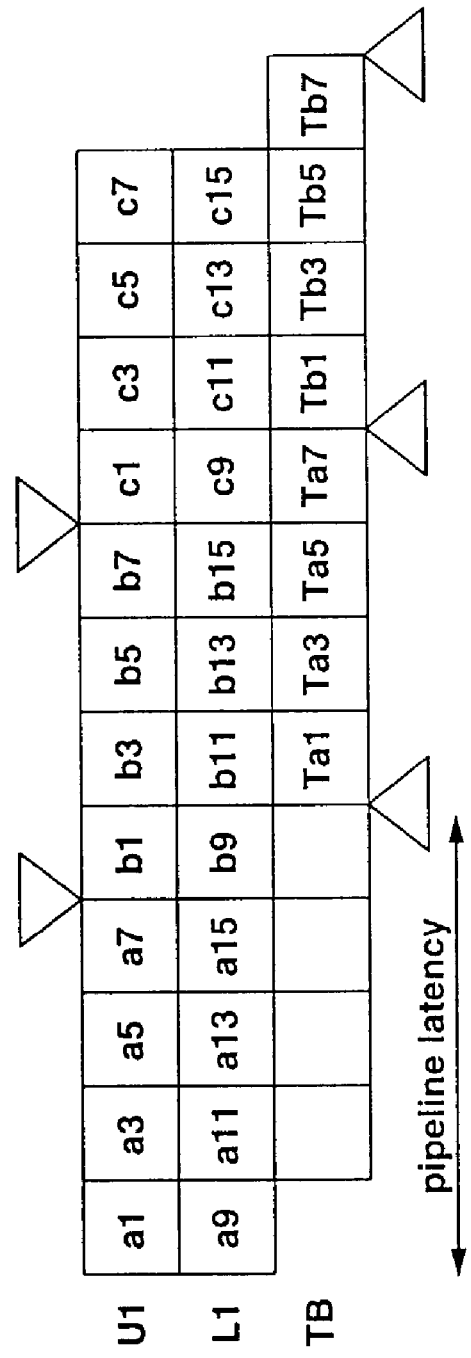

FIGS. 53A, 53B show the operating timing of the proportional distribution circuits for the vertical direction 121, 122. The proportional distribution circuit for the vertical direction 121 sequentially outputs the interpolated values TA for the vertical direction to the proportional distribution circuit for the horizontal direction 123 at a timing delayed from the input timing from the units U0, L0 of the buffer 20 by four clocks. Specifically, the proportional distribution circuit for the vertical direction 121 outputs an interpolated value Ta0, corresponding to proportional distribution of the picture signals a0, a8, at a number 5 timing (cycle 5), while outputting an interpolated value Ta2, corresponding to proportional distribution of the picture signals a2, a10, at a number 6 timing (cycle 6), an interpolated value Ta4, corresponding to proportional distribution of the picture signals a4, a12, at a number 7 timing (cycle 7) and outputting an interpolated value Ta6, corresponding to proportional distribution of the picture signals a6, a14, at a number 8 timing (cycle 8). Similarly, the proportional distribution circuit for the vertical direction 122 sequentially outputs the interpolated values TB for the vertical direction to the proportional distribution circuit for the horizontal direction 123 at a timing delayed from the input timing from the units U1, L1 of the buffer 20 by four clocks. Specifically, the proportional distribution circuit for the vertical direction 122 outputs an interpolated value Ta1, corresponding to proportional distribution of the picture signals a1, a9, at a number 5 timing (cycle 5), while outputting an interpolated value Ta3, corresponding to proportional distribution of the picture signals a3, a11, at a number 6 timing (cycle 6), an interpolated value Ta5, corresponding to proportional distribution of the picture signals a5, a13, at a number 7 timing (cycle 7) and outputting an interpolated value Ta7, corresponding to proportional distribution of the picture signals a7, a15, at a number 8 timing (cycle 8).

FIG. 54 shows the operating timing of the proportional distribution circuit for the horizontal direction 123. The proportional distribution circuit for the horizontal direction 123 outputs interpolated values X every for clock periods. Specifically, the multiplier 161 multiplies the interpolated values $Ta_0$, $Ta_2$, $Ta_4$ and $Ta_6$ for the vertical direction, sequentially input at the number 5 to number 8 timings, with interpolation coefficients $C_0$, $C_2$, $C_4$ and $C_6$, respectively to output the results of multiplication to the register (R0) 163. The register (R0) 163 sequentially outputs the results of multiplication $Ta_0*C_0$, $Ta_2*C_2$, $Ta_4*C_4$, $Ta_6*C_6$ to the adder 165, at the number 8 to number 11 timings, delayed from the input timing by three clock periods. Similarly, the multiplier 162 multiplies the interpolated values $Ta_1$, $Ta_3$, $Ta_5$ and $Ta_7$ for the vertical direction, sequentially input at the number 5 to number 8 timings, with interpolation coefficients $C_1$, $C_3$, $C_5$ and $C_7$, respectively to output the results of multiplication to the register (R1) 164. The register (R1) 164 sequentially outputs the results of multiplication $Ta_1*C_1$, $Ta_3*C_3$, $Ta_5*C_5$, $Ta_7*C_7$ to the adder 165, at the number 8 to number 11 timings, delayed from the input timing by three clock periods.

The adder 165 sums the products $Ta_0*C_0$ and $Ta_1*C_1$ the products $Ta_2*C_2$ and $Ta_3*C_3$, the products $Ta_4*C_4$ and $Ta_5*C_5$ and the products $Ta_6*C_6$ and $Ta7*C_7$, sequentially input from the multipliers 161, 162 at the number 8 to number 11 timings, to output the results of summation to the register (R2) 166. The register (R2) 166 sequentially outputs the results of summation $Ta_0*C_0+Ta_1*C_1$, $Ta_2*C_2+Ta_3*C_3$, $Ta_4*C_4+Ta_5*C_5$ and $Ta_6*C_6+Ta_7*C_7$ to the adder 167 at the number 9 to the number 12 timings, delayed by one clock period from the input timing. The adder 167 sums the results of summation, sequentially input from the adder 165 at the number 9 to number 12 timings, to the output of the adder 167, one clock period before, input from the register (R3) 168, to send the results of summation to the register (R3) 168 and to the divider 169. Meanwhile, the register (R3) 168 is initialized in synchronism with an RST_R signal input every four clock periods. Consequently, the adder 167 outputs at the number 13 timing the cumulative value of the results of summation, sequentially input from the adder 165 at the number 9 to number 12 timings. The divider 169 divides the cumulative value from the adder 167 by the sum $\Sigma Ci$ of the interpolation coefficients from the adder 167 to output the result of division to the register (R4) 170, which then outputs the result of division from the divider 169, that is an interpolated value X of the point of interpolation x, in synchronism with an EN signal every four clock periods, here the number 13 timing.

According to the present embodiment, as described above, the HD format picture signals and the SD format picture signals can be interpolated using the same circuit, that is the interpolation circuit 22. Meanwhile, since 4-point interpolation processing is executed for the picture signals of the HD format, whereas the 16-point interpolation processing instead of the 4-point interpolation processing is executed for the SD format picture signals, the interpolated value obtained may be of the quality equivalent to that of the conventional equipment dedicated to SD format. It should be noted that the present invention may be applied to all sorts of the equipment configured for processing picture signals.

Although the above-described sequence of operations can be performed on a hardware, it may also be executed by the software. If the sequence of operations is to be executed on the software, the program forming the software is installed in a dedicated hardware built in a computer. Alternatively, the program forming the software is installed from a recording medium in e.g., a general-purpose personal computer capable of executing various functions.

The recording medium is formed not only by package media, such as a magnetic disc 6, inclusive of a floppy disc, an optical disc 7, inclusive of a CD-ROM (Compact Disc-Read-Only memory) and DVD (Digital Versatile Disc), a magneto-optical disc 8, inclusive of MD (Mini-Disc), or a semiconductor memory 9, having the program pre-recorded thereon, but also by a ROM or a hard disc, having the program pre-recorded thereon and which is furnished to the user as it is built in the computer from the outset. In the present specification, the steps stating the program recorded on the recording medium includes parallel processing or batch-wise processing, in addition to the processing executed chronologically in an explicitly stated sequence. Meanwhile, the system herein means an entire apparatus comprised of plural component units.

INDUSTRIAL APPLICABILITY

In the picture processing method and apparatus and a program for a recording medium, according to the present invention, input picture signals are stored in a memory, the picture signals recorded on the memory are read out simultaneously every preset number of picture signals, and the plural picture signals, recorded in the memory, are processed in a preset manner to interpolate picture signals at a preset position. Since the operating frequency as well as the number of times of operations of the readout processing and the interpolation processing is controlled in keeping with the format of the input picture signals, 4-point interpolation processing and the 16-point interpolation processing can be executed for the picture signals of the HD format and for the picture signals of the SD format, respectively.

Moreover, in the picture processing method and apparatus and the program for the recording medium according to the present invention, input picture signals are stored in a memory, an imaginary area is set around a picture formed from the picture signals, and picture signals are generated for the imaginary area and the so generated picture signals for the imaginary area are stored in the memory, so that the same interpolation processing can be applied irrespective of the positions for interpolation.

In the picture processing method and apparatus and the program for the recording medium according to the present invention, in which chroma signals for a preset position are interpolated, using plural separated consecutive chroma signals, and in which the so interpolated chroma signals are output simultaneously with the associated luminance signals, it becomes possible to utilize the memory efficiently or to carry out processing for color adjustment.

In the picture processing method and apparatus and the program for the recording medium according to the present invention, in which picture signals input in the horizontal scanning sequence are alternately written, in terms of a preset quantity as a unit, in a plural number of banks of a first information recording medium, the picture signals are read out alternately from the different banks of the first information recording medium, in terms of a preset quantity as a unit, and picture signals are output, in terms of a preset quantity as a unit, in the same sequence as the writing sequence, it becomes possible to change the scanning direction using a recording medium as the first information recording medium featuring burst information transfer.

Moreover, in the picture processing method and apparatus and the program for the recording medium according to the present invention, in which the bit width of the picture signals is converted as the bit width of the chroma signals of the input picture signals is diminished, it becomes possible to use a 36-bit general-purpose memory to reduce the cost.

The invention claimed is:

1. A picture processing apparatus for processing picture signals of different formats that include a first format and a second format, comprising:
    ex-area adding means for adding ex-areas around the area indicated by the input picture signals;
    storage means for storing input picture signals in a memory;
    read-out means for simultaneously reading out said picture signals stored in said memory in terms of a preset number of the picture signals as a unit;
    interpolation means for interpolating picture signals for a preset position by executing preset calculations on the plural picture signals read out by said readout means from said memory; and
    control means for controlling the operating frequency and the number of times of operations of said readout means and said interpolation means in keeping with the formats of the input picture signals,
    wherein a 4-point interpolation processing is executed for the picture signals of a high-definition ("HD") format and a 16-point interpolation processing is executed for the picture signals of a standard definition ("SD") format, respectively,
    wherein a number of pixels of the ex-areas are determined by a number of pixels used by the interpolation means,
    wherein the interpolation means implements an interpolating process independent of a location of the preset position, and
    wherein the added ex-area adds one or more dummy pixels adjacent to an edge pixel so that when the preset position is at an edge of the area defined by the picture signals, the interpolation means implements the same interpolation process, the one or more dummy pixels being disposed outside the area defined by the picture pixels and generating a black area.

2. The picture processing apparatus according to claim 1 wherein, when the picture signals of the first format are input, said control means changes said operating frequency and the number of times of operations to values as large as four times those when the picture signals of the second format are input.

3. The picture processing apparatus according to claim 2 further comprising:
    conversion means for applying field/frame conversion to picture signals of the first format and for doubling the number of pixels in the vertical direction.

4. The picture processing apparatus according to claim 2 wherein said first format is an SD format and
    wherein said second format is an HD format.

5. The picture processing apparatus according to claim 1 wherein, when the picture signals of the first format are input, said interpolation means perform preset calculations on 16 of said picture signals to interpolate picture signals for a preset position, under control from said control means, and
    wherein, when the picture signals of the second format are input, said interpolation means perform preset calculations on 4 of said picture signals to interpolate picture signals for a preset position, under control from said control means.

6. A picture processing method for processing picture signals of different formats that include a first format and a second format, comprising:
    an ex-area adding step of adding ex-areas around the area indicated by the input picture signals;
    a storage step of storing input picture signals in a memory;
    a read-out step of simultaneously reading out said picture signals stored in said memory in terms of a preset number of the picture signals as a unit;
    an interpolation step of interpolating picture signals for a preset position by executing preset calculations on the plural picture signals read out in said readout step from said memory; and
    a control step of controlling the operating frequency and the number of times of operations of said readout step and said interpolation step in keeping with the formats of the input picture signals,
    wherein a 4-point interpolation processing is executed for the picture signals of a high-definition ("HD") format and a 16-point interpolation processing is executed for the picture signals of a standard definition ("SD") format, respectively,
    wherein a number of pixels of the ex-areas are determined by a number of pixels used by the interpolation step,
    wherein the interpolation step implements an interpolating process independent of a location of the preset position, and
    wherein the added ex-area adds one or more dummy pixels adjacent to an edge pixel so that when the preset position is at an edge of the area defined by the picture signals, the interpolation step implements the same interpolation process, the one or more dummy pixels being disposed outside the area defined by the picture pixels and generating a black area.

7. A non-transitory recording medium including a computer-readable program for picture processing, recorded thereon, said program processing picture signals of different formats that include a first format and a second format; said program comprising:
    an ex-area adding step of adding ex-areas around the area indicated by the input picture signals;
    a storage step of storing input picture signals in a memory;

a read-out step of simultaneously reading out said picture signals stored in said memory in terms of a preset number of the picture signals as a unit;

an interpolation step of interpolating picture signals for a preset position by executing preset calculations on the plural picture signals read out in said readout step from said memory; and a control step of controlling the operating frequency and the number of times of operations of said readout step and said interpolation step in keeping with the formats of the input picture signals, wherein a 4-point interpolation processing is executed for the picture signals of a high-definition ("HD") format and a 16-point interpolation processing is executed for the picture signals of a standard definition ("SD") format, respectively, wherein a number of pixels of the ex-areas are determined by a number of pixels used by the interpolation step, wherein the interpolation step implements an interpolating process independent of a location of the preset position, and wherein the added ex-area adds one or more dummy pixels adjacent to an edge pixel so that when the preset position is at an edge of the area defined by the picture signals, the interpolation step implements the same interpolation process, the one or more dummy pixels being disposed outside the area defined by the picture pixels and generating a black area.

8. A picture processing apparatus for interpolating picture signals, comprising:

storage means for storing said picture signals corresponding to input pixels in a memory;

generating means for setting an imaginary area around a picture formed by said picture signals for generating said picture signals associated with said imaginary area;

storage means for storing said picture signals associated with said imaginary area, generated by said generating means;

readout means for reading out said plural picture signals associated with plural pixels lying in the vicinity of a preset position; and interpolation means for interpolating said picture signals associated with said preset position using plural picture signals associated with said plural pixels read out by said readout means, wherein a 4-point interpolation processing is executed for the picture signals of a high-definition ("HD") format and a 16-point interpolation processing is executed for the picture signals of a standard definition ("SD") format, respectively, wherein a number of pixels of the imaginary area are determined by a number of pixels used by the interpolation means, wherein the interpolation means implements an interpolating process independent of a location of the preset position, and wherein the imaginary area adds one or more dummy pixels adjacent to an edge pixel so that when the preset position is at an edge of the area defined by the picture signals, the interpolation means implements the same interpolation process, the one or more dummy pixels being disposed outside the area defined by the picture pixels and generating a black area.

9. The picture processing apparatus according to claim 8 wherein said readout means reads out four of said picture signals associated with four of said pixels lying on the upper and lower sides and on the left and right sides of said preset position;

said interpolation means interpolating said picture signals associated with said preset position using the four picture signals read out by said readout means.

10. A picture processing method for interpolating picture signals, comprising:

a storage step of storing said picture signals corresponding to input pixels in a memory;

a generating step of setting an imaginary area around a picture formed by said picture signals for generating said picture signals associated with said imaginary area;

a storage step of storing said picture signals associated with said imaginary area, generated by said generating step;

a readout step of reading out said plural picture signals associated with plural pixels lying in the vicinity of a preset position; and an interpolation step of interpolating said picture signals associated with said preset position using plural picture signals associated with said plural pixels read out by said readout step, wherein a 4-point interpolation processing is executed for the picture signals of a high-definition ("HD") format and a 16-point interpolation processing is executed for the picture signals of a standard definition ("SD") format, respectively, wherein a number of pixels of the imaginary area are determined by a number of pixels used by the interpolation step, wherein the interpolation step implements an interpolating process independent of a location of the preset position, and wherein the imaginary area adds one or more dummy pixels adjacent to an edge pixel so that when the preset position is at an edge of the area defined by the picture signals, the interpolation step implements the same interpolation process, the one or more dummy pixels being disposed outside the area defined by the picture pixels and generating a black area.

11. A non-transitory recording medium including a computer-readable program for picture processing, recorded thereon, said program interpolating picture signals; said program comprising:

a storage step of storing said picture signals corresponding to input pixels in a memory;

a generating step of setting an imaginary area around a picture formed by said picture signals for generating said picture signals associated with said imaginary area;

a storage step of storing said picture signals associated with said imaginary area, generated by said generating step;

a readout step of reading out said plural picture signals associated with plural pixels lying in the vicinity of a preset position; and an interpolation step of interpolating said picture signals associated with said preset position using plural picture signals associated with said plural pixels read out by said readout step, wherein a 4-point interpolation processing is executed for the picture signals of a high-definition ("HD") format and a 16-point interpolation processing is executed for the picture signals of a standard definition ("SD") format, respectively, wherein a number of pixels of the imaginary area are determined by a number of pixels used by the interpolation step, wherein the interpolation step implements an interpolating process independent of a location of the preset position, and wherein the imaginary area adds one or more dummy pixels adjacent to an edge pixel so that when the preset position is at an edge of the area defined by the picture signals, the interpolation step implements the same interpolation process, the one or more dummy pixels being disposed outside the area defined by the picture pixels and generating a black area.

12. A picture processing apparatus for interpolating picture signals including at least luminance signals and chroma signals, comprising:

ex-area adding means for adding ex-areas around the area indicated by the input picture signals;

separating means for separating said chroma signals from said picture signals corresponding to sequentially input pixels;

interpolation means for interpolating chroma signals associated with a preset position using a plurality of consecutive chroma signals, as separated by said separating means; and outputting means for outputting said chroma signals, interpolated by said interpolation means, simultaneously with corresponding luminance signals, wherein a 4-point interpolation processing is executed for the picture signals of a high-definition ("HD") format and a 16-point interpolation processing is executed for the picture signals of a standard definition ("SD") format, respectively, wherein a number of pixels of the ex-areas are determined by a number of pixels used by the interpolation means, wherein the interpolation means implements an interpolating process independent of a location of the preset position, and wherein the added ex-area adds one or more dummy pixels adjacent to an edge pixel so that when the preset position is at an edge of the area defined by the picture signals, the interpolation means implements the same interpolation process, the one or more dummy pixels being disposed outside the area defined by the picture pixels and generating a black area.

13. The picture processing apparatus according to claim 12 wherein said picture signals are 4:2:2 picture signals comprised of luminance signals Y, chroma signals U and chroma signals V.

14. The picture processing apparatus according to claim 12 wherein said interpolation means interpolates said chroma signals associated with an intermediate position of second and third chroma signals using four of said chroma signals separated by said separating means.

15. The picture processing apparatus according to claim 12 wherein said picture signals associated with said pixels are input in the horizontal scanning sequence.

16. The picture processing apparatus according to claim 12 further comprising:

removing means for removing high frequency components of said picture signals associated with said sequentially input pixels.

17. A picture processing method for interpolating picture signals including at least luminance signals and chroma signals, comprising:

an ex-area adding step of adding ex-areas around the area indicated by the input picture signals;

a separating step of separating said chroma signals from said picture signals corresponding to sequentially input pixels;

an interpolation step of interpolating chroma signals associated with a preset position using a plurality of consecutive chroma signals, as separated by said separating step; and an outputting step of outputting said chroma signals, interpolated by said interpolation step, simultaneously with corresponding luminance signals, wherein a 4-point interpolation processing is executed for the picture signals of a high-definition ("HD") format and a 16-point interpolation processing is executed for the picture signals of a standard definition ("SD") format, respectively, wherein a number of pixels of the ex-areas are determined by a number of pixels used by the interpolation step, wherein the interpolation step implements an interpolating process independent of a location of the preset position, and wherein the imaginary area adds one or more dummy pixels adjacent to an edge pixel so that when the preset position is at an edge of the area defined by the picture signals, the interpolation step implements the same interpolation process, the one or more dummy pixels being disposed outside the area defined by the picture pixels and generating a black area.

18. A non-transitory recording medium including a computer-readable program for picture processing, recorded thereon, said program interpolating picture signals at least including luminance signals and chroma signals; said program comprising:

an ex-area adding step of adding ex-areas around the area indicated by the input picture signals;

a separating step of separating said chroma signals from said picture signals corresponding to sequentially input pixels;

an interpolation step of interpolating chroma signals associated with a preset position using a plurality of consecutive chroma signals, as separated by said separating step; and an outputting step of outputting said chroma signals, interpolated by said interpolation step, simultaneously with corresponding luminance signals, wherein a 4-point interpolation processing is executed for the picture signals of a high-definition ("HD") format and a 16-point interpolation processing is executed for the picture signals of a standard definition ("SD") format, respectively, wherein a number of pixels of the ex-areas are determined by a number of pixels used by the interpolation step, wherein the interpolation step implements an interpolating process independent of a location of the preset position, and wherein the imaginary area adds one or more dummy pixels adjacent to an edge pixel so that when the preset position is at an edge of the area defined by the picture signals, the interpolation step implements the same interpolation process, the one or more dummy pixels being disposed outside the area defined by the picture pixels and generating a black area.

19. A picture processing apparatus for changing the scanning direction for picture signals, comprising:

ex-area adding means for adding ex-areas around the area indicated by the input picture signals;

writing means for alternately writing said picture signals, input in the horizontal scanning sequence, in different ones of a plurality of banks of a first information recording medium, from one preset unit volume to another;

readout/writing means for alternately reading out said picture signals every preset unit volume, for writing the information signals in a second information recording medium; and output control means for outputting said picture signals every preset unit volume from said second information recording medium in accordance with the writing sequence, wherein a 4-point interpolation processing is executed for the picture signals of a high-definition ("HD") format and a 16-point interpolation processing is executed for the picture signals of a standard definition ("SD") format, respectively, wherein a number of pixels of the ex-areas are determined by a number of pixels used by the interpolation processing, wherein the interpolating processing is implemented independent of a location of the preset position, and wherein the imaginary area adds one or more dummy pixels adjacent to an edge pixel so that when the preset position is at an edge of the area defined by the picture signals, the interpolation means implements the same interpolation process, the one or more dummy pixels being disposed outside the area defined by the picture pixels and generating a black area.

20. The picture processing apparatus according to claim 19 wherein said first information recording medium is an SDRAM.

21. The picture processing apparatus according to claim 19 wherein said second information recording medium is an SRAM.

22. A picture processing method for changing the scanning direction for picture signals, comprising:

an ex-area adding step of adding ex-areas around the area indicated by the input picture signals;

a writing step of alternately writing said picture signals, input in the horizontal scanning sequence, in different ones of a plurality of banks of a first information recording medium, from one preset unit volume of said picture signals to another;

a readout/writing step of alternately reading out said picture signals every preset unit volume of said picture signals, for writing the information signals in a second information recording medium; and an output control step of outputting said picture signals every preset unit volume of said picture signals from said second information recording medium in accordance with the writing sequence, wherein a 4-point interpolation processing is executed for the picture signals of a high-definition ("HD") format and a 16-point interpolation processing is executed for the picture signals of a standard definition ("SD") format, respectively, wherein a number of pixels of the ex-areas are determined by a number of pixels used by the interpolation processing, wherein the interpolating processing is implemented independent of a location of the preset position, and wherein the imaginary area adds one or more dummy pixels adjacent to an edge pixel so that when the preset position is at an edge of the area defined by the picture signals, the interpolation step implements the same interpolation process, the one or more dummy pixels being disposed outside the area defined by the picture pixels and generating a black area.

23. A non-transitory recording medium including a computer-readable program for picture processing, recorded thereon, said program causing the scanning direction of picture signals to be changed; said program comprising:

an ex-area adding step of adding ex-areas around the area indicated by the input picture signals;

a writing step of alternately writing said picture signals, input in the horizontal scanning sequence, in different ones of a plurality of banks of a first information recording medium, from one preset unit volume of said picture signals to another;

a readout/writing step of alternately reading out said picture signals every preset unit volume of said input picture signals, for writing the information signals in a second information recording medium; and an output control step of outputting said picture signals every preset unit volume of said input picture signals from said second information recording medium in accordance with the writing sequence, wherein a 4-point interpolation processing is executed for the picture signals of a high-definition ("HD") format and a 16-point interpolation processing is executed for the picture signals of a standard definition ("SD") format, respectively, wherein a number of pixels of the ex-areas are determined by a number of pixels used by the interpolation processing, wherein the interpolating processing is implemented independent of a location of the preset position, and wherein the imaginary area adds one or more dummy pixels adjacent to an edge pixel so that when the preset position is at an edge of the area defined by the picture signals, the interpolation step implements the same interpolation process, the one or more dummy pixels being disposed outside the area defined by the picture pixels and generating a black area.

24. A picture processing apparatus for changing a bit width of picture signals, comprising:

ex-area adding means for adding ex-areas around the area indicated by the input picture signals;

conversion means for reducing the bit width of chroma signals of input picture signals to change the bit width of said picture signals;

storage means for storing said picture signals, converted in bit width by said conversion means to a preset bit width, in a memory, wherein said conversion means diminish the bit width of said chroma signals of the input picture signals of 40-bit width to picture signals of 36 bit width; and interpolation means for interpolating picture signals for a preset position by executing preset calculations on said picture signals read out by a readout means from said memory, wherein a 4-point interpolation processing is executed for the picture signals of a high-definition ("HD") format and a 16-point interpolation processing is executed for the picture signals of a standard definition ("SD") format, respectively, wherein a number of pixels of the ex-areas are determined by a number of pixels used by the interpolation means wherein the interpolating processing means implements an interpolation processing independent of a location of the preset position, and wherein the imaginary area adds one or more dummy pixels adjacent to an edge pixel so that when the preset position is at an edge of the area defined by the picture signals, the interpolation means implements the same interpolation process, the one or more dummy pixels being disposed outside the area defined by the picture pixels and generating a black area.

25. The picture processing apparatus according to claim 24 wherein said memory is an SRAM of a 36 bit width.

26. The picture processing apparatus according to claim 24,
wherein the input picture signals are picture signals of a 40-bit width comprised of 10-bit luminance signals Y, 10-bit chroma signals U, 10-bit chroma signals V and 10-bit key signals K.

27. A picture processing method for changing a bit width of picture signals, comprising:
an ex-area adding step of adding ex-areas around the area indicated by the input picture signals;
a conversion step of reducing the bit width of chroma signals of input picture signals to change the bit width of said picture signals;
a storage step of storing said picture signals, converted in bit width in said conversion step to a preset bit width, in a memory,
wherein said conversion means diminish the bit width of said chroma signals of the input picture signals of 40-bit width to picture signals of 36 bit width; and
an interpolation step for interpolating picture signals for a preset position by executing preset calculations on said picture signals read out from said memory,
wherein a 4-point interpolation processing is executed for the picture signals of a high-definition ("HD") format and a 16-point interpolation processing is executed for the picture signals of a standard definition ("SD") format, respectively,
wherein a number of pixels of the ex-areas are determined by a number of pixels used by the interpolation step,
wherein the interpolating processing step implements an interpolation processing independent of a location of the preset position, and
wherein the imaginary area adds one or more dummy pixels adjacent to an edge pixel so that when the preset position is at an edge of the area defined by the picture signals, the interpolation step implements the same interpolation process, the one or more dummy pixels being disposed outside the area defined by the picture pixels and generating a black area.

28. A non-transitory recording medium including a computer-readable program for picture processing, recorded thereon, said program causing a bit width of picture signals to be changed; said program comprising:
an ex-area adding step of adding ex-areas around the area indicated by the input picture signals;
a conversion step of reducing the bit width of chroma signals of input picture signals to change the bit width of said picture signals;
a storage step of storing said picture signals, converted in bit width in said conversion step to a preset bit width, in a memory,
wherein said conversion means diminish the bit width of said chroma signals of the input picture signals of 40-bit width to picture signals of 36 bit width; and
interpolation means for interpolating picture signals for a preset position by executing preset calculations on said picture signals read out by a readout means from said memory,
wherein a 4-point interpolation processing is executed for the picture signals of a high-definition ("HD") format and a 16-point interpolation processing is executed for the picture signals of a standard definition ("SD") format, respectively,
wherein a number of pixels of the ex-areas are determined by a number of pixels used by the interpolation step,
wherein the interpolating processing step implements an interpolation processing independent of a location of the preset position, and
wherein the imaginary area adds one or more dummy pixels adjacent to an edge pixel so that when the preset position is at an edge of the area defined by the picture signals, the interpolation step implements the same interpolation process, the one or more dummy pixels being disposed outside the area defined by the picture pixels and generating a black area.

* * * * *